(12) United States Patent
Weiss

(10) Patent No.: US 8,385,681 B2
(45) Date of Patent: Feb. 26, 2013

(54) BLEMISH REMOVAL

(75) Inventor: Ben Weiss, Carpinteria, CA (US)

(73) Assignee: Apple Inc., Cupertino, CA (US)

( * ) Notice: Subject to any disclaimer, the term of this patent is extended or adjusted under 35 U.S.C. 154(b) by 1417 days.

(21) Appl. No.: 12/029,453

(22) Filed: Feb. 11, 2008

(65) Prior Publication Data

US 2009/0202170 A1 Aug. 13, 2009

(51) Int. Cl.
*G06K 9/00* (2006.01)
*G06K 9/40* (2006.01)
*G09G 5/00* (2006.01)
*G09G 5/02* (2006.01)

(52) U.S. Cl. ........ 382/275; 382/162; 382/274; 345/594; 345/606

(58) Field of Classification Search .................. 382/162, 382/167, 254, 274, 275; 345/586, 594, 606; 358/452, 453, 463, 531, 537
See application file for complete search history.

(56) References Cited

U.S. PATENT DOCUMENTS

| | | | |
|---|---|---|---|
| 5,063,375 A * | 11/1991 | Lien et al. ...................... 345/616 |
| 5,229,864 A | 7/1993 | Moronaga et al. |
| 5,799,104 A * | 8/1998 | Nakamura et al. ............ 382/144 |
| 6,160,923 A | 12/2000 | Lawton et al. |
| H2003 H * | 11/2001 | Minner .......................... 382/144 |
| 6,313,840 B1 | 11/2001 | Bilodeau et al. |
| 6,552,725 B1 * | 4/2003 | Houtman et al. .............. 345/423 |
| 6,587,592 B2 | 7/2003 | Georgiev et al. |
| 6,711,282 B1 * | 3/2004 | Liu et al. ........................ 382/132 |
| 6,870,954 B1 | 3/2005 | Gupta |
| 7,002,594 B2 | 2/2006 | Yoshida et al. |
| 7,010,163 B1 | 3/2006 | Weiss |
| 7,277,595 B1 | 10/2007 | Reid |
| 7,427,994 B2 * | 9/2008 | Gangnet et al. ................ 345/606 |
| 7,545,994 B2 | 6/2009 | Reid |
| 2002/0012452 A1 | 1/2002 | Van Overvald et al. |
| 2002/0146167 A1 * | 10/2002 | Imamura et al. .............. 382/164 |
| 2003/0012452 A1 | 1/2003 | Trifonov et al. |
| 2004/0086184 A1 * | 5/2004 | Kondo et al. .................. 382/203 |
| 2005/0264658 A1 * | 12/2005 | Ray et al. ....................... 348/239 |
| 2006/0110060 A1 * | 5/2006 | Wang et al. .................... 382/254 |
| 2007/0297691 A1 | 12/2007 | Reid |
| 2008/0100726 A1 * | 5/2008 | Cazier et al. .................. 348/246 |

OTHER PUBLICATIONS

Arnold et al. ("Interactive Image Repair with Assisted Structure and Texture Completion," IEEE Workshop on Applications of Computer Vision, 2007).*
Masnou et al. ("Level lines based disocclusion," IEEE Proceedings Int'l Conf. on Image Processing, Oct. 4-7, 1998 vol. 3, pp. 259-263).*
Shih et al. ("Detection and removal of long scratch lines in aged films," IEEE International Conference on Multimedia and Expo, Jul. 9-12, 2006, 477-480).*
Yamauchi et al. ("Image restoration using multiresolution texture synthesis and image inpainting," Proceedings of the Computer Graphics International, 2003, pp. 120-125).*
Kokaram, A. ("Ten Years of Digital Visual Restoration Systems," IEEE Proceedings Int'l Conf. on Image Processing, Sep. 16-19, 2007, vol. 4, pp. 1-4).*

(Continued)

*Primary Examiner* — Yubin Hung
(74) *Attorney, Agent, or Firm* — Robert C. Kowert; Meyertons, Hood, Kivlin, Kowert & Goetzel, P.C.

(57) ABSTRACT

A method of removing blemishes from an image. The method receives a selection of an area of an image, divides the area into at least two interior sub-areas, and replaces the colors of each sub-area independently from each other sub-area.

38 Claims, 52 Drawing Sheets

OTHER PUBLICATIONS

Sun et al. ("Image completion with structure propagation," SIGGRAPH'05, vol. 24, Is. 3, Jul. 2005, pp. 861-868).*
Updated portions of prosecution history of U.S. Appl. No. 10/338,786, May 10, 2007, Reid, Russell.
Updated portions of prosecution history of U.S. Appl. No. 11/852,270, Feb. 24, 2009, Reid, Russell.
Boyle, Michael, et al., "The Effects of Filtered Video on Awareness and Privacy," Dec. 2000, pp. 1-10, Proc. ACM Conference on Computer Supported Cooperative Work.
Non-Final Office Action of U.S. Appl. No. 10/338,786, Jun. 6, 2006 (mailing date), Reid, Russell.
Final Office Action of U.S. Appl. No. 10/338,786, Dec. 4, 2006 (mailing date), Reid, Russell.
Notice of Allowance of U.S. Appl. No. 10/338,786, May 22, 2007 (mailing date), Reid Russell.
Non-Final Office Action of U.S. Appl. No. 11/852,270, Mar. 26, 2008 (mailing date), Reid, Russell.
Atkinson, "An Introduction to Numerical Analysis", John Wiley & Sons Publisher, 1978 [N/A month], pp. 482-485.
Ballester et al., "Filing-In by Joint Interpolation of Vector Fields and Gray Levels", IEEE Transaction on Image Processing, vol. 10, No. 8, Aug. 2001, pp. 1200-1211.
Bertalmio et al., "Image Inpainting", Proc. $27^{th}$ Conf. on Computer Graphics and Interactive Techniques, Jul. 2000, pp. 417-424.
Carrier et al., "Functions of a Complex Variable: Theory and Technique, McGraw-Hill Book Co." NY, 1966 [N/A month], p. 46-47.
Zarantonello et al., "Domain Decomposition, Boundary Integrals, and Wavelets", SPIE vol. 2569, Sep. 1995, pp. 866-875.

* cited by examiner

BLEMISH REMOVAL

FIELD OF THE INVENTION

The invention is directed towards image editing. Specifically, the invention is directed towards removing blemishes from images and applying texture to regions from which blemishes have been removed.

BACKGROUND OF THE INVENTION

In recent years, digital photography has become more popular. This increase in popularity has led to a proliferation of computer programs for editing images. These programs provide a variety of tools for organizing and editing images. Some of these programs include tools for removing blemishes from the image. Such blemishes include, for example, scratches and errant objects that were present in the original scene but are not wanted in the finished picture.

Prior blemish-removal tools often do not perform well in removing blemishes from some of the more complicated regions of images. For instance, they cannot remove blemishes satisfactorily from regions with one or more edges. FIG. 1 illustrates an example of this short-coming in prior blemish removal tools. Specifically, this figure illustrates a pastoral scene 100 that is disturbed by an earthworm 110 poking up out of the ground 112 and blocking part of the ground 112 and the sky 114. In this example, a blemish removal tool that provides a circular cursor 120 has been used (in a second scene 105) to select an area that encompasses the worm and the pixels around the worm within the circle.

In this example, the blemish removal tool does not account for the possibility that the selected area may overlap two different regions. Accordingly, FIG. 1 illustrates that in scene 107, which shows the results of using, the tool, that all the pixels within the selected area have been blurred from the outer edge of the area (blurring inward from edges is sometimes referred to as "inpainting"). The final result of using such a removal tool not only eliminates the worm, but also blends the sky 114 into the ground 112 and vice versa, as the tool does not recognize the edge in the image that is formed at the boundary between the ground and the sky. This blending is an undesirable distortion in the image.

Therefore, there is a need for a blemish removal tool that can remove blemishes from even complex regions, such as those that include one or more edges.

SUMMARY OF THE INVENTION

Some embodiments provide a method of removing blemishes from an image. The method receives a selection of a region of an image that contains a blemish. The method then detects an edge in the selected region. Based on the detected edge the method divides the region into at least two interior sub-regions, and modifies the colors of each sub-regions (e.g., independently from the other sub-region(s)) to remove the blemish in the region. For instance, to modify the colors in the sub-regions, the method of some embodiments performs a blend operation that defines the colors of the sub-region by inpainting the colors from the borders of the sub-region (e.g. defining successive layers of color starting from the defined boundaries of the sub-region and continuing inward, then blending the resulting pixels).

The blending operation of some embodiments performs one or more blurring operations. A blurring operation takes pixels in the interior of a region (or sub-region) and performs a weighted average of the color of individual pixels with the colors of surrounding pixels, then changes the colors of the pixels to match the weighted averages.

The blurring process of some embodiments downsamples the region to be blurred multiple times while painting in (e.g. inpainting) colors from the boundaries and then upsamples multiple times while blurring more of the interior after each upsampling. The method overlays the blurred region with substitute colors. In some embodiments, the modified region is overlain with a texture automatically selected from a nearby region. In some embodiments, a blurring process downsamples the region to be blurred multiple times while inpainting colors from the boundaries and then upsamples multiple times while blurring more of the interior after each upsampling. The methods of other embodiments use other smoothing/blending operations for modifying or replacing the colors of the pixels in the region or sub-regions.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following description, numerous details are set forth for purpose of explanation. However, one of ordinary skill in the art will realize that the invention may be practiced without the use of these specific details. For instance, the techniques described below are described in a specified order, but other embodiments may change the order of the operations while still embodying the current invention.

I. Overview

Figure 2:
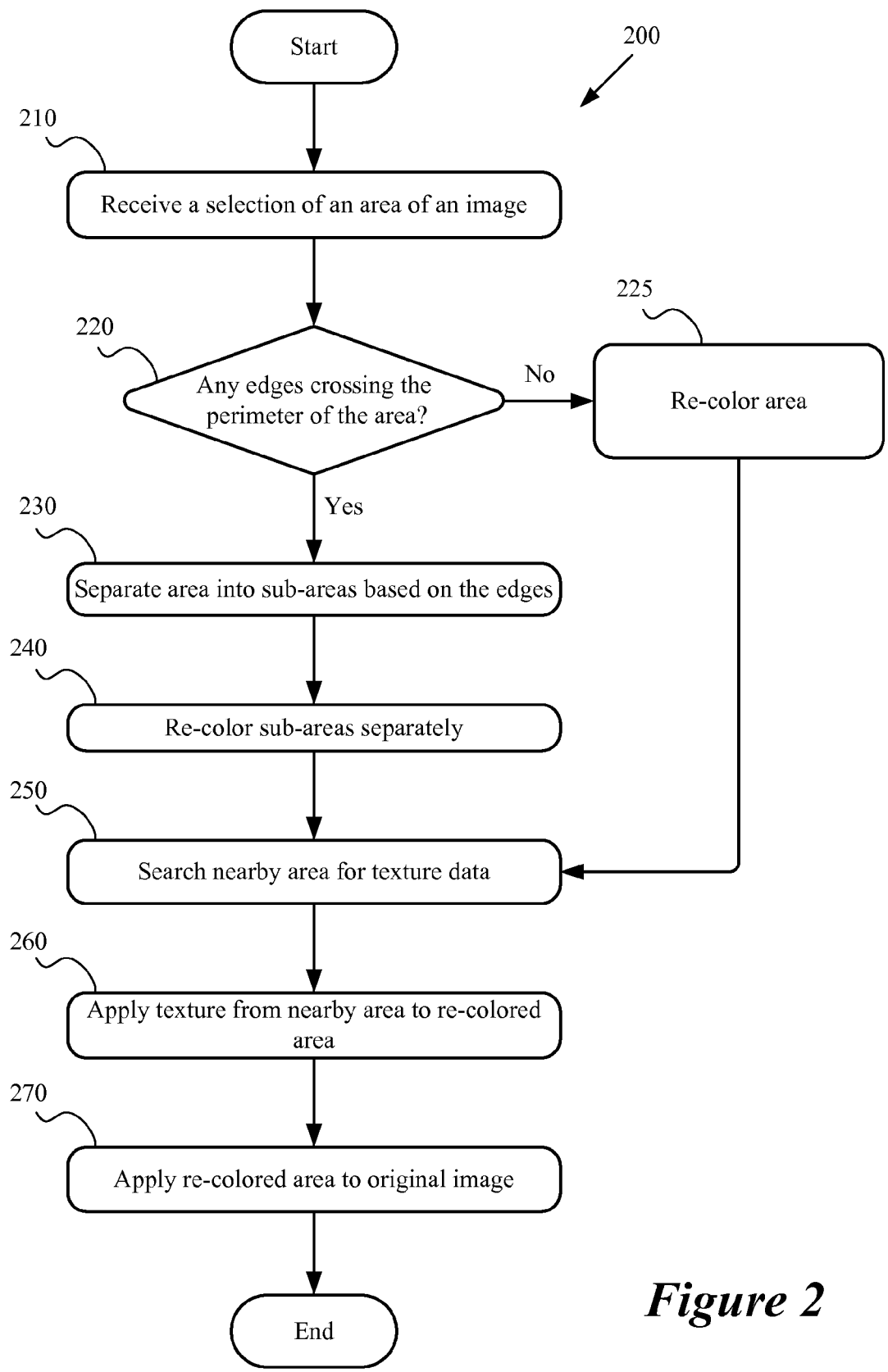
FIG. 2 illustrates a flowchart of the blemish removal tool of some embodiments.

FIG. 2 illustrates a blemish-removal process 200 of some embodiments of the invention. An image-editing application performs this process in some embodiments. Initially, the process 200 receives (at 210) a selection of an area of an image. The selected area typically contains a blemish that a user of the image-editing application wants to remove from the image.

Figure 3:
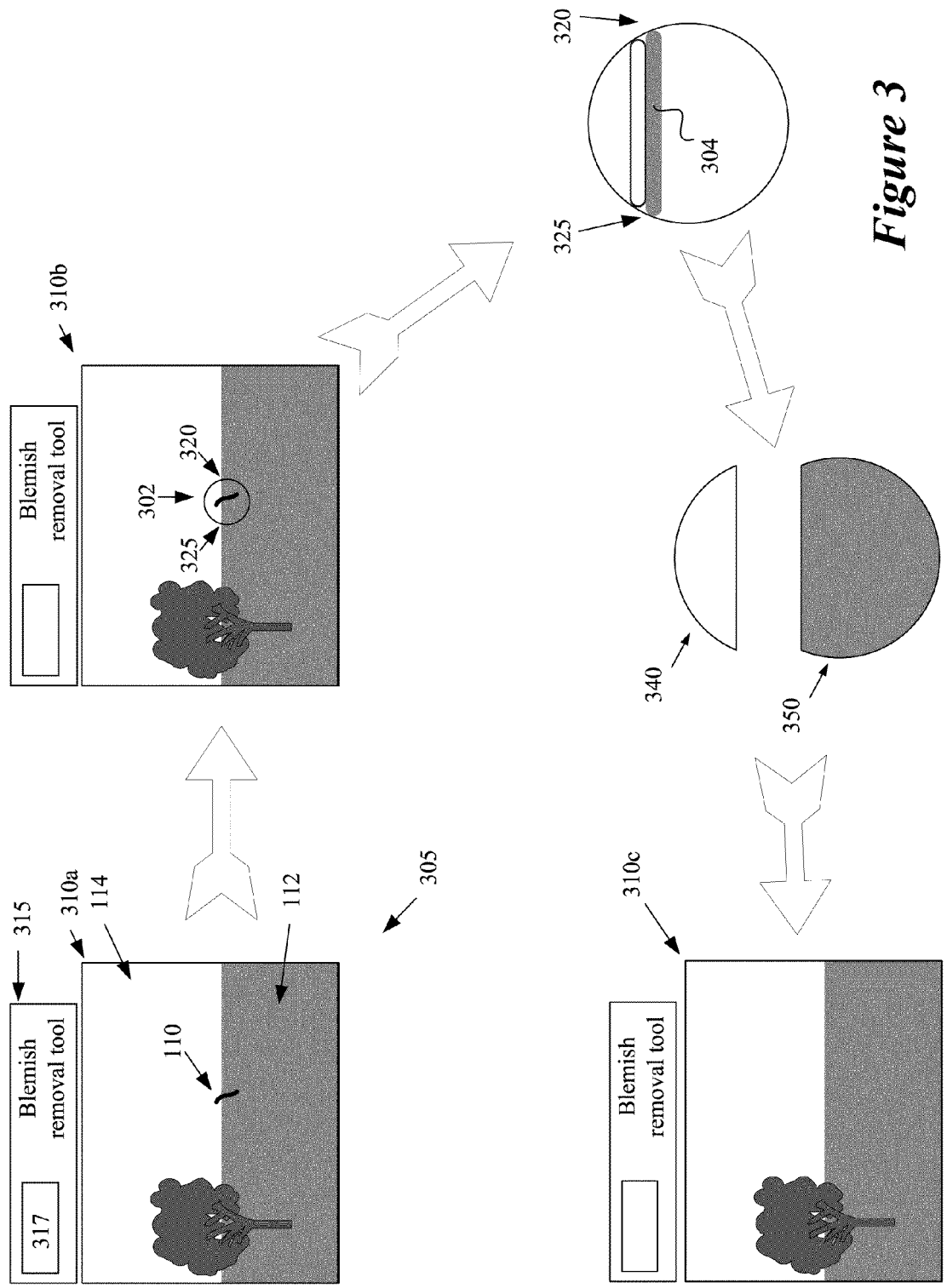
FIG. 3 illustrates the effect of the blemish removal tool of some embodiments.

One example of such a blemish is illustrated in FIG. 3. This figure illustrates a user interface 305 of an image editing application. The user interface provides a display area 310a and a blemish removal tool 315. In this figure, the display area displays the same pastoral scene 100 that was previously illustrated in FIG. 1. As before, this pastoral scene is disturbed by a worm 110 poking up out of the ground 112, and blocking part of the ground 112 and the sky 114. The blemish removal tool 315 of the image editing application, when selected, provides a shaped cursor that the user can place over, expand over, or otherwise position on top of an area containing a blemish in an image. In the example, the selection of the blemish removal tool provides the user with a circular cursor that the user has placed around the worm in display area 310b. Also, in this example, the blemish removal tool is selected by clicking button 317. One of ordinary skill will realize that the cursor could be square, or rectangular, or any other shape in some embodiments.

After receiving (at 210) the selection of an area in the image, the process determines (at 220) whether there are any edges in the selected area. In some embodiments, the process looks for edges that by (1) identifying edge-intersects at the boundary of the selected area in the image and then (2) pairing up matching edge-intersects in order to extrapolate one or more edges that cross the selected area. In some embodiments, a potential edge-intersect is a region on a boundary of the selected area that has two different characteristics on two sides of the region; in other words, these embodiments define edges to be places where two or more regions with different characteristics meet. The blemish removal tool of some embodiments can detect straight or curved edges, as well as edges that change color, texture, or brightness as they traverse the selected region.

As described in more detail below, some embodiments do not measure the curvature directly, but instead measures each edge's direction at the point of intersection with the boundary of the selected area. If two edge intersections are found to match but are not co-linear, a parametric spline or similar curved line is used to connect them so that the edges' locations and directions are matched at either end. In some embodiments, the edge-intersects are extrapolated into lines that join the edges and separate the selected area. In some embodiments, these lines may be straight or curves, including complicated curves such as parametric splines.

If the process 200 identifies (at 220) no edges, it then uses (at 225) any one of existing blemish removal processes to replace the colors of the entire selected area as a unit in order to remove any possible blemishes in the area, followed by texture operation 250, described below. On the other hand, when there are edges in the selected area, then the process (at 230) separates the selected area into sub-areas based on the edges that it identified at 220. Each defined sub-area is bound by the boundary of the selected area and/or by the edges extrapolated by the process 200.

The separation of the selected area into sub-areas is illustrated in FIG. 3. The blemish removal tool finds edge-intersects 320 and 325 where regions of different colors meet and pass through the perimeter of the selected area 302. The edge between the regions is extrapolated and colored separately for each side. Based on the extrapolated, two-sided edge 304, the selected area is divided into sub-areas 340 and 350.

To replace the colors of the interior of the selected area, the process 200 of different embodiments performs different operations at 240 (or at 225). For instance, several embodiments are described below that perform a blurring operation to replace the colors of the interior of the selected area. However, one of ordinary skill in the art will realize that in other embodiments the process 200 replaces the colors by performing other blending/smoothing operations on the area (or sub-areas), or by some other pixel color replacement technique. Thus, the described embodiments below that disclose blurring operations, also disclose methods using any other blending/smoothing operations.

This specification describes some embodiments as blurring the sub-areas separately. In other embodiments, the process of blurring sub-areas separately involves performing an operation on the entire area at once, but with the sub-areas divided from each other by pixels that are preset before blurring the area. In other words, in some embodiments, the inpainting of an area with sub-areas defined by edges with pixels of set color values automatically results in separation into sub-areas. The separation happens by virtue of the fact that inpainting does not create bleedover between areas once the pixels between them have been given set color values. Anywhere in this specification that separation into sub-areas that are separately blurred is indicated, blurring the entire area in parallel with separate regions being blurred separately by virtue of the initial conditions (pixels of set values separating the sub-areas) can be used instead while remaining within the scope of the invention.

After 230, the process performs blur operation 240 for each of the areas designated at 230. In some embodiments, the blur operation is performed by making a blurring mask that is transparent except for the perimeter of the selected area. The transparent pixels of the interior of the selected area are then replaced by pixels whose colors are extrapolated from the colors of the pixels on the perimeter of the selected area. Then the mask is applied to the original image, replacing the selected area with a blurred area.

FIG. 3 illustrates an example of the blur operation of some embodiments. Specifically, it shows sub-areas 340 and 350 separately blurred (filled with colors extrapolated from the perimeters of the sub-areas).

After performing the blur operation (at 240), the process searches (at 250) for texture data to add to the blurred selected area in order to compensate for the unnatural smoothness that the simple blurring operation creates in the selected area. In some embodiments, the process searches for texture in an area near the selected area, or near sub-areas defined at 230.

In some embodiments, the process searches for a texture source area by determining a relatively smooth area near the selected area. After identifying the texture, the process applies (at 260) the identified texture to the area. In some embodiments, the texture is aligned with the image in the same orientation as the texture source area. After 260, the process (at 270) applies the blurred area to the original image and then the process ends.

The results of a replacement operation 270 are shown in display area 310c of FIG. 3, in which the worm has been removed from the image in display area 310c. In this example, the worm has been replaced on the top side of edge 304 with the color of the sky 114 and on the bottom side of the edge 304 with the color of the ground 112, because the blemish removal process 200 was able to detect the edge 304 and accordingly was able to blend each sub-area 340 and 350 into the within the region based on its own colors.

As mentioned above, the blemish removal tool of some embodiments can be incorporated into any image editing application by way of a plug-in, applet, or direct function incorporated within the application itself. Accordingly, different image editing applications, such as Apple Aperture®, Apple iPhoto®, Adobe Photoshop®, and Adobe Lightroom® may each implement the blemish removal tool described herein.

Such image editing applications typically have several additional functionalities in addition to editing functionalities. For instance, in some embodiments, such an application provides a set of tools for (1) organizing images into different collections of images (e.g., different digital photo albums), (2) organizing the images by tagging images with informative keywords, (3) organizing the images by marking selected images as favorites, (4) organizing the images by rating each image, etc. The image editing application can also organize the images and publish the images on the World Wide Web, or publish the images as individual image prints. The application can also organize the images into a "photo book" of images that are sent over a network in order to publish a custom photo book, where each photo book has several pages that have one or more picture fields for presenting pictures. Different photo books can differ in their size, themes, covers, page designs, page colors, picture-field designs, picture-field layouts, and/or other attributes. In some embodiments, a user can modify the page design, color, frame design, and/or other thematic aspects of a selected photo books.

In addition to stand-alone image editing applications, the blemish removal tool of some embodiments can be incorporated within the functionality of an operating system such as Microsoft Windows® or Apple Mac OS®. Specifically, the blemish removal tool of some embodiments can be a tool that is selectable from any folder that access files within the file system of the operating system. The blemish removal tool can also be incorporated into a portable device such as a digital cameras, iPod®, mobile phone, etc.

In some embodiments, a user can utilize an input device to control the blemish removal tool, such as a mouse, track pad, mouse ball etc. Some embodiments allow other manners of controlling the blemish removal tool. For example, an application applying the tool may receive an input from a touch surface device where the user, via a finger or stylus, moves over an area to smooth the area. For example, a capacitive touch device may allow the user to move a finger over an area to smooth or correct the image. A capacitive touch device may show an image on a touch-enabled screen. Therefore, in some embodiments, the user may simply move their finger, or stylus, directly over the image area to correct the image.

Several more detailed embodiments of the invention are described in the sections below. Section II describes several additional examples of the blemish removal operations of an image editing application of some embodiments. Next, Section III describes several more detailed blemish-removal processes of some embodiments. Section IV then describes the automatic texture mapping process of some embodiments in more detail. Lastly, Section V describes a computer system with which some embodiments of the invention are implemented.

II. Blemish Removal Features

Several features of the blemish removal tool of some embodiments will now be described by reference to FIGS. 4-5. These features are features of an image-editing application in some embodiments. Before describing these features, a brief overview of the image-editing application is provided in sub-section A.

A. Image-Editing Application Overview

Figure 4:
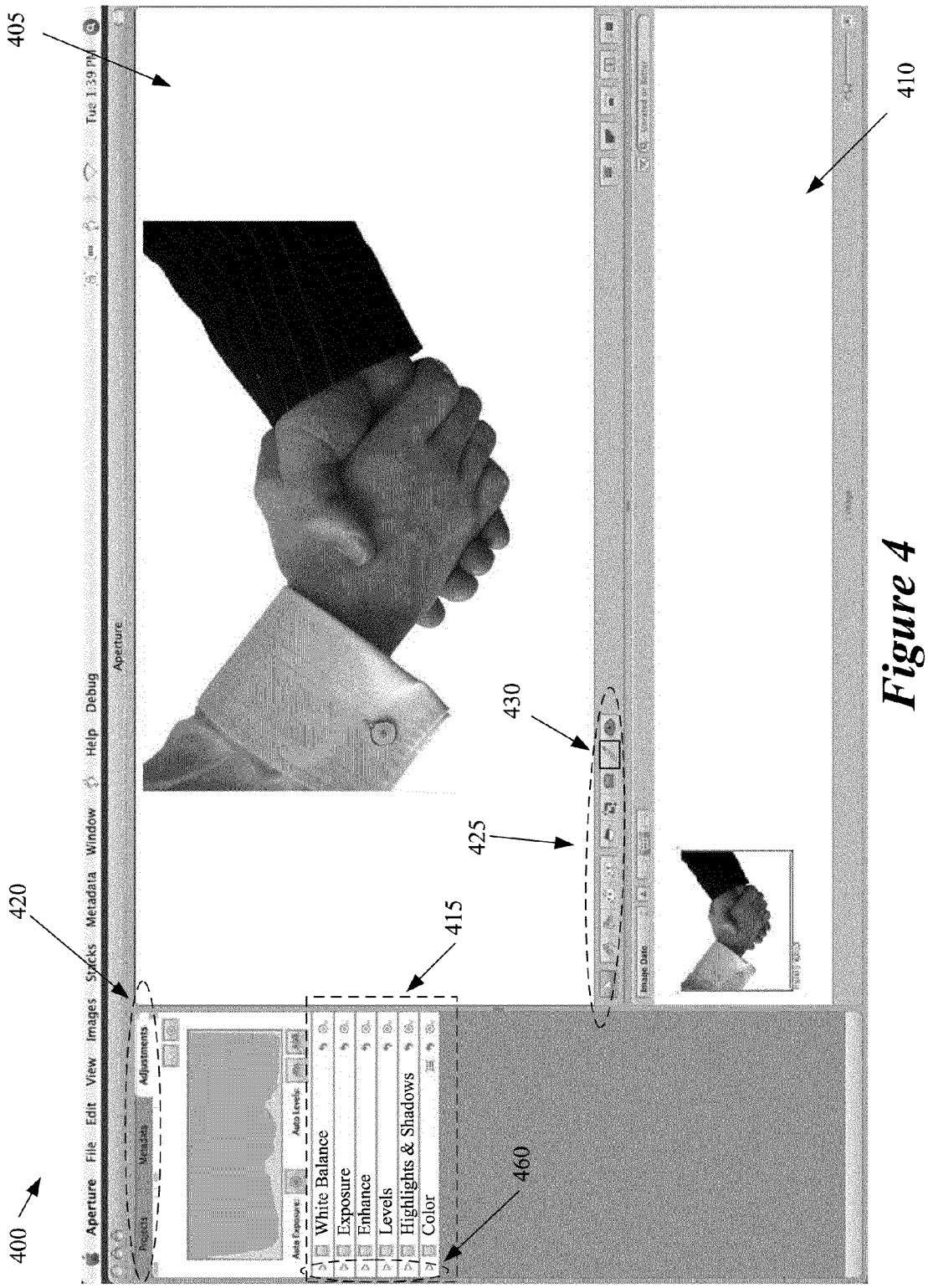
FIG. 4-5 illustrate the GUI of some embodiments.

FIG. 4 shows an image editing application 400 of some embodiments of the invention. The image editing application 400 provides (1) a main display window 405, (2) a thumbnail display area 410, (3) a first set of controls 415, (4) a set of selectable tabs 420, and (5) a second set of controls 425.

The selectable tabs 420 provide a means to access (1) different projects (e.g., different collections of images), (2) metadata relating to images in different projects, and (3) the first set of tools 415 for editing images in different projects. In some embodiments, a user can use the image editing application to define projects by importing images into a device (e.g., into a computer) from an external device (e.g., a camera or a memory card) and/or grouping the images stored on the device into different collection of images.

When a user selects a project (i.e., selects a collection of images), the thumbnail display area 410 displays thumbnail representations of images in the project. The user can scroll through the thumbnail images in the thumbnail display area and select any one of the thumbnail images. Selection of a thumbnail image in the thumbnail display area 410 causes the display window 405 to display a higher resolution image (e.g., the actual image, a high-resolution preview of the image, or a higher-resolution thumbnail image) for the selected thumbnail image. The display window 405 displays this image for review and/or editing.

The first set of controls 415 provide various tools for modifying the image that is displayed in the display window 405. These controls are defined as several sets of collapsible function menus, each containing groups of related functions and parameters for adjusting the effect produced by a function. Each function is expandable and collapsible through the selectable user interface items 460.

Figure 5:
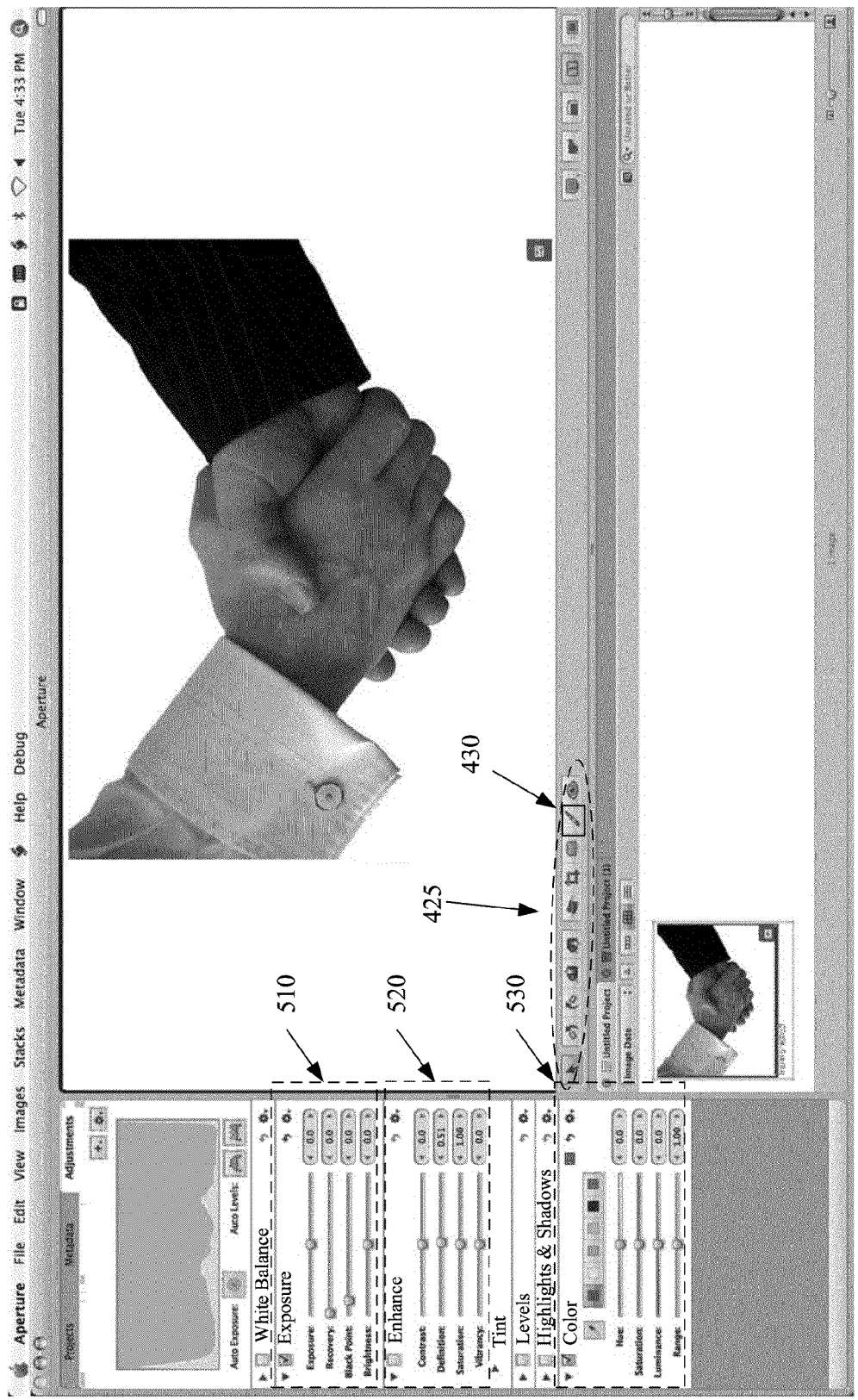

FIG. 5 illustrates the image editing application 400 of FIG. 4 with the collapsible function menus 510, 520, and 530 expanded to show the various functions and parameters for each function menu. In this example, the expanded function menus provide adjustable sliders for adjusting an image's exposure settings (e.g., exposure, recovery, black point, and brightness), enhancement settings (e.g., contrast, definition, saturation, and vibrancy) and color settings (e.g., hue, saturation, luminance, and range). Adjacent to each slider is a user interface text item for direct entry of a numerical value. The user interface text item accepts values within the range of values represented by the user interface slider item.

In addition to the editing tools in the first set of controls 415, the image-editing application provides the second set of controls 425 for editing the image displayed in the display window 405. These tools include tools for rotating, cropping, and red-eye removal. These controls also include the blemish removal tool 430 of some embodiments of the invention. When a user selects the blemish removal tool 430, the cursor changes to a circular indicator for selecting areas of the image in the display window 405.

Figure 6A:
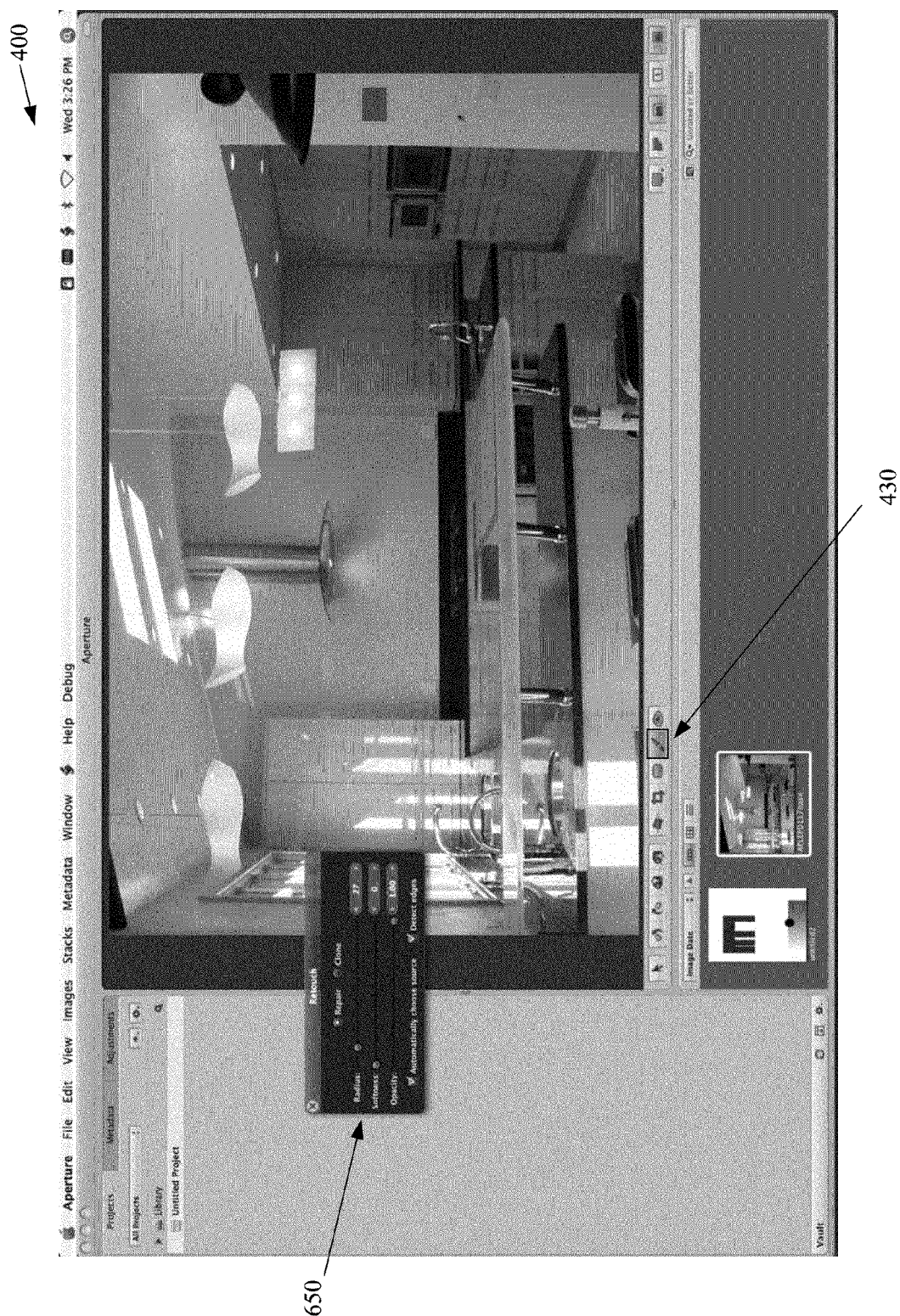
FIG. 6a-6b further illustrate the GUI of some embodiments.
Figure 6B:
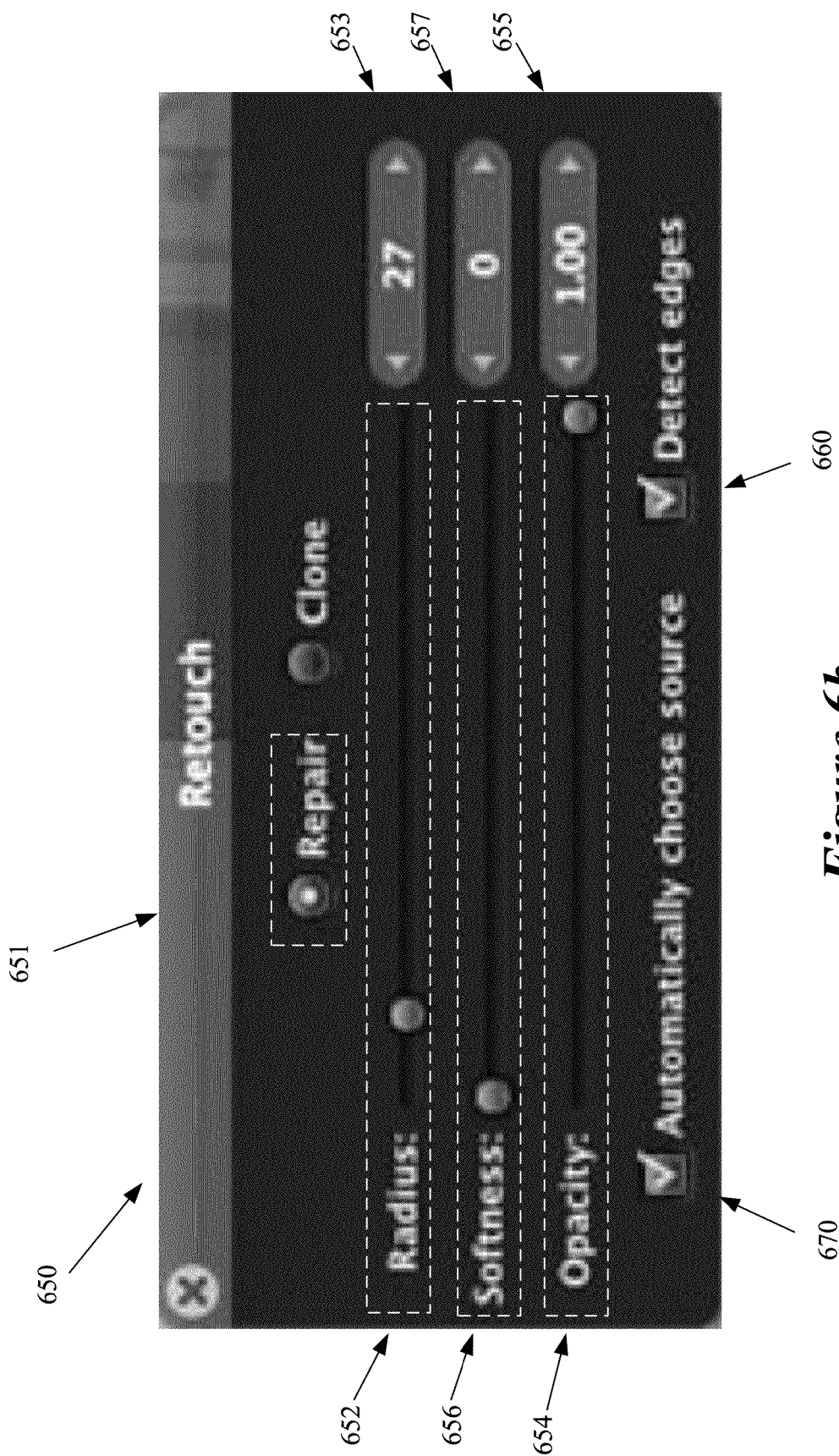

The activation of the blemish removal tool also causes the blemish removal panel 650 to appear. As shown in FIG. 6*b*, the blemish removal panel 650 provides: (1) a repair button 651 for using the repair function, (2) a radius slider 652 and a radius indicator 653 for controlling and displaying the value of the radius of the cursor, (3) an opacity slider 654 and an opacity indicator 655 for controlling and displaying the value of the opacity of the mask that applies the blurred area to the image, and (4) a softness slider 656 and a softness indicator 657 for controlling and displaying the value of the softness of the mask that applies the blurred area to the image. The panel 650 also includes a detect edges check box 660 for turning the function that separates the areas into sub-areas before blurring on and off, and an automatically choose source check box 670 for controlling whether the texture source area will be selected automatically or manually. These features and the operation of the blemish removal tool 430 will now be described by reference to FIGS. 6*a*-16*b*.

B. Edge Detection

Figure 7A:
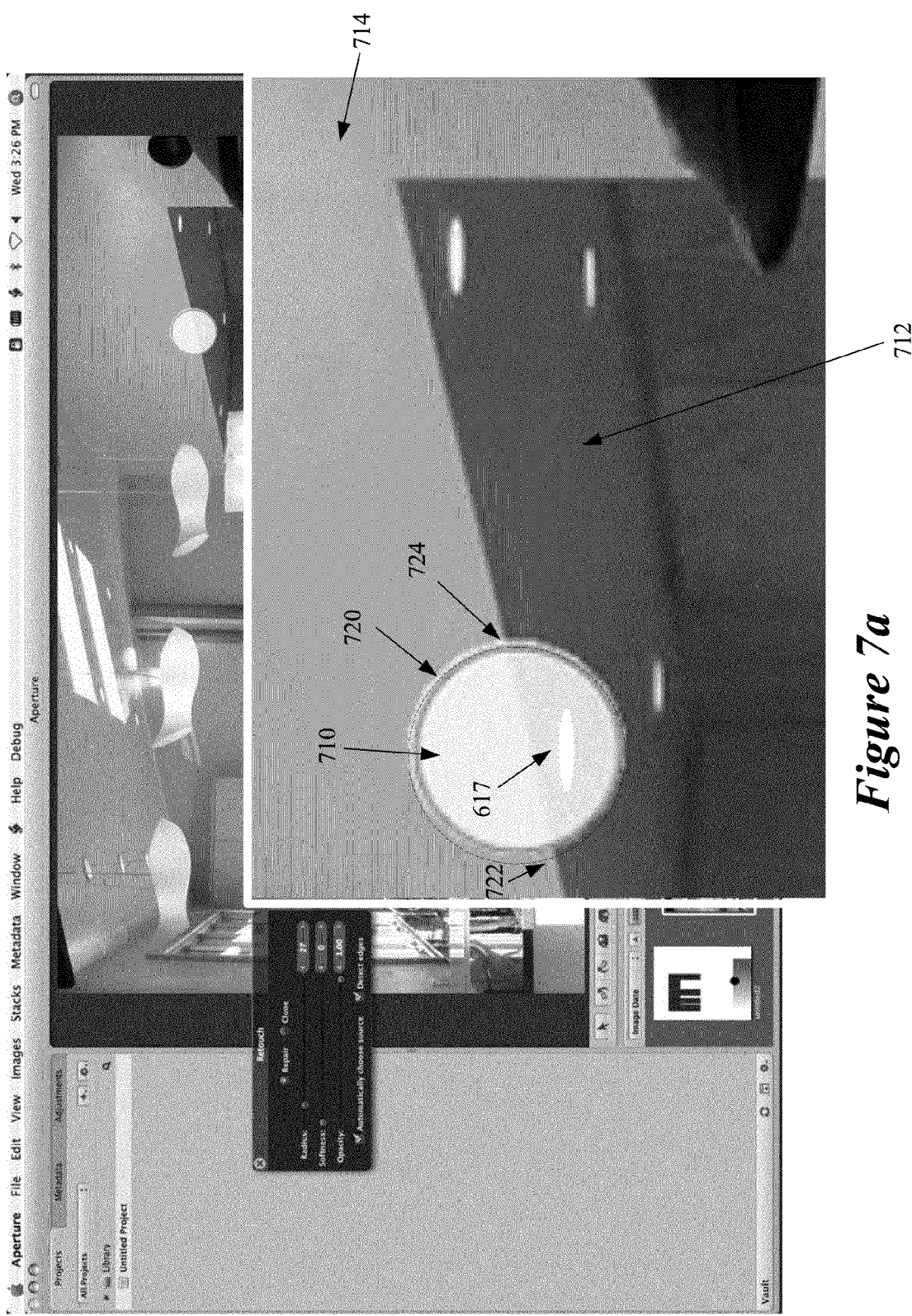
FIGS. 7a-7c illustrate blurring with edge detection.
Figure 7B:
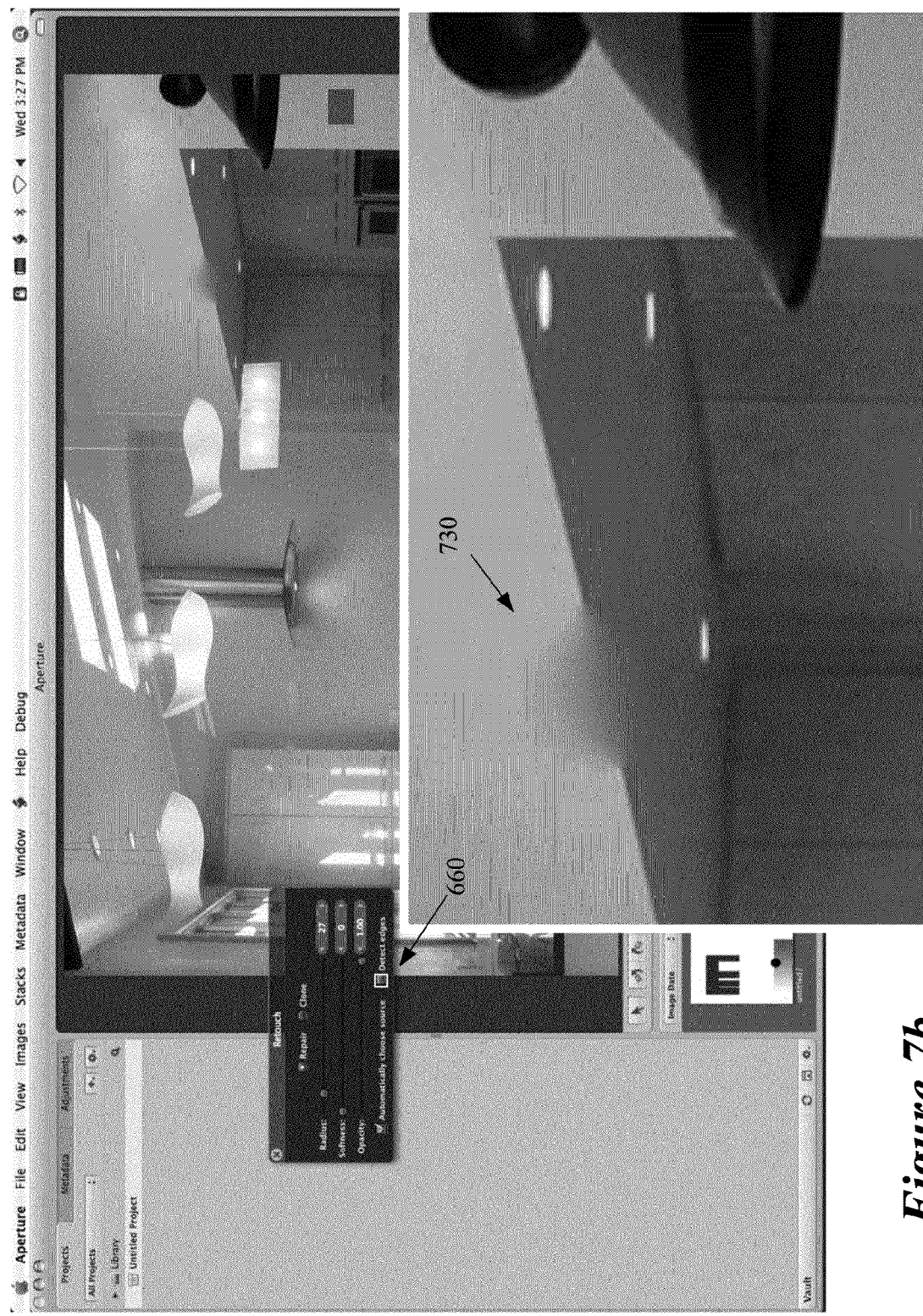
Figure 7C:
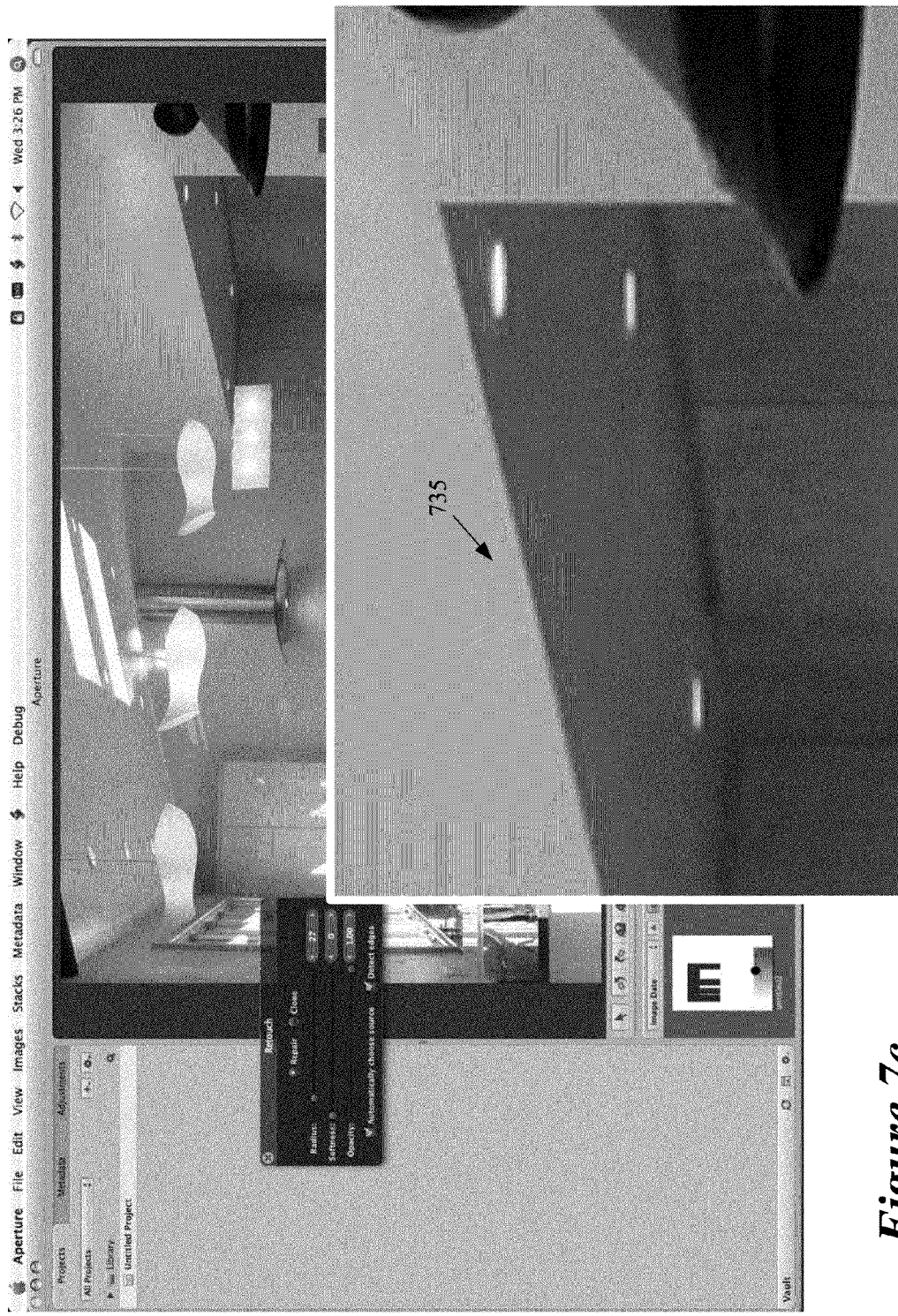

FIGS. 7*a*-7*c* illustrate the effect of separating an area into sub-areas using edge detection before blurring the areas. FIG. 7*a* illustrates an operation of the image editing application 400 with a close-up of the operation overlain on the image editing application 400. The close-up shows selected area 710 surrounded by a circular cursor 720. The selected area 710 is white, which in some embodiments indicates that the selection has been made of the area, but that the blemish removal has not yet been run.

Selected area 710 covers light 617 and overlaps both a wall region 714 and a ceiling region 712. In this example, light 617 is the blemish to be removed. The boundaries of regions 712 and 714 form an edge that intersects the perimeter of selected area 710 at points 722 and 724.

In order to show the effect of edge-detection and sub-area separation, it is necessary to show the results of blurring when edge-detection has been turned off. FIG. 7*b* illustrates the results of blurring without edge detection, as indicated by the unchecking of detect edges check box 660. The figure shows the results of blurring the selected area 710 without using edge detection. Light 617, the blemish, is gone. However, blurred area 730 shows bleed-over between wall region 714 and ceiling region 712.

FIG. 7*c* shows the results of blurring with edge detection, as indicated by the checking of detect edges check box 660. In the figure, once again, light 617 is gone. However, blurred area 735 shows no bleed-over between wall region 714 and ceiling region 712. Thus, the blemish is gone, the edges are intact, and the regions are maintained.

C. Multi-Edge Detection Effect

Figure 8A:
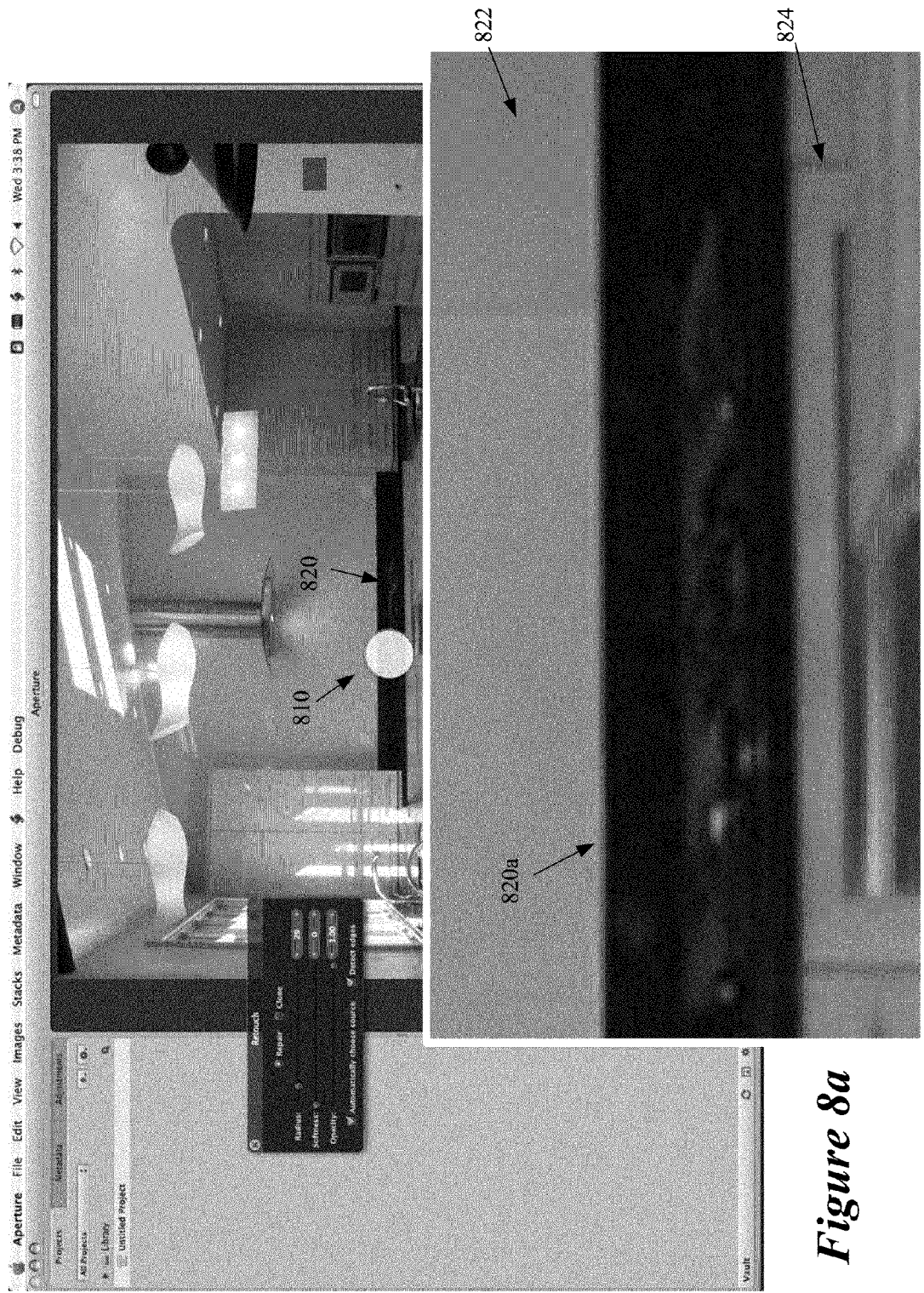
FIGS. 8a-8b illustrate blurring three sub-areas separately.
Figure 8B:
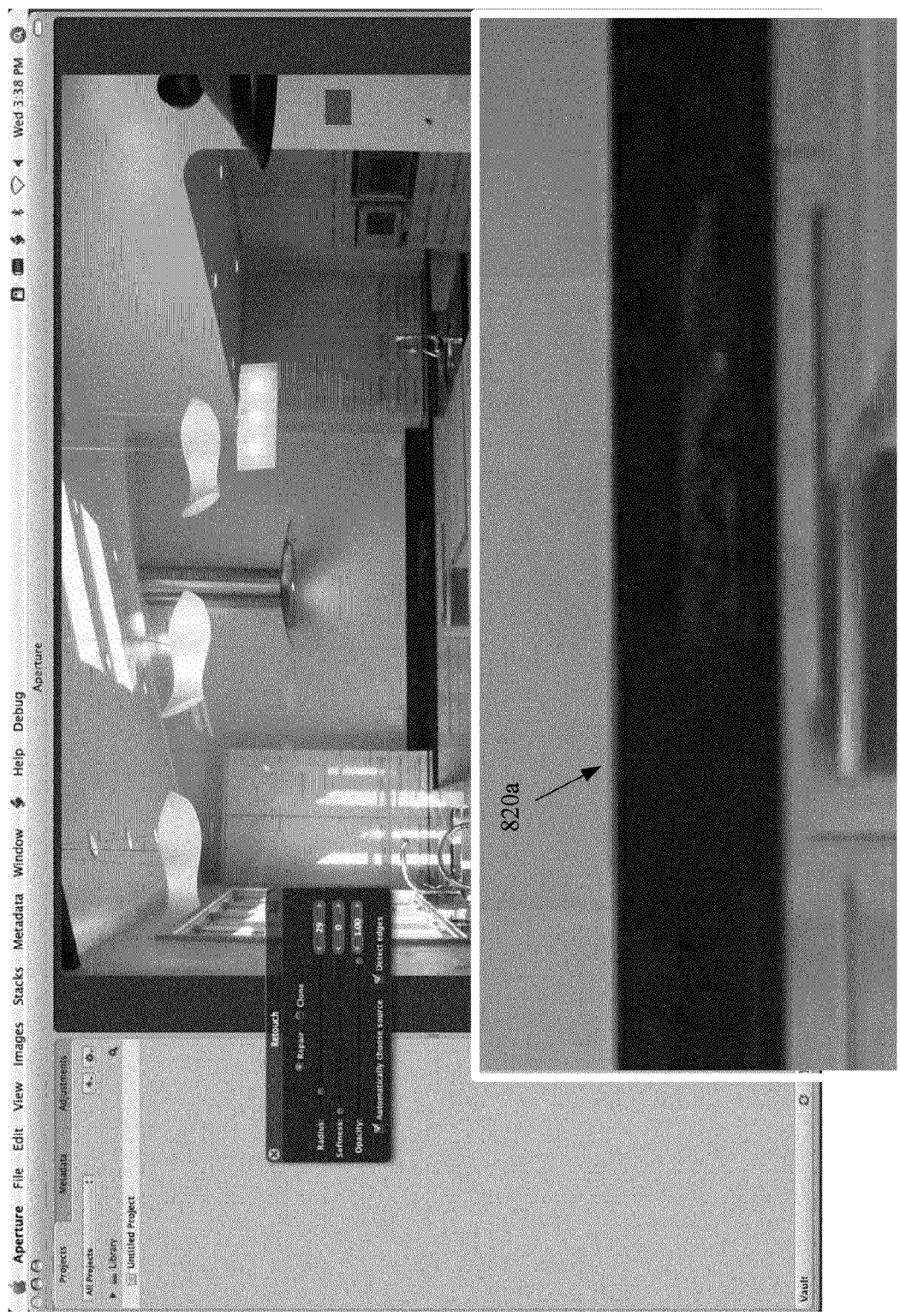

Because some selected areas may overlap more than two regions, some embodiments detect multiple edges within a selected area and divide the area into more than two sub-areas before separately blurring the sub-areas. FIGS. 8*a* and 8*b* provide an illustrative example of blurring three sub-areas separately.

In FIG. 8*a*, selected area 810 covers the left side 820*a* of a stove 820. The selected area overlaps three regions, 1) the left side 820*a* of stove 820, 2) the wall 822 (light blue in the original image), and 3) the oven door 824 (tan in the original image). Though the GUI image shows the white overlay of the selected area 810, the close up image does not show the white overlay of the selected area so that a close-up image of the stove can be seen prior to blurring.

FIG. 8*b* illustrates the effect of blurring the selected area with edge detection. The burner that had been on the left side 820*a* of the stove 820 is gone. The boundary between the wall 822 and the stove 820 and the boundary between the stove 820 and the oven door 824 are intact because the edge-detection separated these areas from each other before blurring them.

D. Thin Lines are not Counted as Edges

In some embodiments, a region must be wider than a certain width at the perimeter of the selected area for the edge detect function to preserve it. Regions that are narrower than the threshold width (e.g., wires in front of an otherwise continuous background), are not separated before blurring.

Figure 9A:
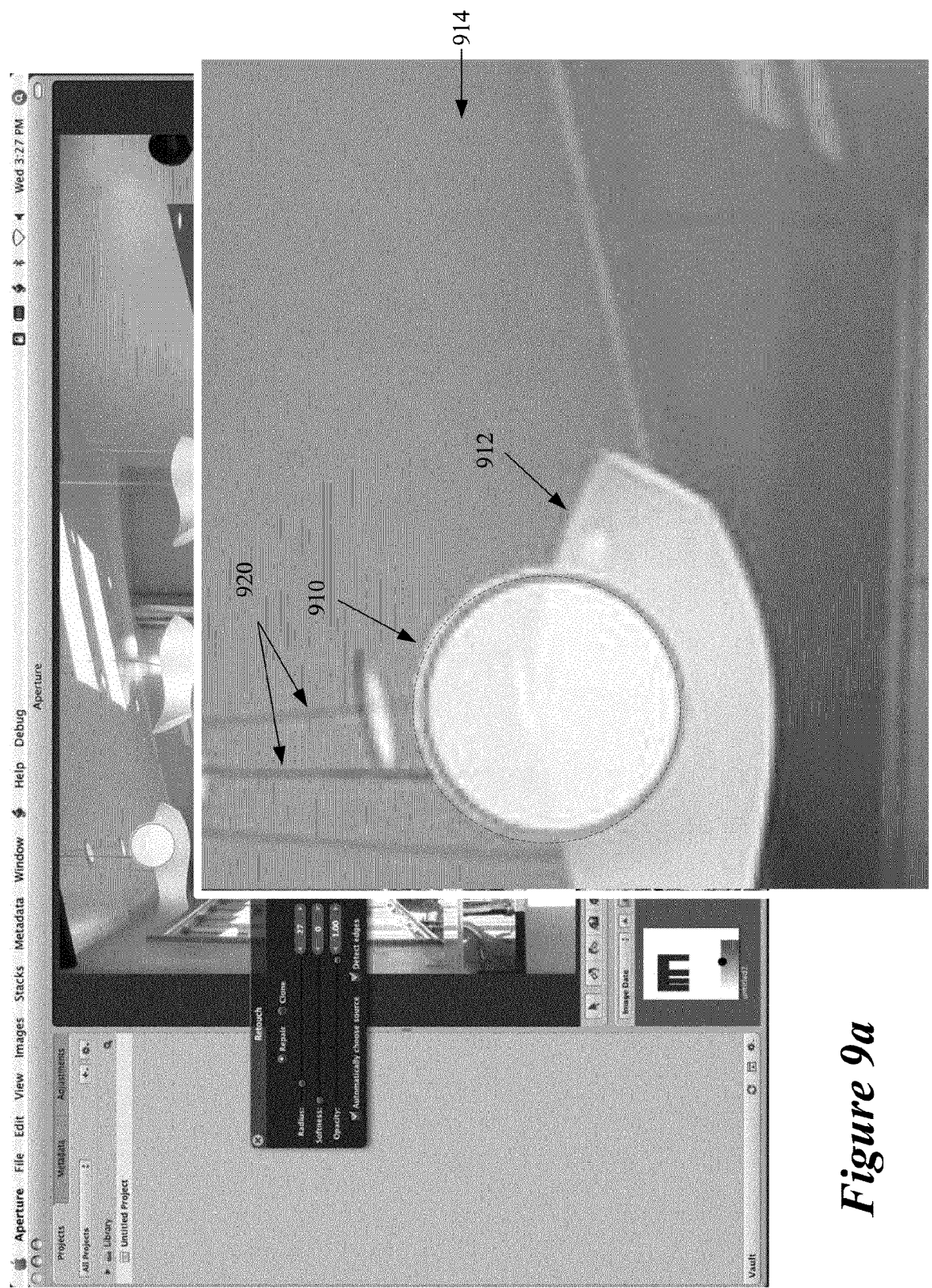
FIGS. 9a-9b illustrate the effect of the blemish repair tool of some embodiments on wires.
Figure 9B:
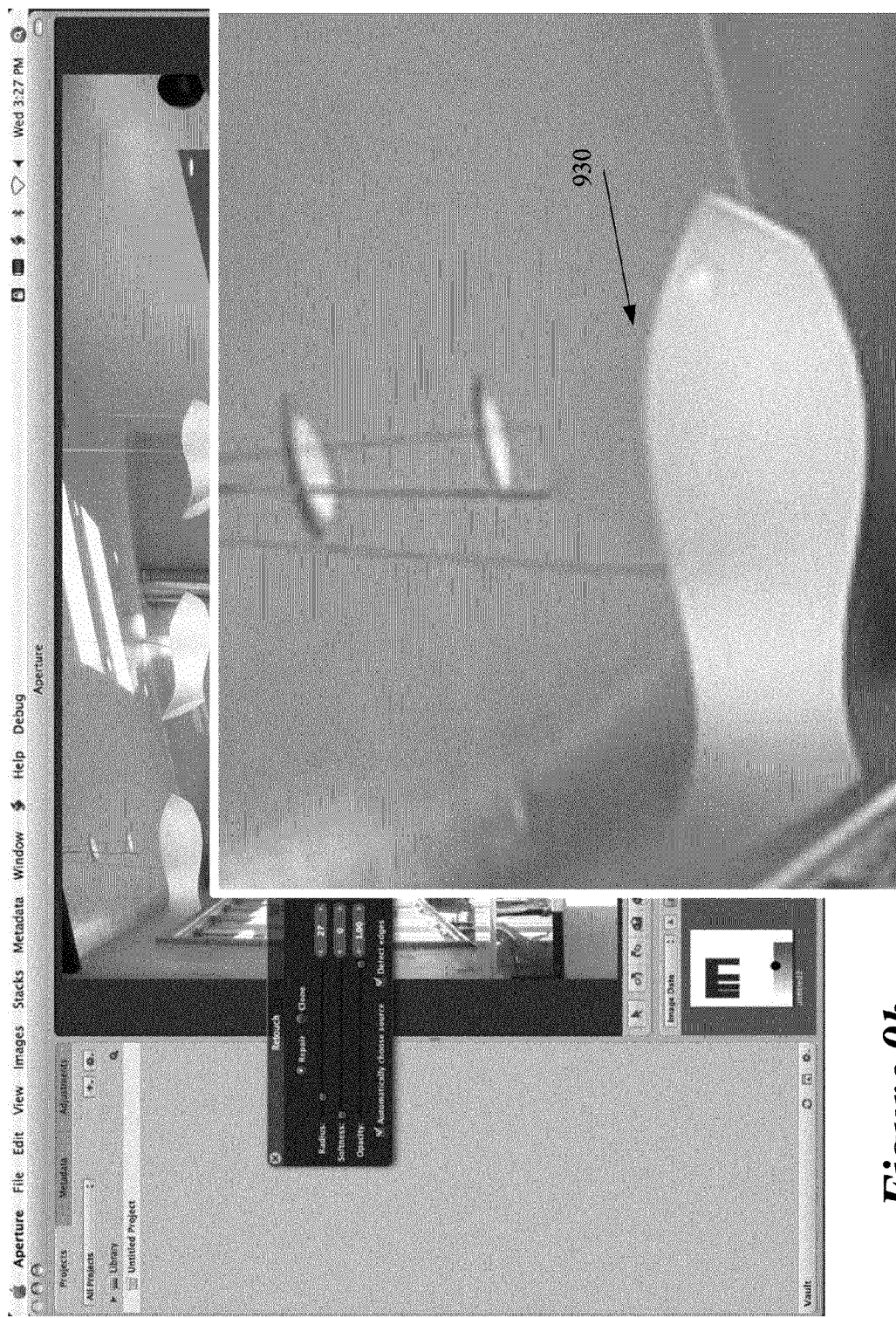

FIGS. 9*a* and 9*b* illustrate the effect of the blemish repair tool of some embodiments on wires that cross the perimeter of a selected area. FIG. 9*a* illustrates selected area 910 that includes part of the fish-shaped light fixture 912 and part of the ceiling 914 behind it. The covered area includes a small circular light and parts of wires 920. The wires pass through the perimeter of the selected area and are a different color than the background, two of the criteria for an edge detection.

FIG. 9*b* shows the area after the blurring operation. The edge 930 between the fish-shaped light fixture 912 and the ceiling 914 is intact, however, the wires that passed through the perimeter of the selected area 910 are blurred out, just as the small circular light that was entirely inside the perimeter is blurred out. The thinness of the wires caused the process to ignore them when it was detecting edges, so they were treated like the rest of the interior of the selected area.

E. Curved Boundaries are Extrapolated

The boundary between the fish-shaped light fixture 912 and the ceiling 914 is curved along the part of its length that passes through selected area 910. However, the curve of the fixture 912 looks the same in FIG. 9*b* as it did before the blurring. This is because in some embodiments, the edges of boundaries are extrapolated as curves when separating sub-areas.

The curve of the fixture 912 was much the same after the blurring as it was before. This is because the curve extrapolated from the intersections of the edge of the fixture 912 and the perimeter of the selected area 910 happens to be a close match for the curve that was there before the blurring. The closeness was not because the process traced the curve of the fixture 912 through the selected area.

Figure 10A:
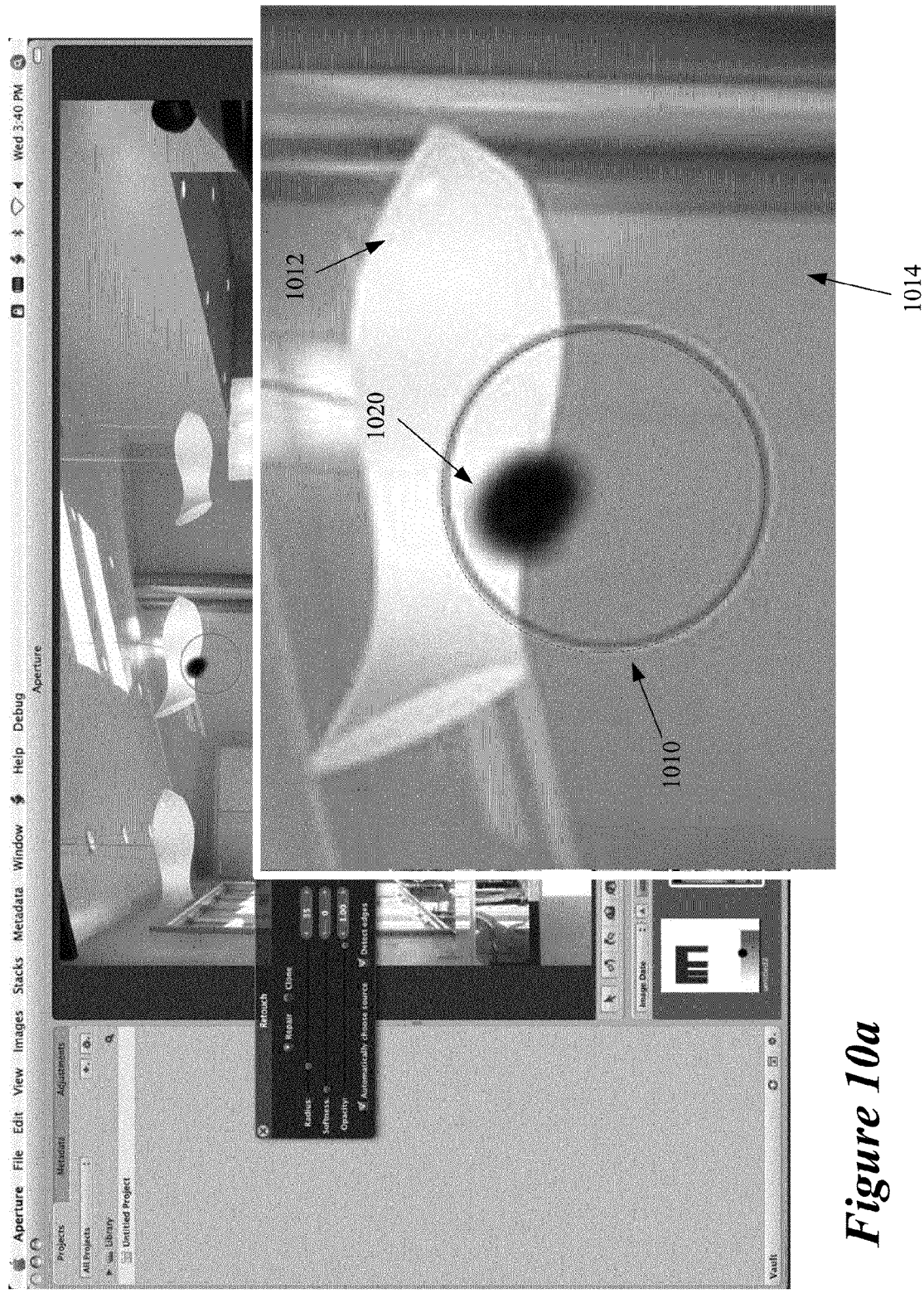
FIGS. 10a-10b illustrate the effect of the blemish removal tool of some embodiments on curved edges.
Figure 10B:
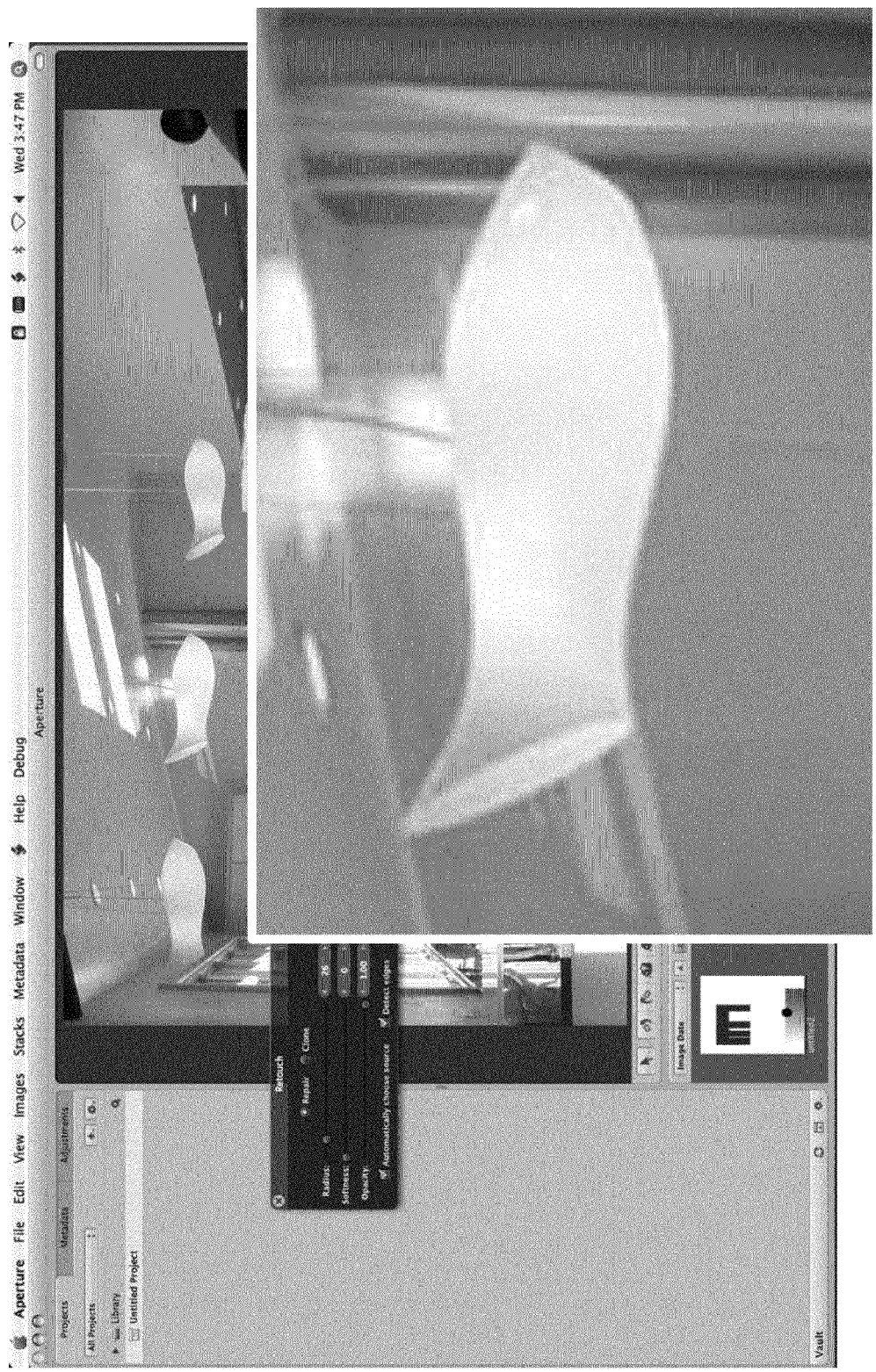

FIGS. 10*a* and 10*b* illustrate the effect of extrapolating a curve from the edge-intersects more clearly. In FIG. 10*a*, a selection cursor 1010 surrounds a blot 1020 that crosses the boundary between fish-shaped light fixture 1012 and wall 1014. The blot 1020 deforms the shape of the boundary, but in FIG. 10*b*, after the blemish removal tool has been activated, the curve of the fish-shaped light fixture 1012 is very close to what it is in images that never had a blot 1020 (and where the blemish removal tool had not been used).

The extrapolation of boundaries in some embodiments does not always maintain existing curvature. For example, where the boundaries meet at angles within the selected area 1110, a curved boundary may be extrapolated where none exists in the unedited picture.

Figure 11A:
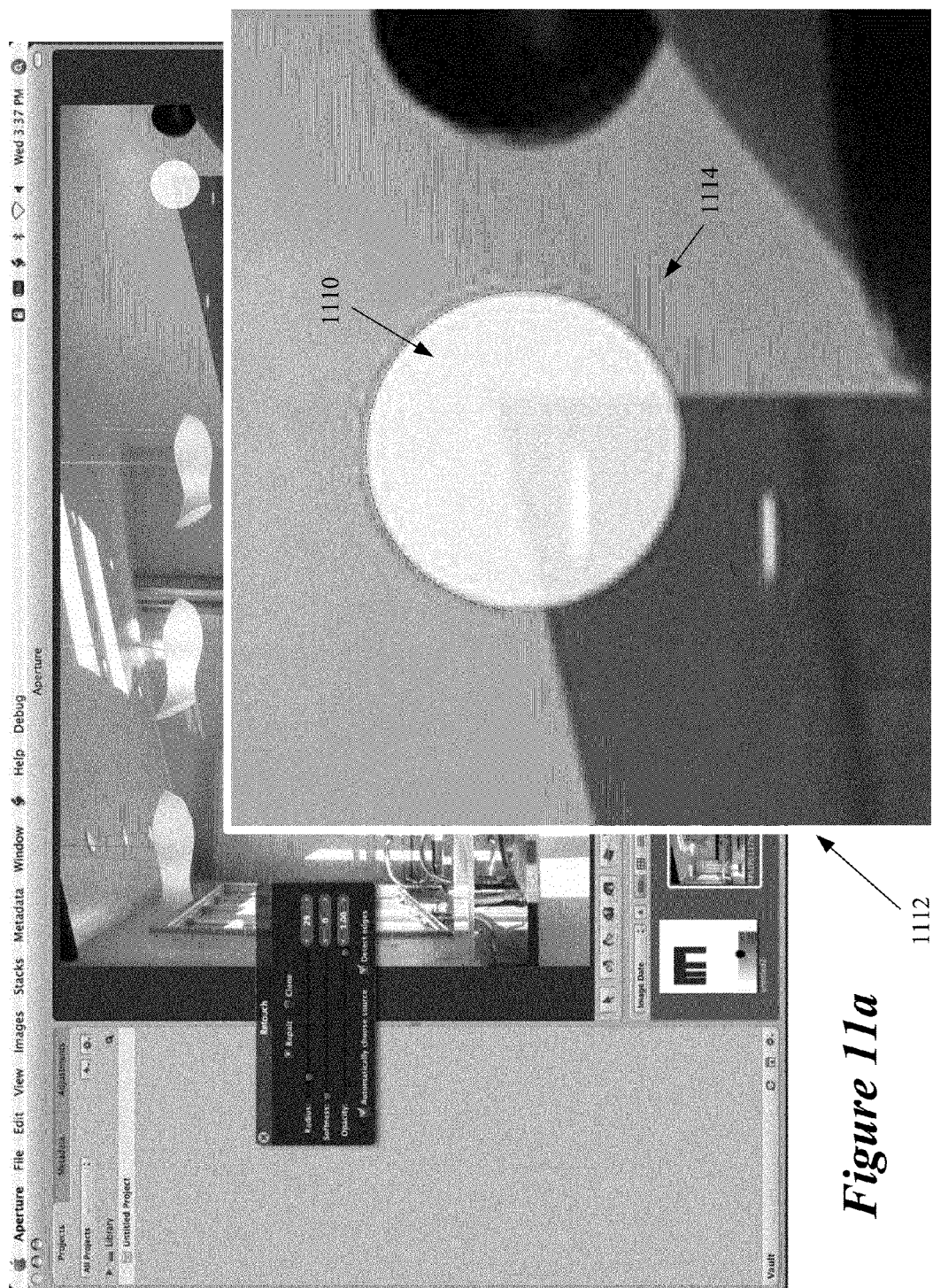
FIGS. 11a-11b illustrate the effect of the blemish removal tool on edges that are not initially curved but are extrapolated as curved.
Figure 11B:
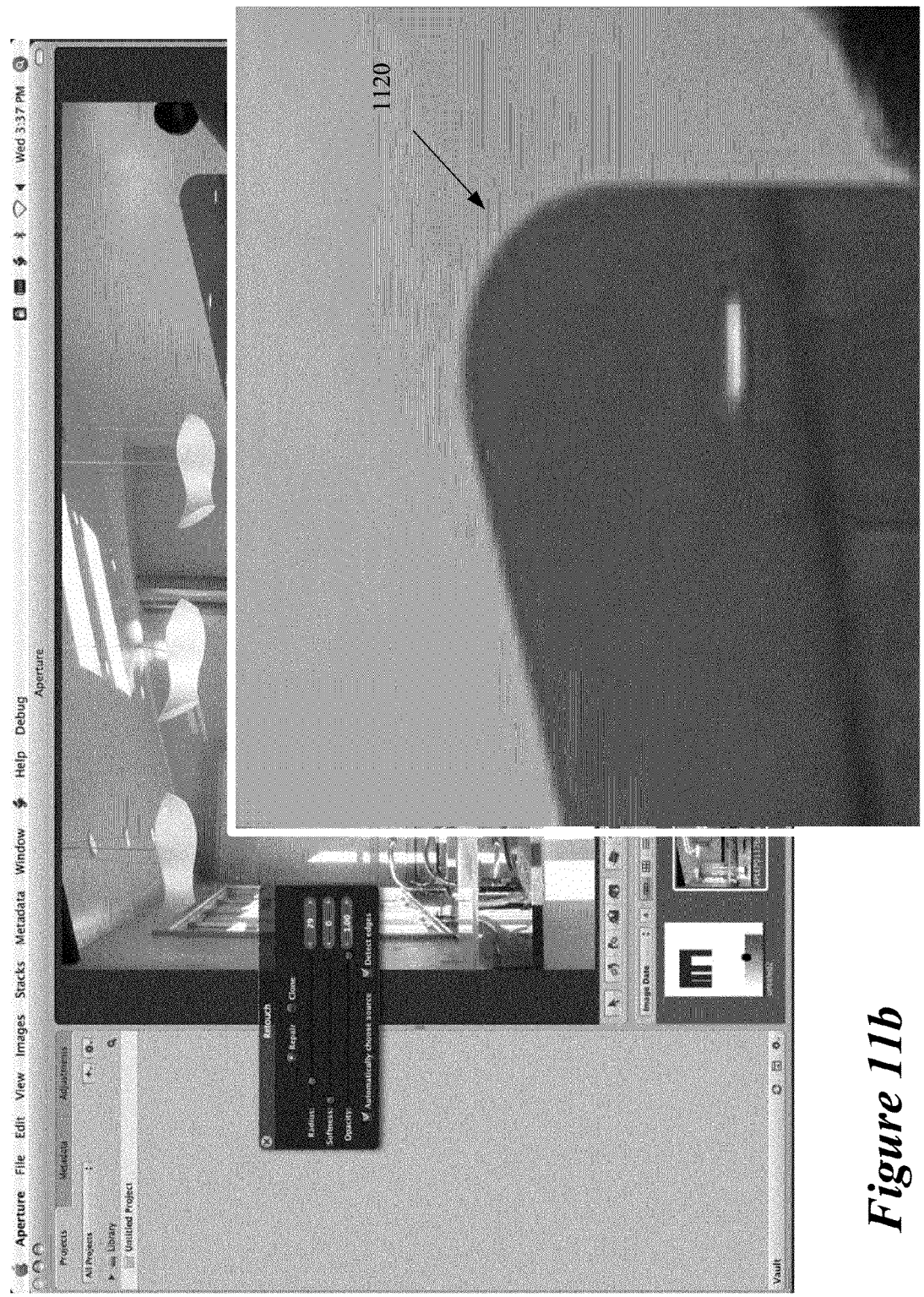
Figure 11C:
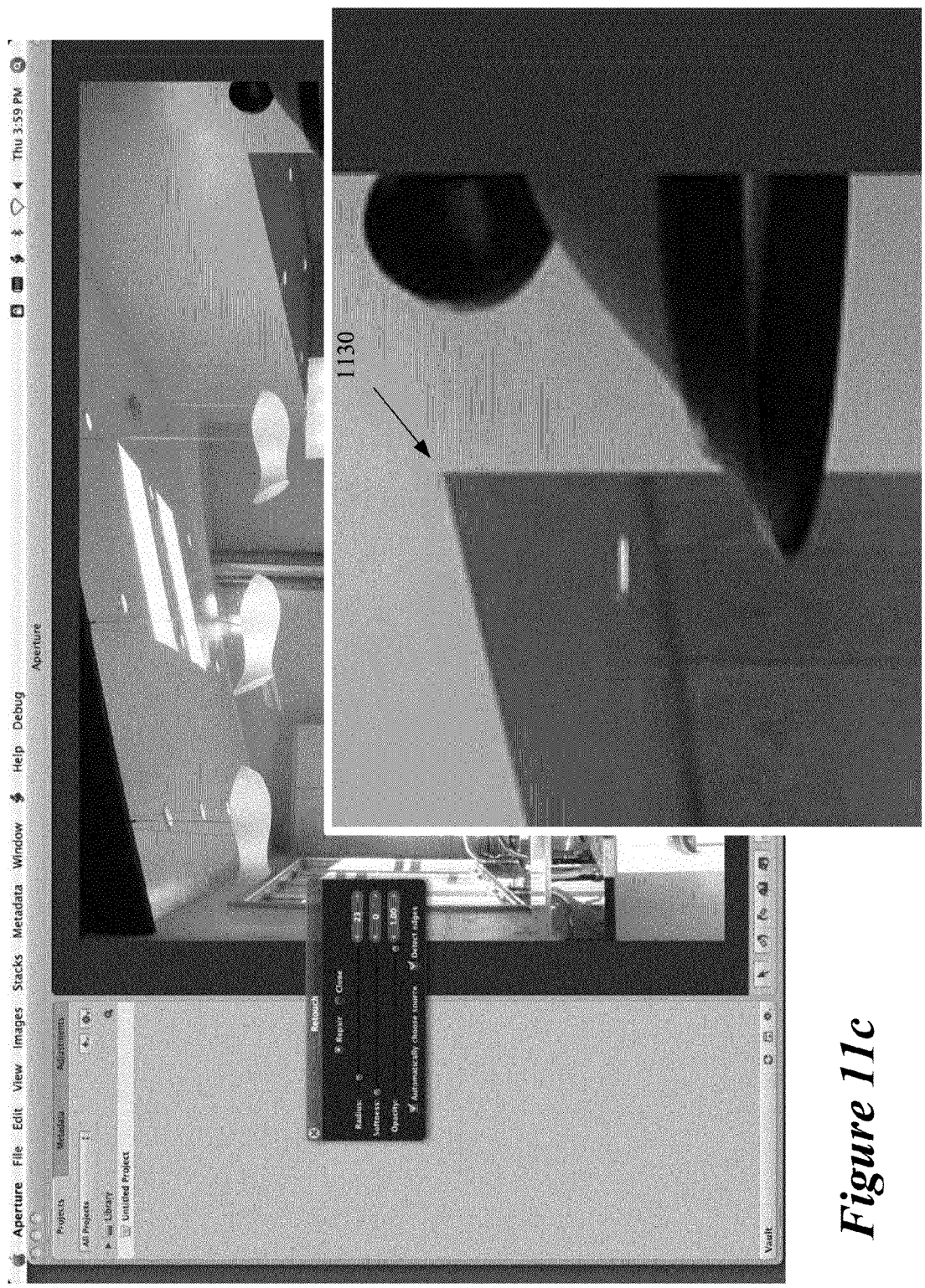
FIG. 11c illustrates the effect of the blemish removal tool on edges that intersect before and after blurring.

This is illustrated in FIGS. 11*a* and 11*b*. FIG. 11*a* shows a selection area 1110 that covers part of the boundary between ceiling 1112 and wall 1114 as well as a circular light. Under the selection area, the boundary is a corner, the edges continue straight through the selected area until they meet at a point.

FIG. 11b shows the same area after a blurring operation. The process of this embodiment has extrapolated a curved boundary 1120, rather than an angular one. The circular light is gone, but the angle of the unedited picture is not maintained. In some other embodiments, such as the one illustrated in FIG. 11c, the process is able to extrapolate lines that maintain the angle 1130 between regions and meet at a point, as the lines in the unedited image do. Such embodiments maintain the point while still removing the blemish and the rest of the interior of the selected area. A more detailed description of such embodiments may be found in Section III below.

F. Boundary Colors are Extrapolated

The previous figures illustrated the extrapolation of edges from the edge intersects. In some embodiments, the process can extrapolate the colors of the edges as well as, or in some embodiment instead of, the shape of the edges.

Figure 12A:
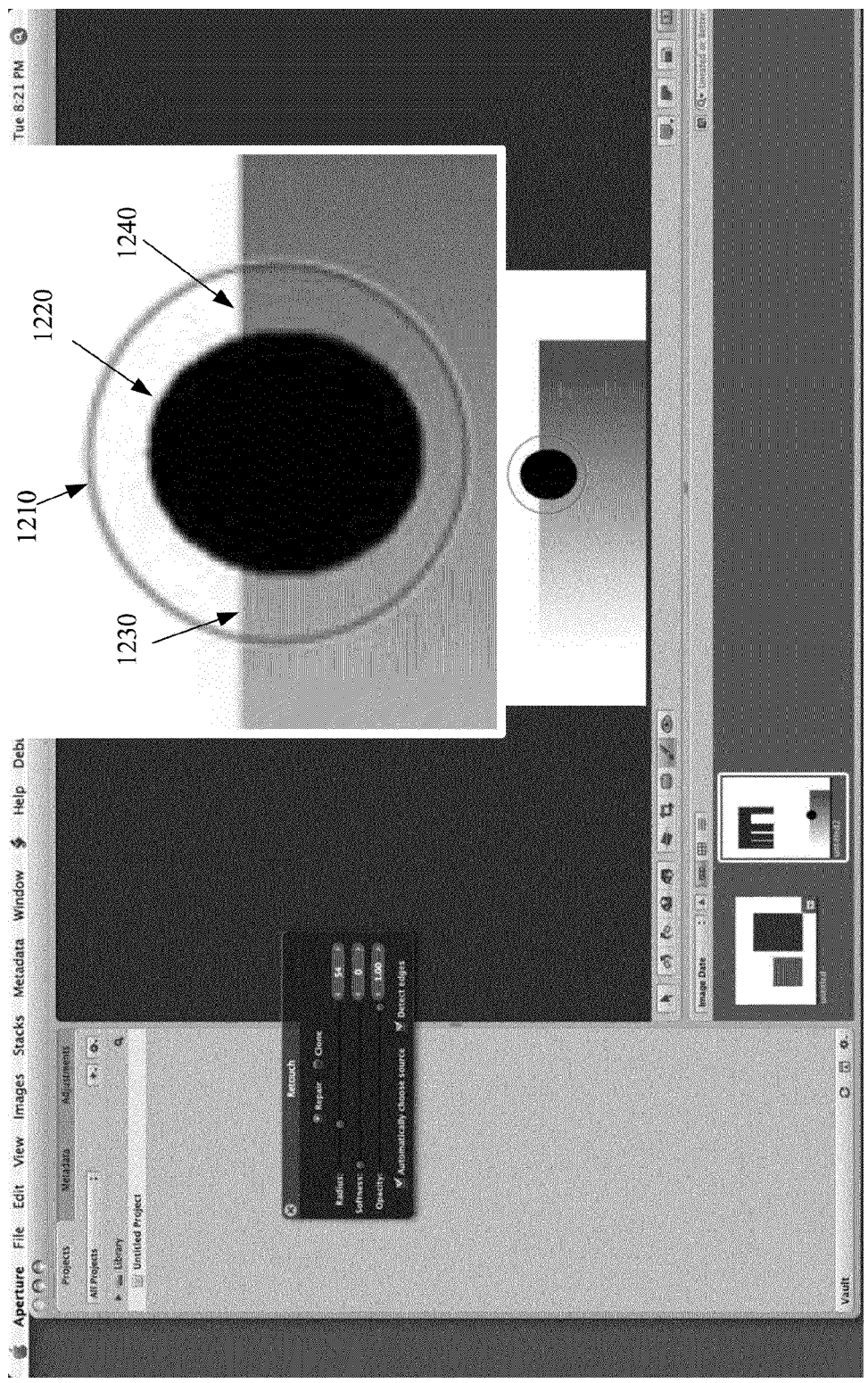
FIGS. 12a-12b illustrate an embodiment that extrapolates the colors of the edges on each side of the selected area.
Figure 12B:
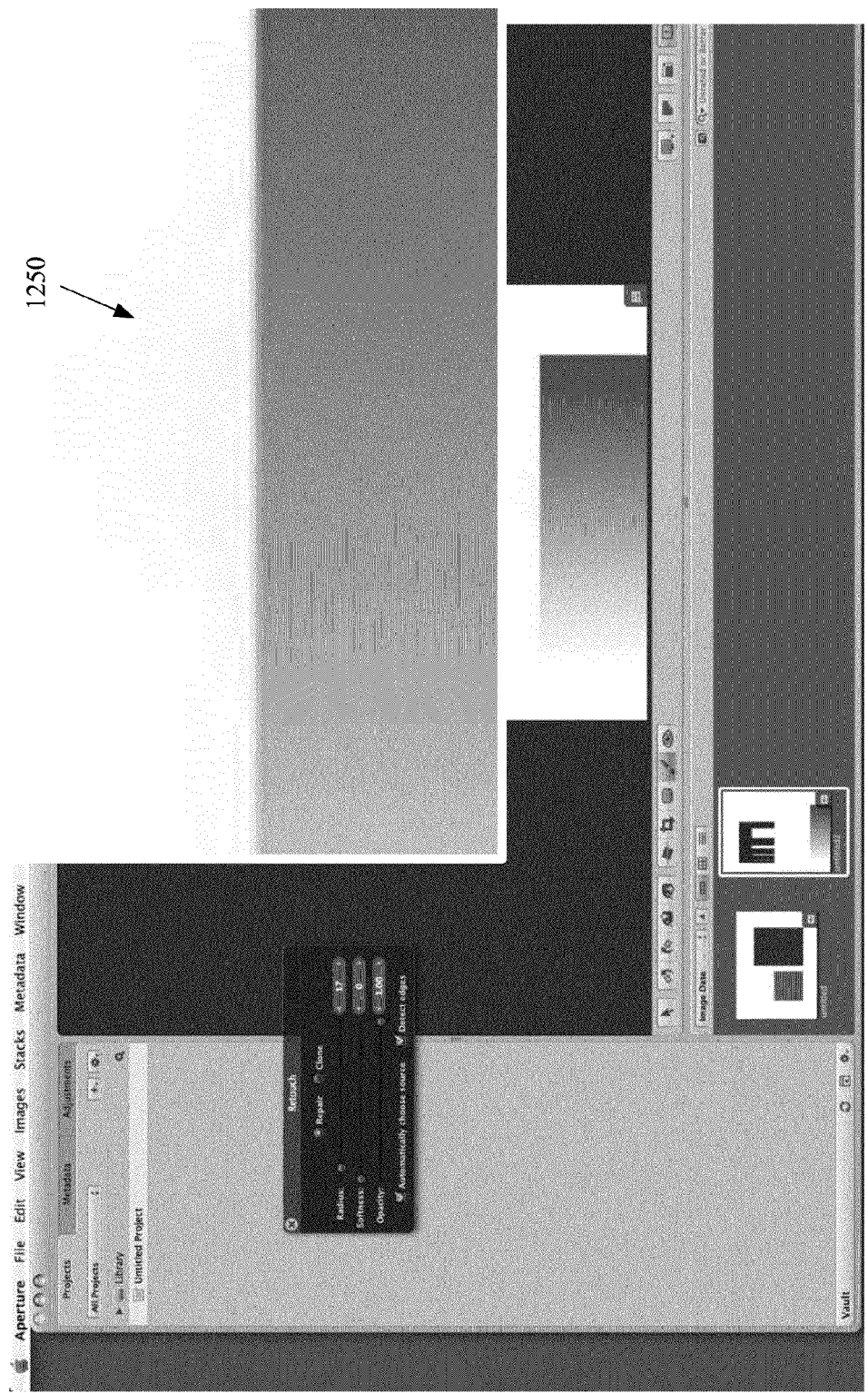

FIGS. 12a and 12b illustrate extending and blending the colors of the edges on each side of the selected area. In FIG. 12a the cursor 1210 surrounds an area containing blot 1220, while the edges 1230 and 1240 extend through the perimeter of the area inside cursor 1210, but not deep into the area. This demonstrates that the color information the blemish removal tool uses to extrapolate the colors along the edge comes from the edge-intersects, rather than the colors within the selected area.

FIG. 12b shows the effect of the blemish removal tool on the area within the cursor 1210. Location 1250 shows the area with blot 1220 gone and with colors that shade evenly from one side of the area to the other.

G. Opacity and Softness

In some embodiments, the blurred area does not completely replace the previous selected image, instead the blurred pixels are averaged with the pre-existing image. The weighting of the average depends on the opacity parameter. In some embodiments, the process provides an adjustable control for setting the opacity. All previous figures showed opacity of the tool at one hundred percent. Thus, the blurred area replaced the covered area entirely.

Figure 13A:
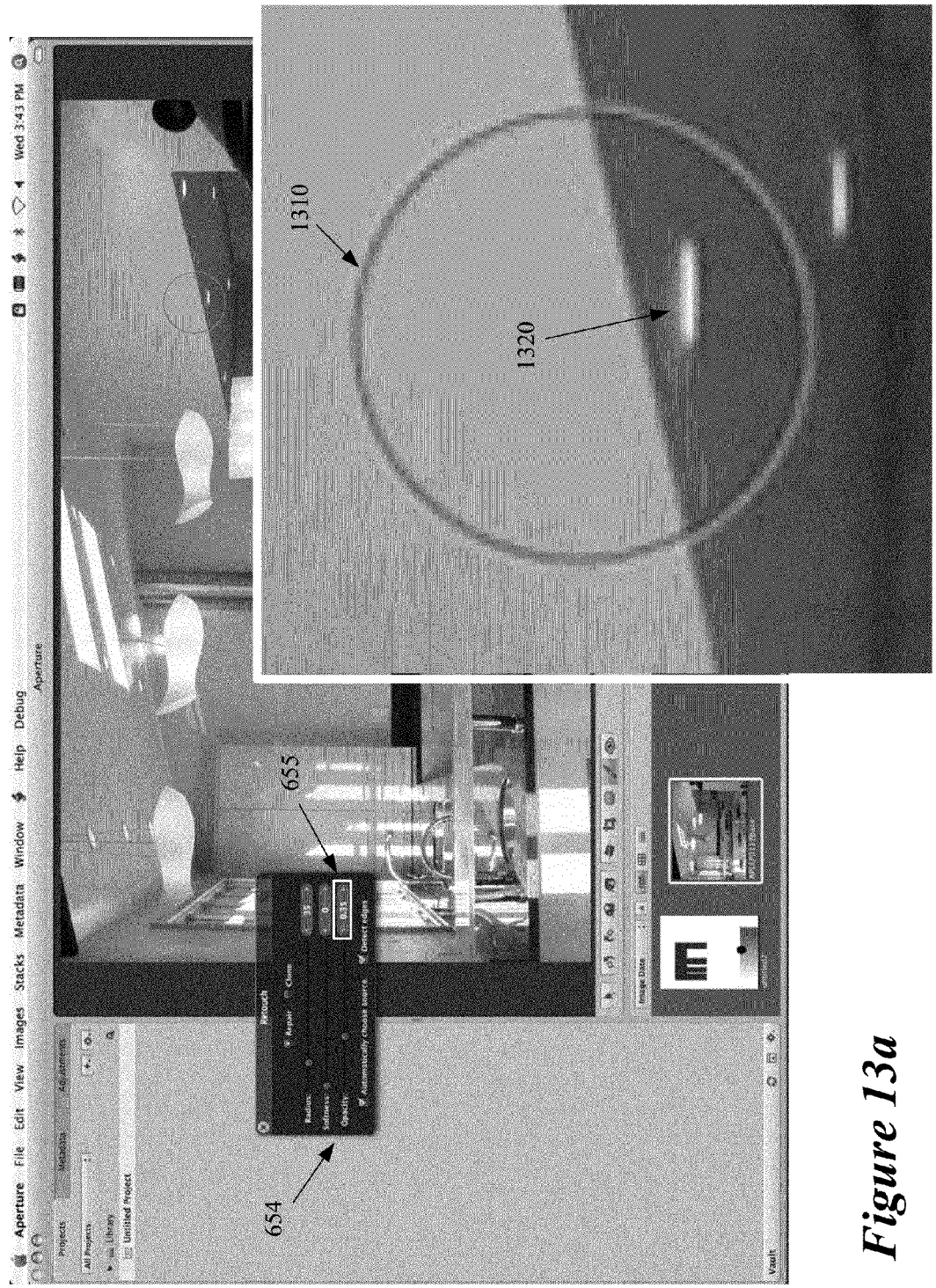
FIGS. 13a-13b illustrate the effects of an opacity value on blemish removal.
Figure 13B:
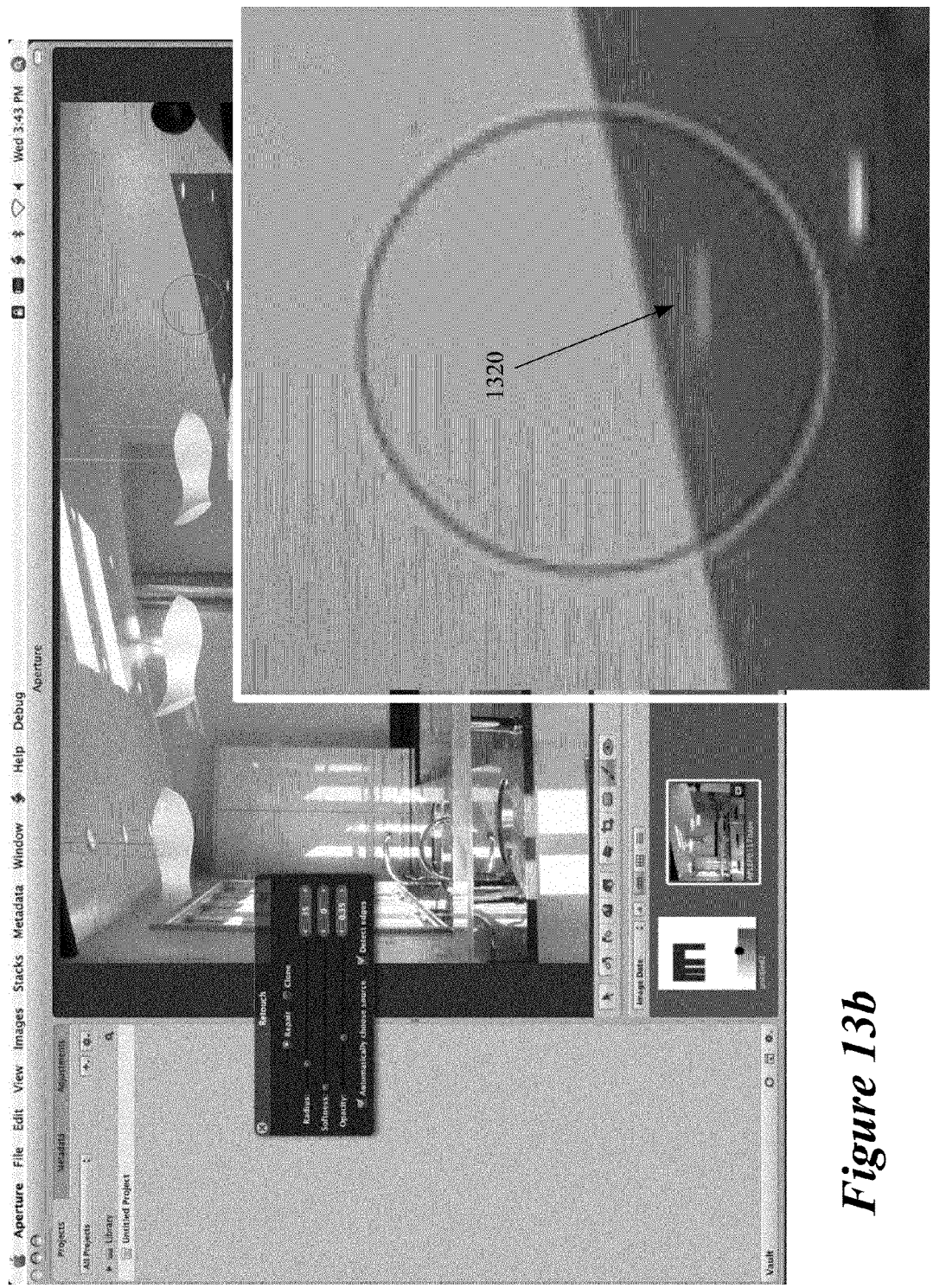

FIGS. 13a and 13b illustrate the effects in some embodiments of setting an opacity value less than one-hundred percent for the blemish removal tool. FIG. 13a shows cursor 1310 surrounding light 1320. The figure also shows opacity slider 654 and opacity indicator 655. The slider 654 and the indicator 655 both show that the opacity of the tool is at thirty-five percent. This means that, after blurring, the final image in the selected area will be thirty-five percent of the blurred version of the image and sixty-five percent of the original version of the image.

FIG. 13b illustrates the effect of using the tool with a lowered opacity. Unlike in previous figures, in FIG. 13b light 1320 is faded rather than completely gone. This shows that a low opacity blemish removal tool can be used to de-emphasizing features without completely removing them. Therefore a low opacity blemish removal tool can be used, for example, to reduce the visibility of wrinkles in a portrait without leaving the portrait unnaturally smooth, or with an inappropriate texture.

Figure 13C:
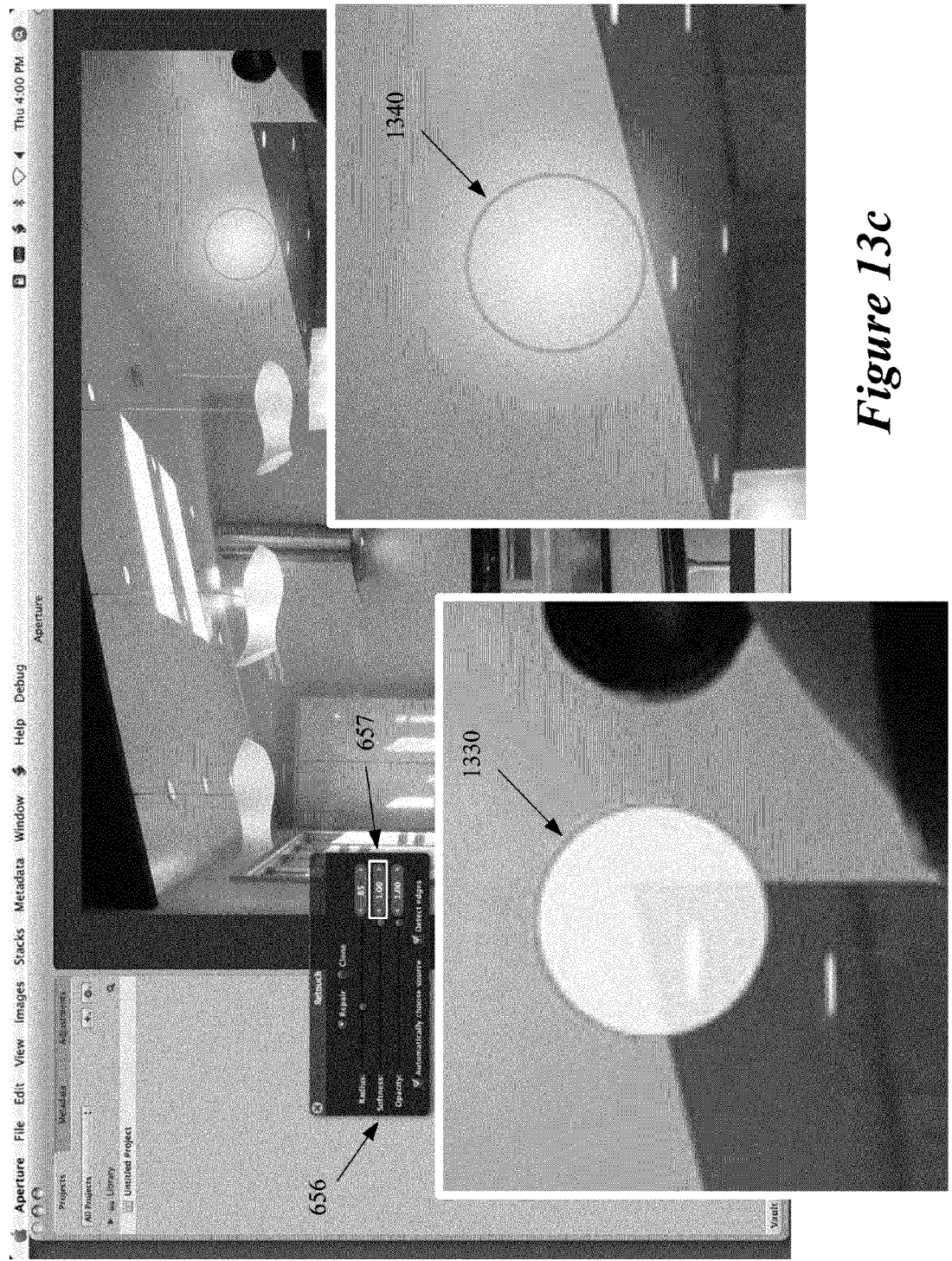
FIGS. 13c-13d illustrate the effects of a softness value on blemish removal.
Figure 13D:
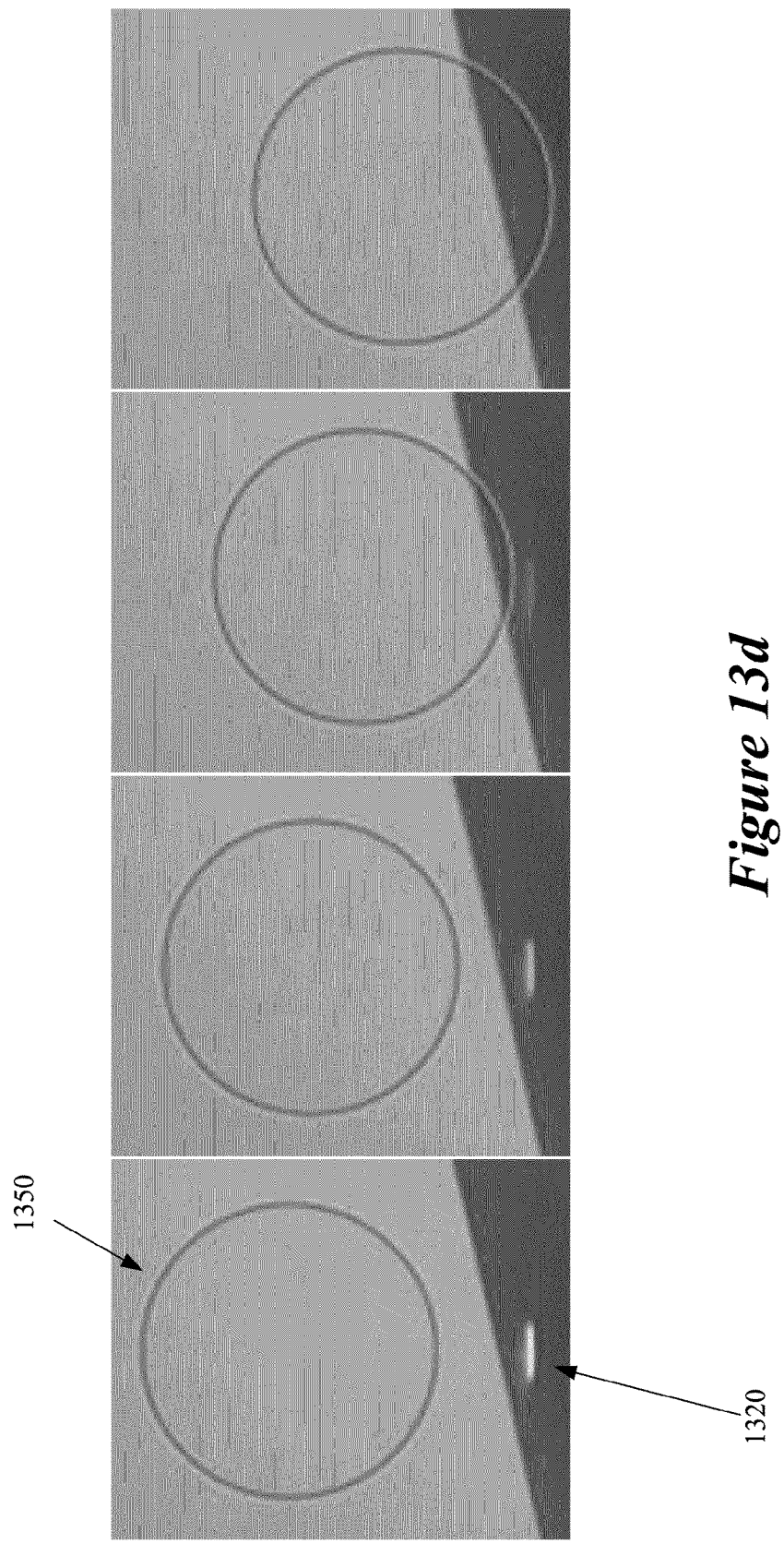

FIGS. 13c and 13d illustrate the related function of "softness". In some embodiments, the softness affects the opacity non-uniformly across the area selected by the blemish removal tool. All previous figures showed softness at zero. Thus, the opacity of the blurred areas was uniform over the areas. When softness is above zero, the opacity of the area under the center of the cursor is higher than the opacity of the outlying areas, with higher softness values corresponding to faster drop-off of opacity.

Thus, a softened blur effect is strongest in the middle of the blurred area, and gradually drops to nothing at the edges. A high softness setting can reduce the abruptness of any transition between the blurred region and the non-blurred region, making the blurring less obvious.

In some embodiments, the selected area appears different based on the strength of the blur effect at a particular location. This is shown in FIG. 13c, where un-softened selected area 1330 is shown as a sold circle, while the softened area 1340 is shown as a blurred circle that is most solid in the middle and most fuzzy at the edges. The figure also shows softness slider 656 and softness indicator 657. The softness slider 656 and the indicator 657 both show that the softness value is at maximum for the embodiment.

FIG. 13d shows the blurring effect of several applications of a softened blemish removal tool. The tool in each image has the same radius and softness. Each picture is the result of the blurring tool being applied to the original image at varying distances from light 1320. After each application, the image was restored to the original image, and the cursor 1350 was moved closer to light 1320. As the figure shows, the closer the cursor, the more the blurred image dominates and the less the original image of light 1320 shows through.

H. Radius of the Cursor

Figure 14:
FIG. 14 illustrates a cursor with a large radius.

As mentioned in the previous paragraph, the radius of the cursor in each image of FIG. 13d is the same. However, the radius of the cursor in some embodiments is an adjustable parameter. As shown in FIG. 14, the radius of cursor 1410 is larger than in the preceding figures. The increase in the radius is also shown by the radius slider 652 and radius indicator 653.

I. Texture

Blurring an area smoothes that area of the image. This removes blemishes in the area, but can create a region that stands out visually as being unnaturally smooth. In some embodiments, the process can, after blurring an area or sub-area, apply texture from an automatically selected nearby area.

Figure 15A:
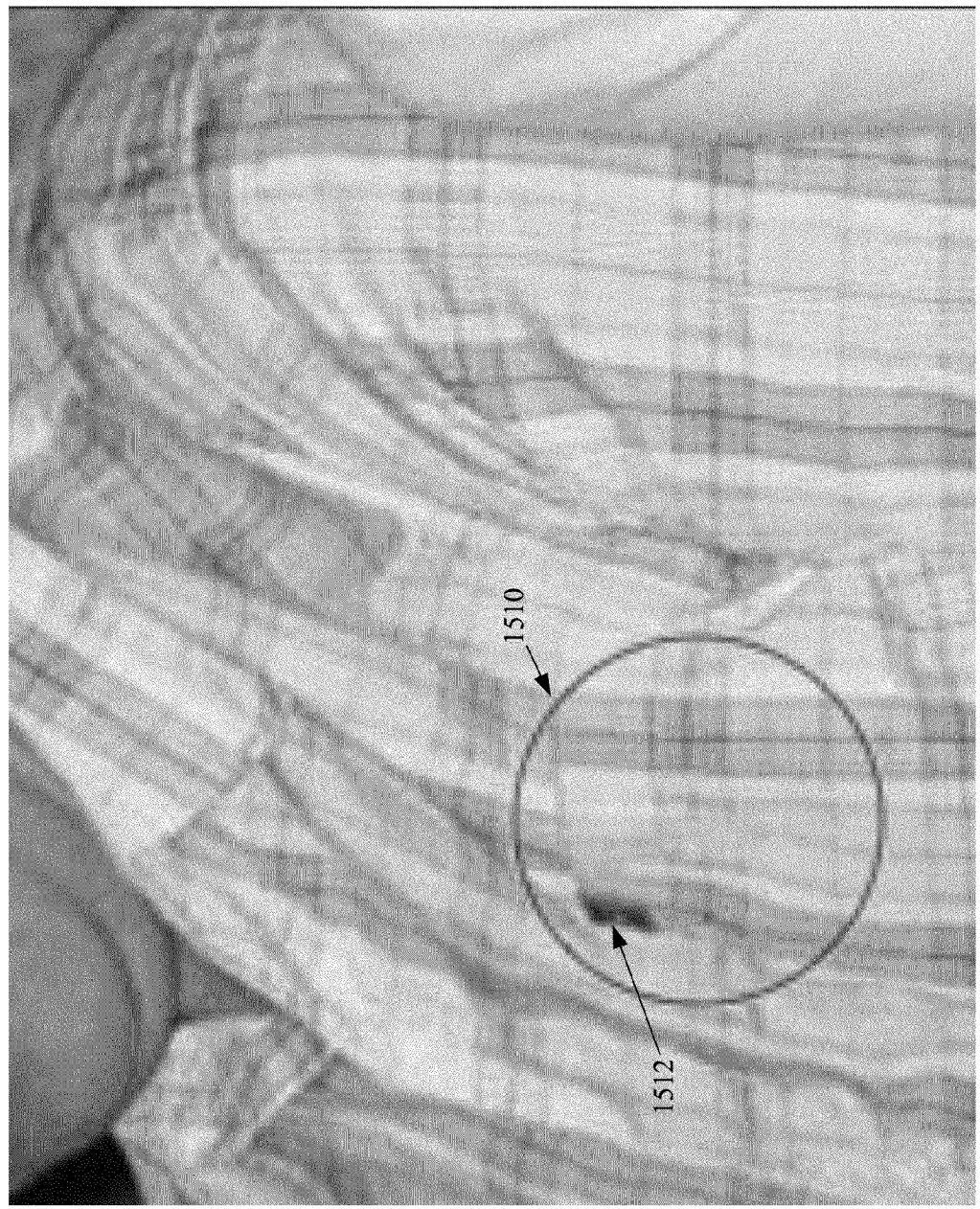
FIGS. 15a-15c illustrate the application of different textures to the same area of an image.
Figure 15B:
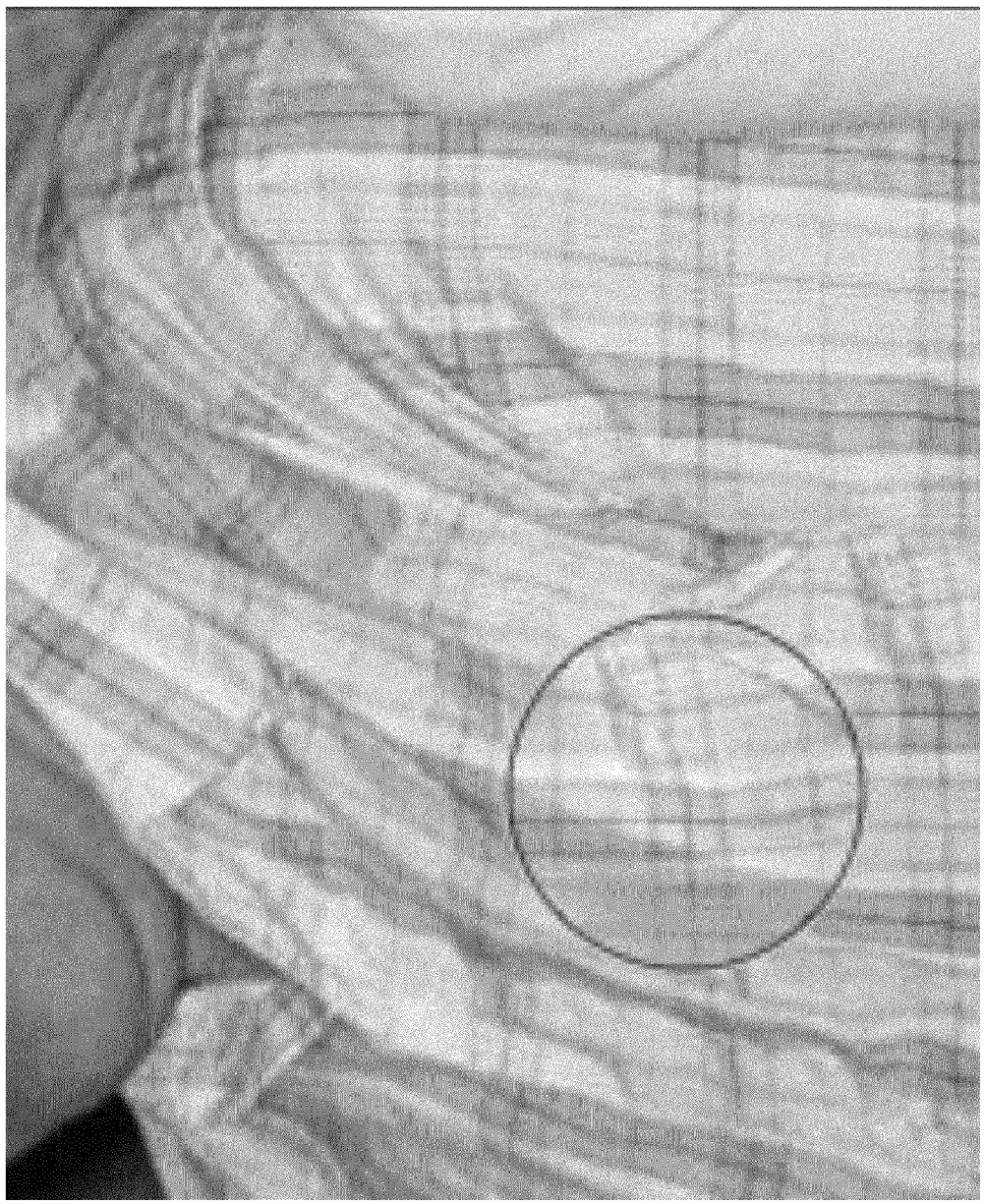
Figure 15C:

FIGS. 15a-15c illustrate the application of different textures to the same area of an image. FIG. 15a shows an unedited area inside cursor 1510, for comparison purposes with the blurred areas of the following figures. There is a black spot 1512 in the unedited area.

FIG. 15b shows the same area after blurring has been applied with automatic selection of a texture of a relatively smooth nearby area of the plaid shirt. The black spot 1512 is gone and the plaid points in a slightly different direction than the plaid in the unedited area. The direction of the new plaid in the illustrated embodiment is the same as the direction in the texture source area, whichever area that is. In other embodiments, the editing application aligns the texture with the texture on the edges of the edited area.

FIG. 15c shows the same area after an area of skin (not shown) has been manually selected as the texture source after un-checking the automatically-choose-source check box 670. Skin texture has been used because it is substantially different from the plaid texture of the shirt and thus demonstrates the extent of the effect of applying a mismatched texture (or no texture) to a blurred area. In some embodiments, the colors of the blurred area depend on the colors on the perimeter, rather than the color of the texture area. Thus, after blurring and application of skin texture, the blurred area in the original image remained blue, like the shirt, rather than skin toned. However, the blurred area looks unnatural with the mismatched texture.

J. Painting an Area

Figure 16A:
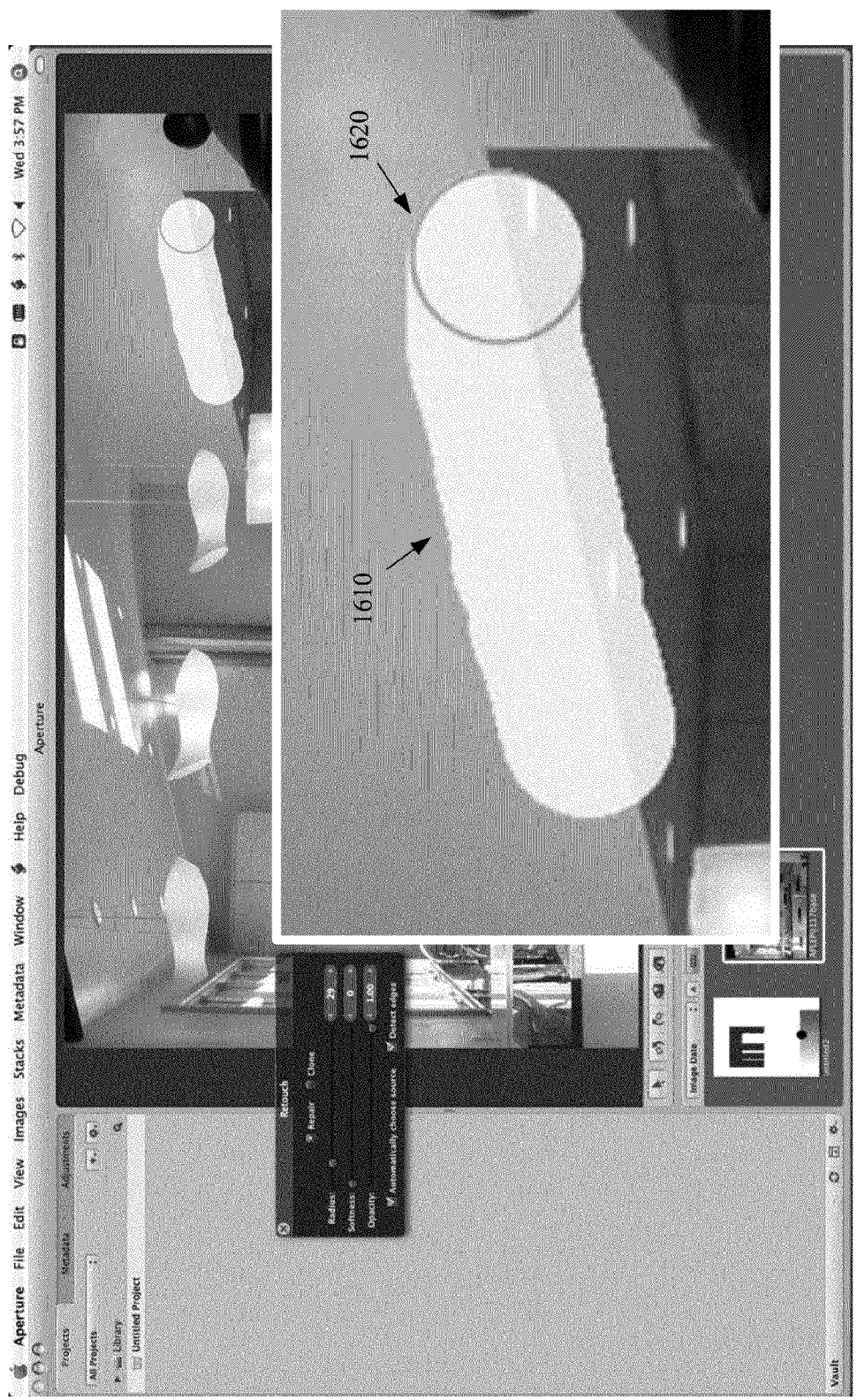
FIGS. 16a-16b illustrate blurring with a "painted" selection area.
Figure 16B:
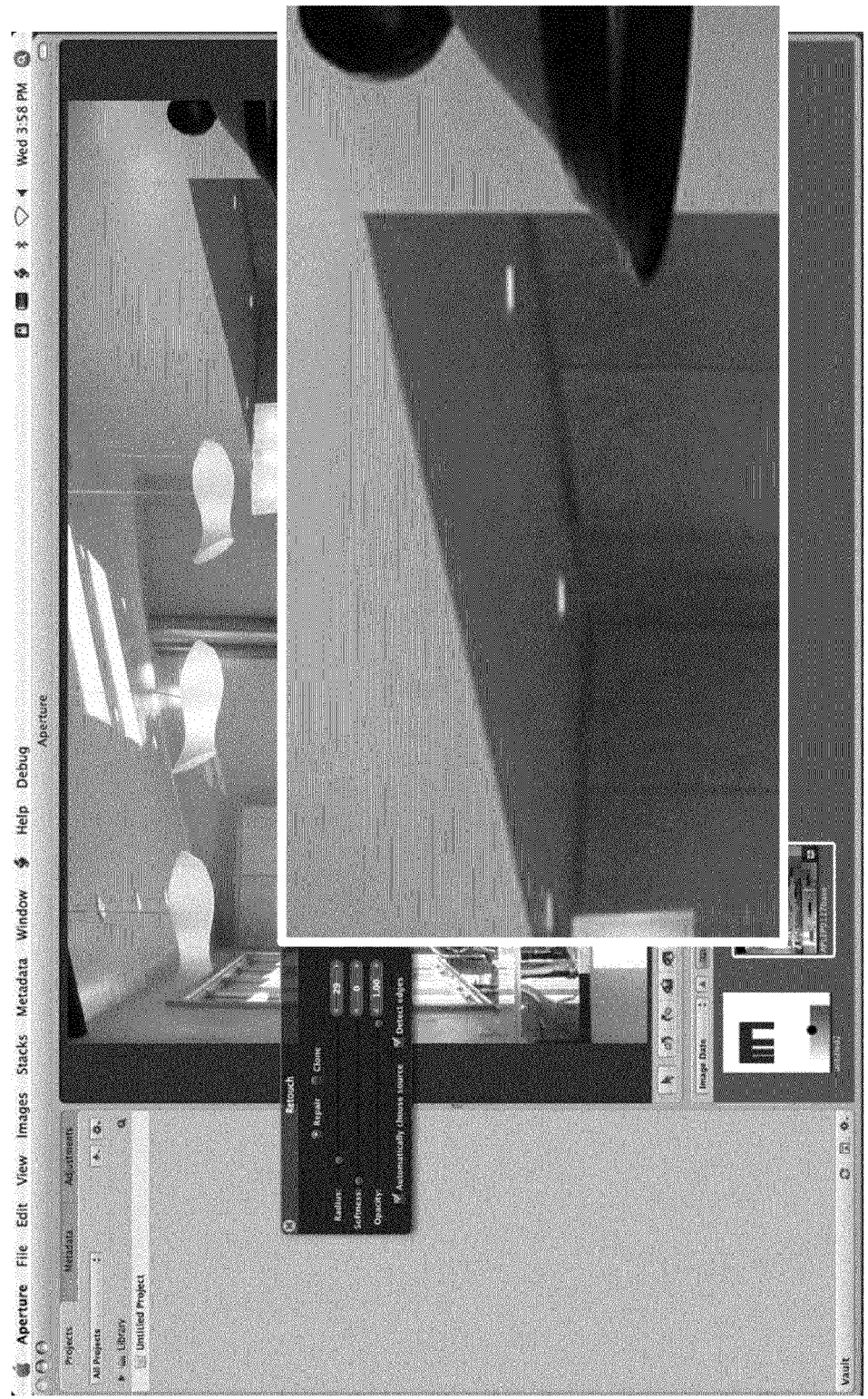

In some embodiments, rather than the selection area being limited to the cursor, the process allows the user to paint an area with the blemish removal tool. This is illustrated in FIGS. 16a and 16b. In FIG. 16a, the area 1610 is selected by clicking and dragging cursor 1620. Two lights are removed when the blemish removal is applied to area 1610, this can be seen in FIG. 16b. The boundary between the wall and the ceiling are also maintained all along the selected area. The edge detection has divided the area into long thin strips instead of parts of a circle. In some embodiments, the selected area can even surround an un-blurred area. In some embodiments that have softness parameters, the opacity of a location in the painted area is determined by the opacity of the part of the cursor that passes over that location. When multiple parts of the cursor have passed over that location, then the highest opacity value to pass over the location is used. In other embodiments with softness parameters, other methods of determining the opacity of each location are used, for example, increasing the opacity with each pass of the cursor by an amount proportional to the opacity of the cursor at that location.

III. Edge Detection, Blurring, and Texture Mapping Processes

This section provides describes the blemish removal tool of some embodiments.

A. Edge Detection

1. Process and Features of Edge Detection

Figure 17:
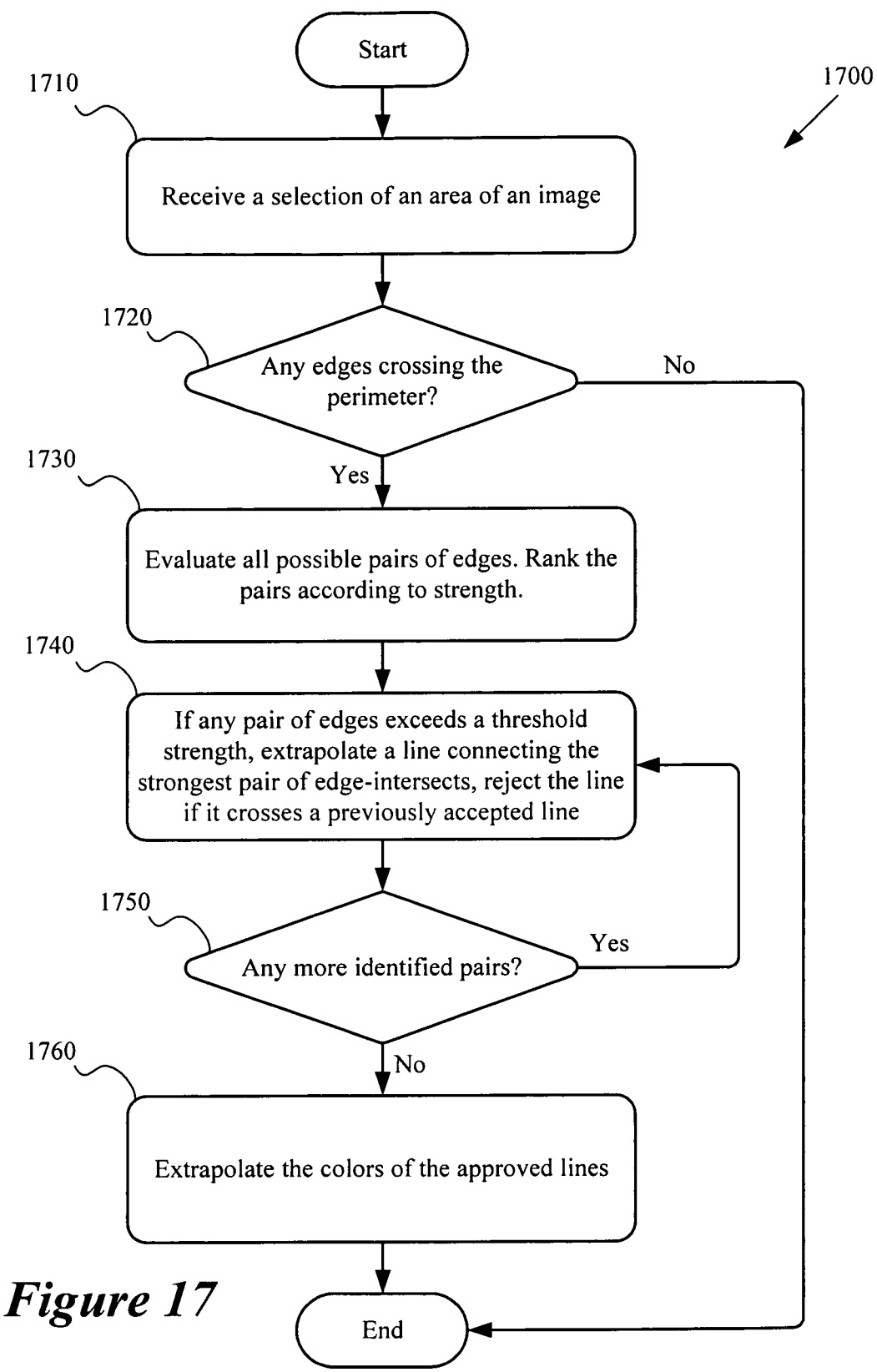
FIG. 17 illustrates a flowchart of multiple edge detection.

FIG. 17 illustrates the edge-detection process 1700 of some embodiments of the invention. The edge detection process 1700 determines whether edges cross the perimeter of a selected area, decides which edges should be joined up, joins those edges up and separates the selected area into sub-areas based on the joined edges. In addition to allowing results such as the region separation illustrated in FIG. 3 above, the process 1700 is also a way of accomplishing such results as separating a selected area into more than two regions should a situation like the one illustrated in FIG. 18 arise.

Figure 18:
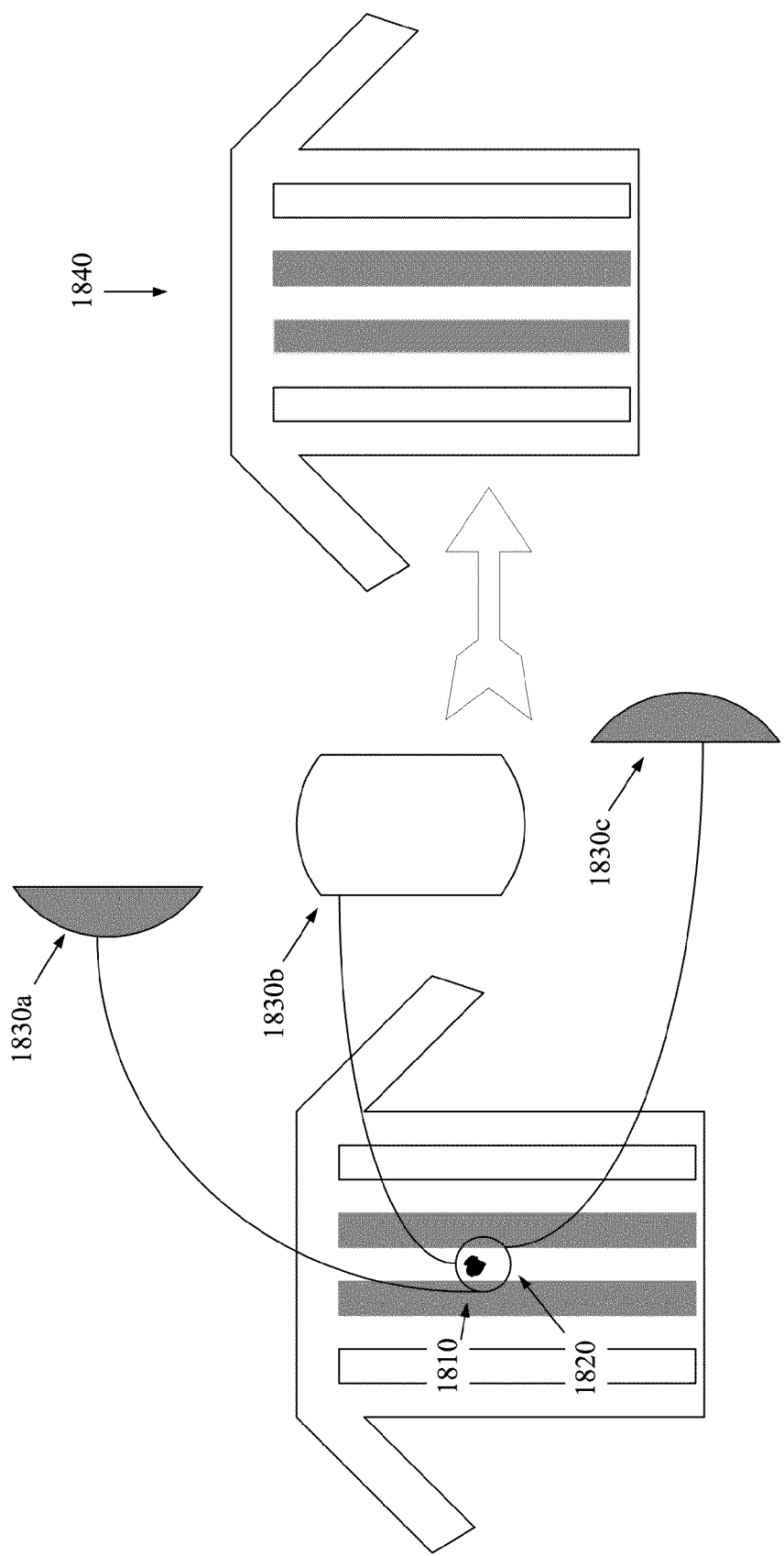
FIG. 18 illustrates the division of a selected area into three sub-areas.

FIG. 18 illustrates the need for a blemish removal tool that can break a selected area down into more than two sub-areas. A blemish 1810 is in a location where three regions are close together. Process 1700 allows a selected area 1820 to be broken down into sub-areas 1830a-1830c so that the blemish removal tool can operate on each sub-area separately, ultimately removing the blemish while maintaining the clean separation of the stripes on shirt 1840.

An image-editing application performs this process in some embodiments. Initially, the process 1700 receives (at 1710) a selection of an area of an image. Some embodiments detect edges (at 1720) crossing the perimeter of the selected area by looking for sharp changes in color or brightness from one part of the perimeter to another.

Figure 19:
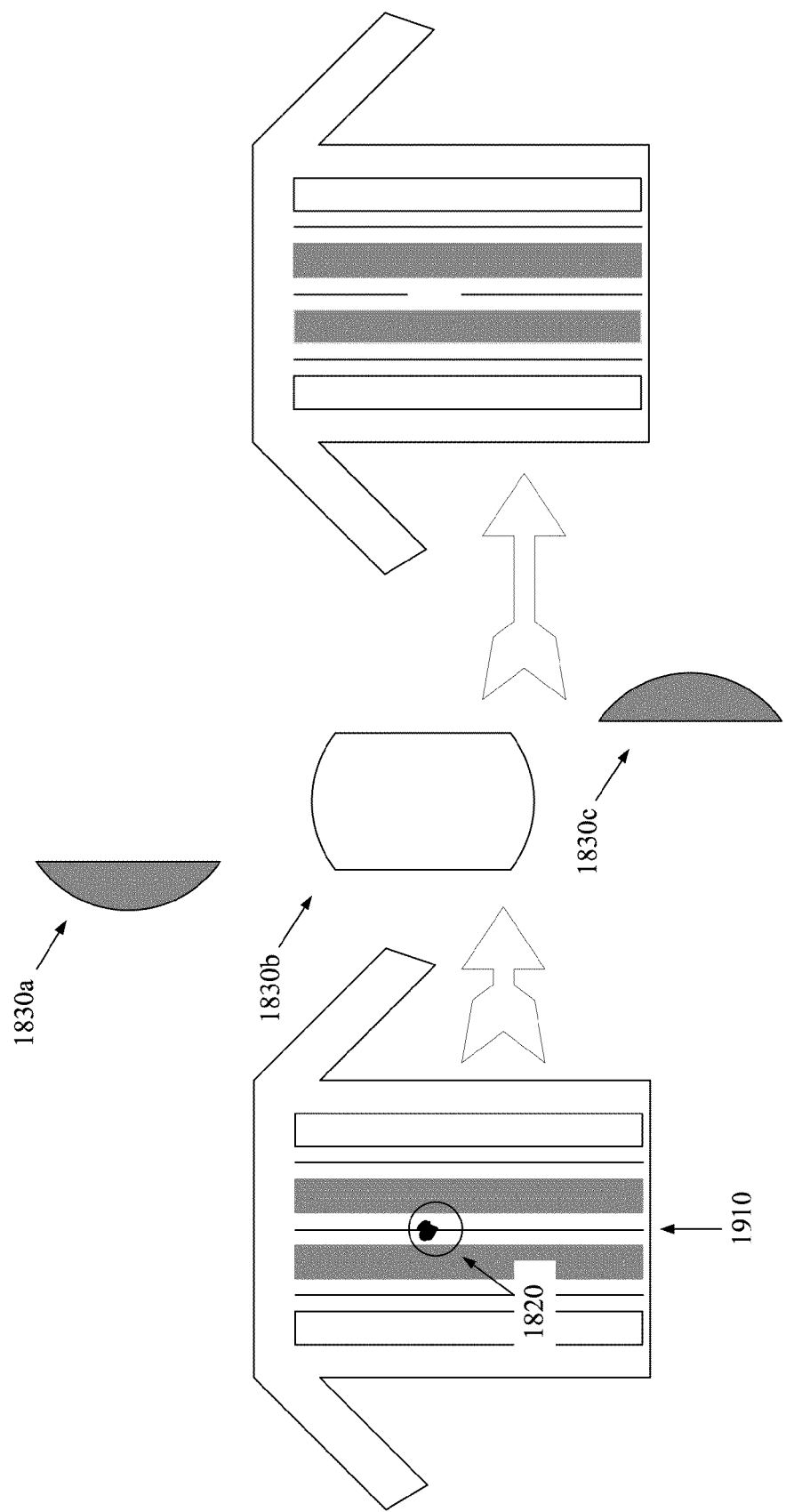
FIG. 19 illustrates the division of a selected area while ignoring thin lines.

The process of some embodiments only detects a line crossing the perimeter as an edge when the region the edge is a boundary of is wider than a certain width. This prevents stray hairs or wires from breaking up an otherwise contiguous region. Edges of regions narrower than that width are ignored (at 1720) and thus do not affect the breakdown of a selected area into sub-areas. FIG. 19 illustrates the results of ignoring thin lines.

FIG. 19 shows striped shirt, similar to the one in FIG. 18, but now the shirt has thin stripes as well as wider ones. However, despite the presence of thin line 1910, that crosses the selected area 1820. The area 1820 is again broken down into sub-areas 1830a-1830c. The sub-areas remain the same as in FIG. 18 because line 1910 is narrower than the threshold (of this embodiment). In some embodiments the threshold thickness is about seven or nine pixels. In other embodiments, other set thicknesses are used. In still other embodiments, the thickness threshold is a function of the radius, opacity, or softness of the blemish removal tool, the resolution or size of the image, the texture of the selected area, the number of edges determined to be passing through the selected area, or some combination of these, or other factors. In some embodiments the threshold is a user-adjustable parameter.

If as result of there being no sharp changes in color along the border, or if the process ignores any lines that do cross the perimeter of the selected area, then no edges are detected and process 1700 goes straight from operation 1720 to the end of the edge detection process.

If operation 1720 does detect edges, then it keeps track of the edges detected, up to a maximum number that varies in different embodiments. In some embodiments, the maximum number of edges is sixty-four. Once the process 1720 hits its maximum number of edges or finishes checking the perimeter, the process moves on to operation 1730.

Operation 1730 evaluates every possible pair of edges in order of their strength. The number of possible pairs of edges grows as the square of the number of edges, so "every possible pair" may mean thousands of pairs in embodiments that track large numbers of edges. Operation 1730 ranks the possible pairs in order of strength. Strength in this context meaning how strongly a pair of edges intersecting the perimeter of the selected area indicates the presence of a boundary that connects the pair of edges. Subsection A.2. describes some rules that determine the strength of a pair of edges.

Once the edges are ranked, the process moves on from operation 1730 to operation 1740. If any of the pairs are above a threshold strength that varies in different embodiments, then operation 1740 extrapolates a line connecting the strongest pair of edges. If the extrapolated line does not intersect any existing extrapolated lines then operation 1740 approves the extrapolated line for later use by the blemish removal tool. If the extrapolated line intersects any existing extrapolated lines, then operation 1740 rejects the extrapolated line. In either case, the process then focuses on the next strongest pair, if any. In some embodiments, all pairs that contain a member of a pair in an approved extrapolated line are removed from consideration. Subsection A.2. describes further details on line extrapolation.

If there are any pairs remaining after operation 1740, then operation 1750 loops the process back to operation 1740 for evaluation of the strongest pair that hasn't been extrapolated or removed from consideration. In some embodiments, each pair that can be strongly linked without disrupting the connections of other pairs is assumed to indicate a separate region.

Once all pairs have been evaluated, or the maximum strength of the remaining pairs falls below a threshold strength, operation 1750 passes the process on to operation 1760. Operation 1760 separately extrapolates the color for each side of each approved connecting line.

Extrapolating the color of the curves is useful in cases where the color of one side or another changes between the first edge and the second. For example, when the selected area covers the boundary between a tree that shades from brown to black along its trunk and a sky that shades from light to dark blue along the edge of the trunk.

Figure 20A:
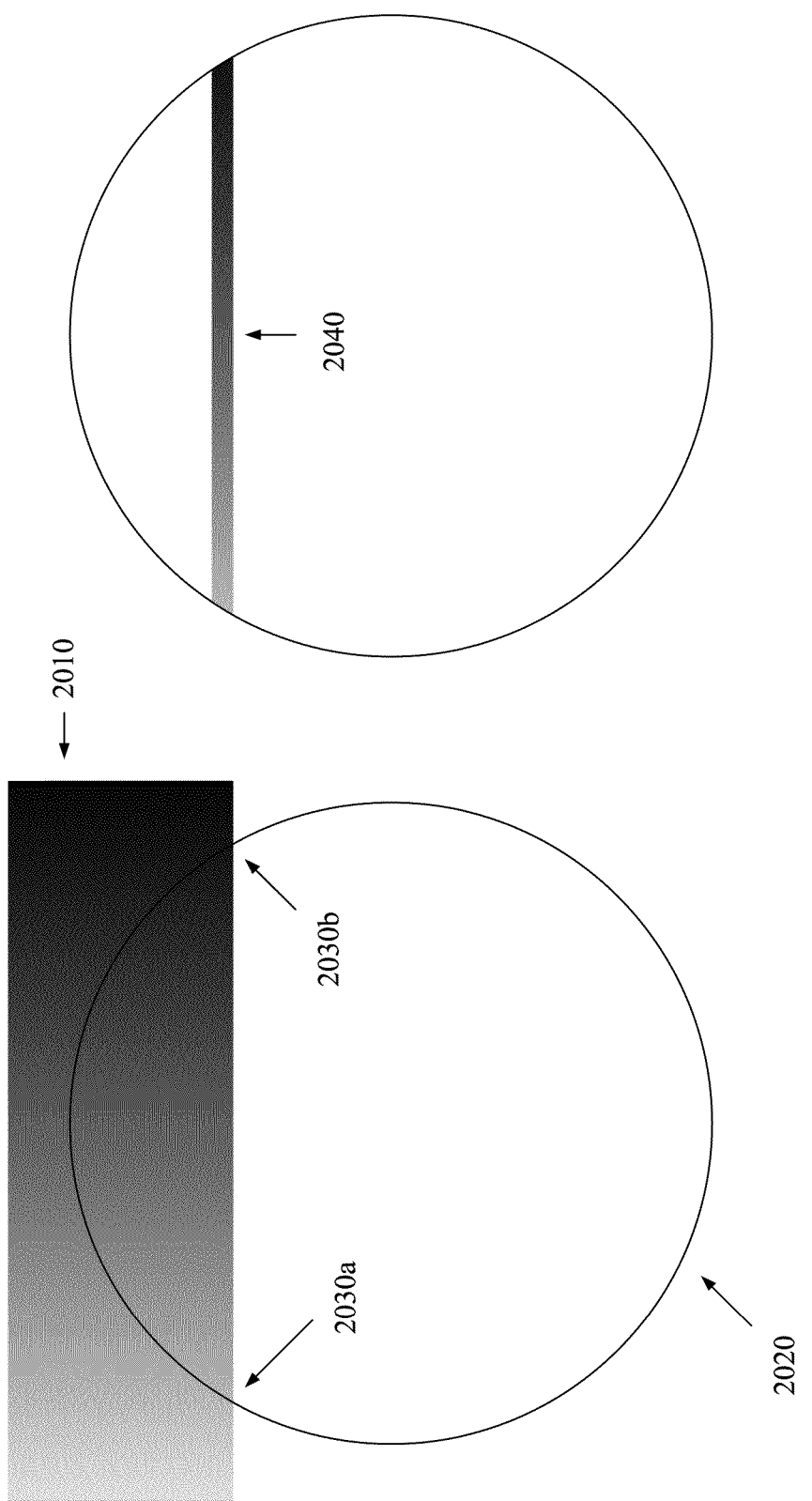
FIG. 20a-20b illustrates extrapolation of line color.
Figure 20B:
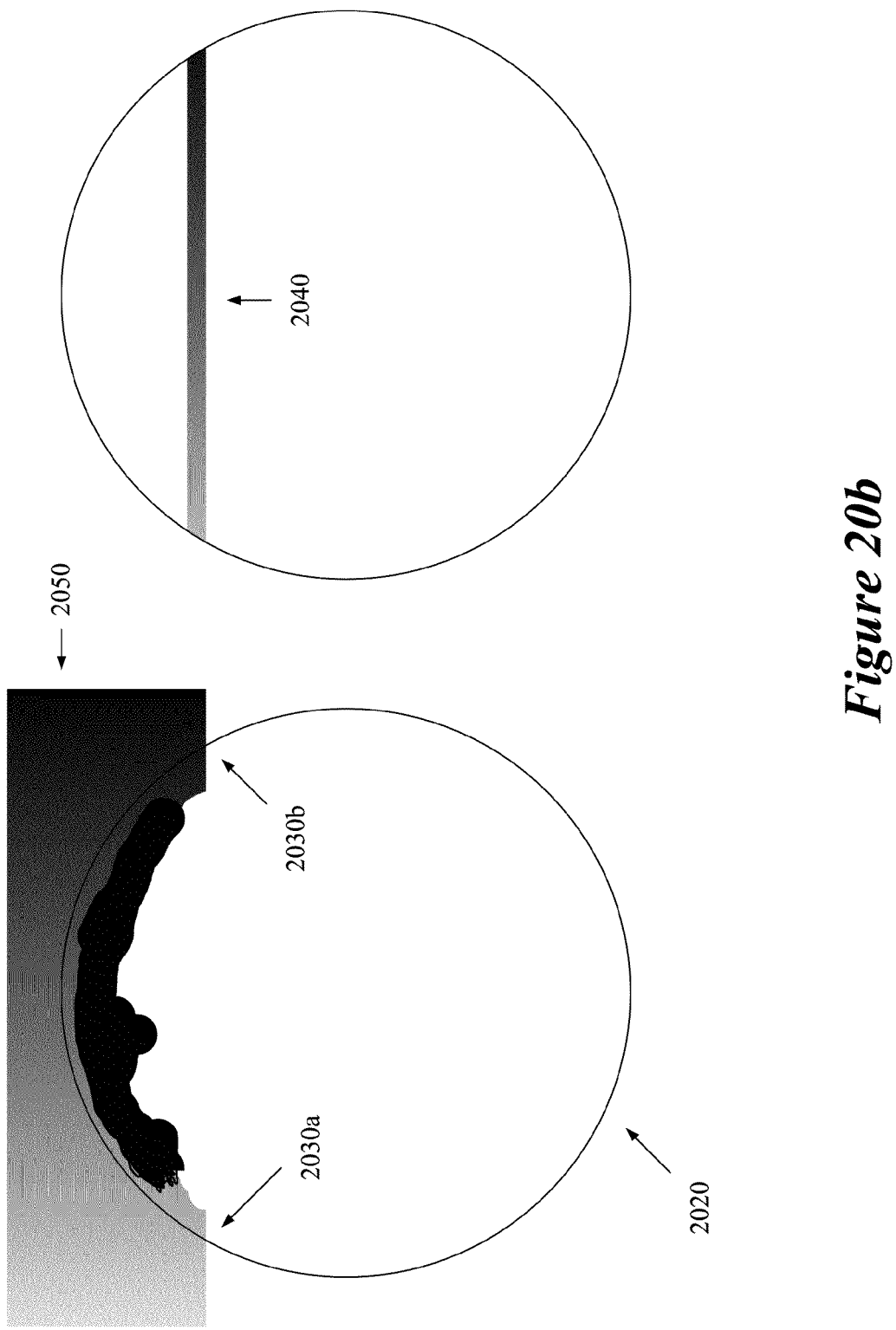

FIGS. 20a-20b illustrate extrapolation of line color. In FIG. 20a, the boundary between the white region and region 2010 crosses selected area 2020 at edges 2030a and 2030b. Edge 2030a is light gray on the top side and white on the bottom side. Edge 2030*b* is dark gray on the top side and white on the bottom side. The process extrapolates the color of line 2040 from the light gray of edge 2030*a* to the dark gray of edge 2030*b* on the top side and extrapolates the color on the bottom side from white to white (e.g. white all along that side).

FIG. 20*b* demonstrates that in some embodiments, the process determines the colors of the line based solely on the color of the edge-intersects 2030*a* and 2030*b*. In this figure, the region 2050 is a different color on the inside of the selected area than region 2010 in FIG. 20*a*, but line 2040 remains the same colors as in FIG. 20*a*, because the color of their respective edges are the same.

In some embodiments, the process determines the colors based on a linear progression from the color at one edge to the color at the other edge. In other embodiments, the process determines line shading (how fast the color changes along the line) based on a non-linear progression. For example, some embodiments employ a second order derivative of the color change by determining the rate of change of the colors on the boundary at each edge, extrapolating a linear progression of the rate of change, and determining the color at each point on the line based on integrating the rate of change. In some embodiments, an even higher order is used, such as by taking a higher order derivative of the rate of change. Such higher order derivative techniques have been used in the prior art, but not in conjunction with other features of the present invention.

In still other embodiments, the process follows the edge through the color region and replaces only those segments with abrupt color changes on the assumption that abrupt color changes are the result of blemishes rather than a continuous edge. Once the colors have been extrapolated, process 1700 ends and the blurring of the separated regions can begin.

2. Evaluation of Strength of Edges and Extrapolation of Lines

Figures 21A, 21B:
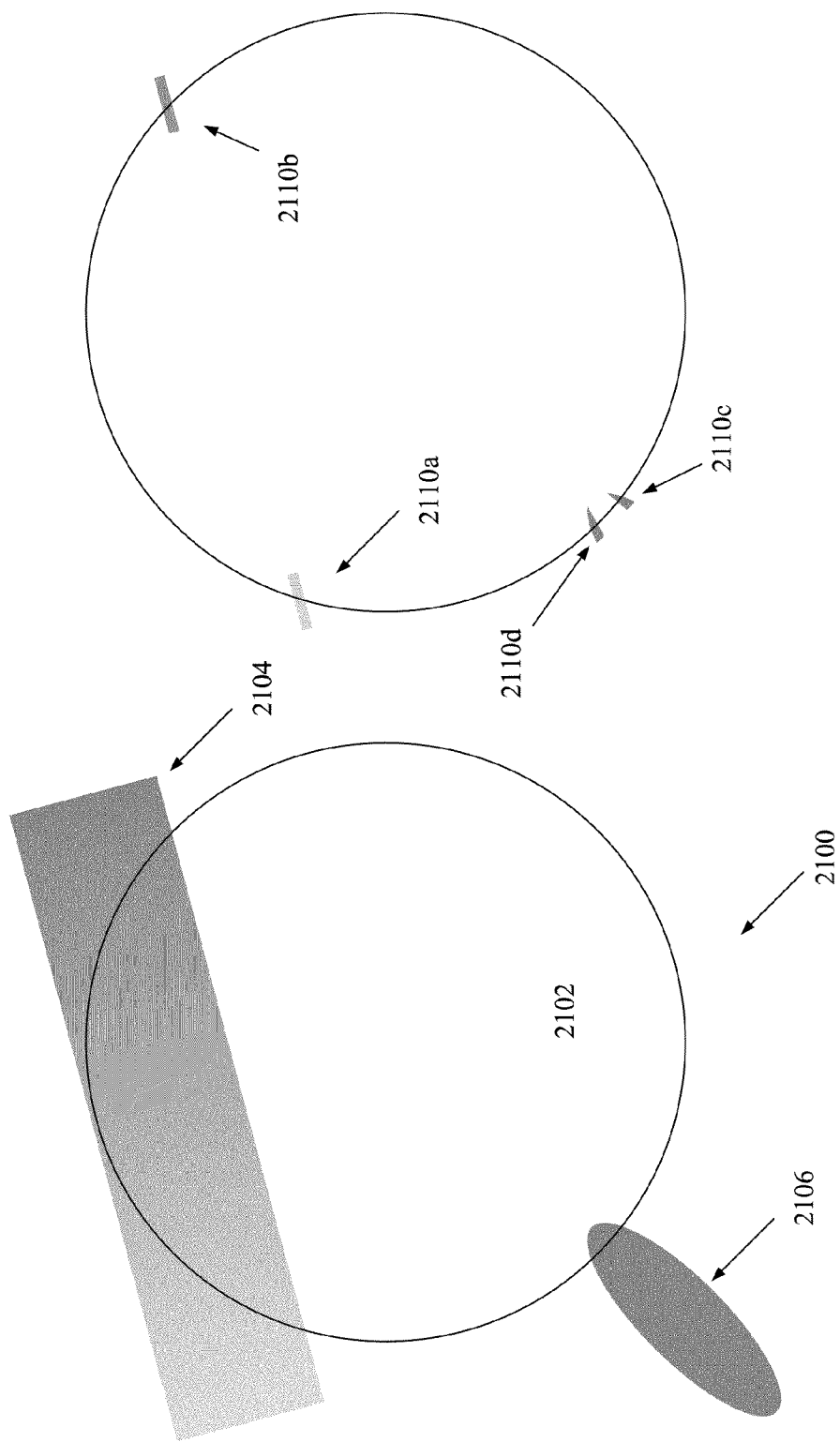
FIGS. 21a-21f illustrate multiple edge detection.

FIGS. 21*a*-24 illustrate evaluation of pairs of edges and the extrapolations of lines once those pairs have been evaluated. FIGS. 21*a*-21*f* illustrate an overview of the edge evaluation process of some embodiments. FIG. 21*a* shows three regions intersected by selected area 2100: 1) the basic white region 2102, 2) the shaded gray region 2104, and 3) the gray region 2106. FIG. 21*b* shows edge-intersects 2110*a*-2110*d*. The edge-intersects 2110*a*-2110*d* are a few pixels wide and deep and have two sides, one side gray, and a second side white (not shown).

The edges in the illustrated embodiments are all rather extreme (e.g. pure white versus dark grey) for ease of viewing. However, in some embodiments, edges may be detected with far less extreme variations between the two regions on either side of the edge. In some embodiments, the edge detection may be based on non-linear measures. For example, in some embodiments, an edge separating regions that are 10% and 20% gray respectively may be treated as just as strong (in some embodiments nearly as strong) as an edge between regions that are 50% grey and 100% white respectively. Some embodiments limit this by some threshold; for example, an edge between 1% and 2% gray regions may be treated as less strong than between 10% grey and 20% grey regions. Some embodiments treat brightness on a logarithmic rather than linear scale. Using non-linear measures for detecting edges can ensure that edges in shadowed areas of the image are given perceptually similar treatment to edges in brighter areas. Similar treatment can be applied to texture application, further described below.

As described above, the strength evaluations of some embodiments take place before the line extrapolation evaluations do. Therefore when the following descriptions state that the process "has selected" a pair as being the strongest, one of ordinary skill in the art will realize that in some embodiments, the ranking of the strength of the pairs is already over before the first line is extrapolated. In other embodiments, the evaluations of strength may take place during or after individual line extrapolations.

Figure 21D:
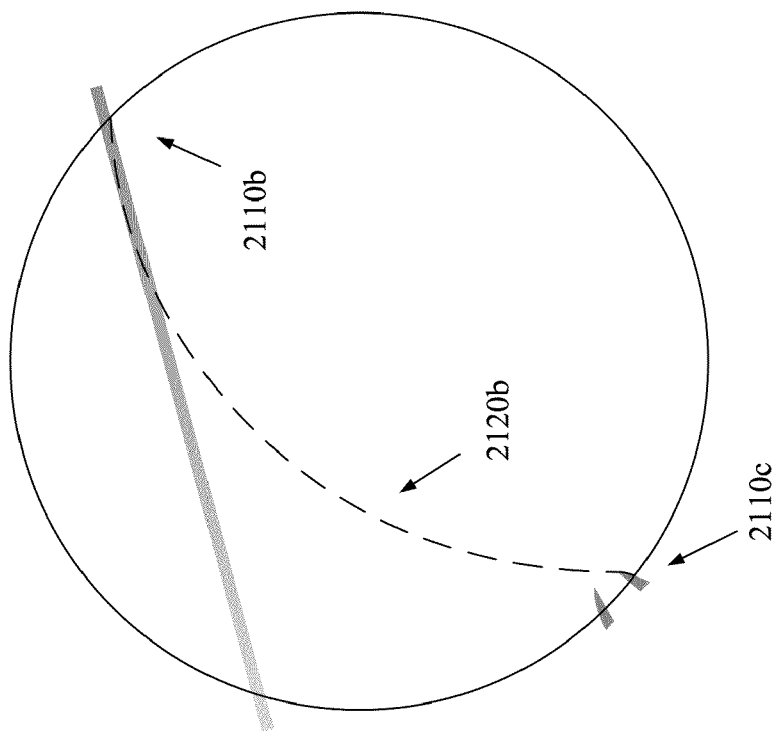
Figure 21C:
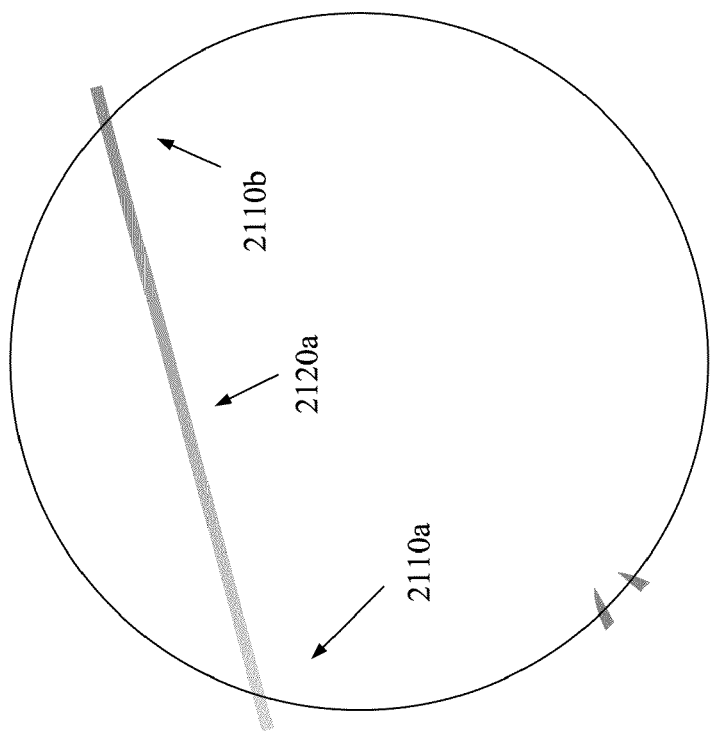

FIG. 21*c* illustrates that the edge detection process 1700 has selected edge-intersects 2110*a* and 2110*b* as the strongest pair and has extrapolated shaded line 2120*a*. This is the strongest, and thus, first pair, so no other lines have been extrapolated and the process can extrapolate line 2120*a* without having to check whether it will intersect another line. The illustrated extrapolated line 2120*a* is shown as already shaded. However, one of ordinary skill in the art will realize that in other embodiments, the shape of many or all connecting lines may be determined before the colors of any of the lines are extrapolated.

FIG. 21*d* illustrates selected edges 2110*b* and 2110*c* as the second strongest pair. The figure also shows extrapolated curved line 2120*b* connecting the edges. However, the smooth curved line 2120*b* crosses existing line 2120*a* and is thus rejected by the process. Intersecting lines are rejected by the process because contiguous regions can't have intersecting edges and the process is only looking for contiguous regions. In some embodiments, a pair of edges is not evaluated if at least one of the pair is already part of a previously accepted connecting line. Such evaluations would not need to extrapolate line 2120*b* in order to reject the possibility of connecting the edges 2110*b* and 2110*c* because 2110*b* is already part of the pair that defines line 2120*a*.

Figure 21F:
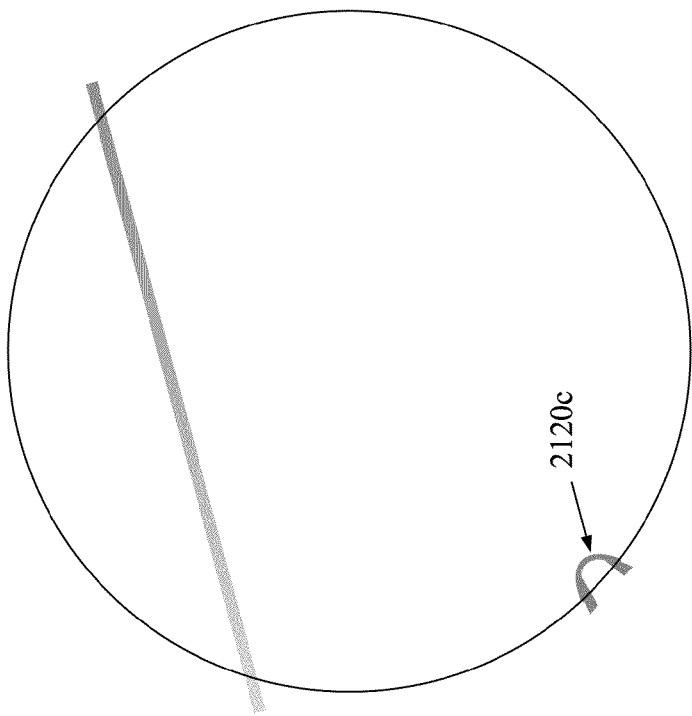
Figure 21E:
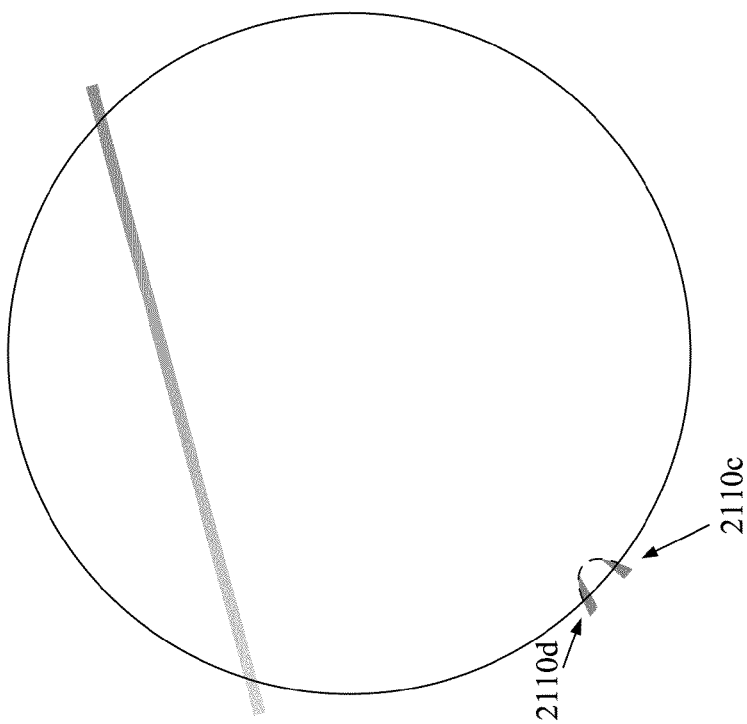

FIG. 21*e* illustrates an extrapolated curved line 2120*c* connecting the third strongest pair of edges 2110*c* and 2110*d*. FIG. 21*f* illustrates the completion of the process of extrapolating connecting lines by showing curved line 2120*c* as defining part of the perimeter of a sub-area.

FIGS. 21*a*-21*f* illustrate the determination of whether multiple pairs were viable, but do not address the rules that determine which pairs are strongest. FIG. 21*c* showed the first extrapolated line 2120*a* connecting two edges that were aligned with each other. And indeed, the process (at 1730) takes alignment of edges as a strong indicator that they indicate a boundary between regions and thus are a strong pair. FIGS. 22-23*d* illustrate some additional rules that some embodiments use to determine which pairs are the strongest indicators of boundaries.

Figure 22A:
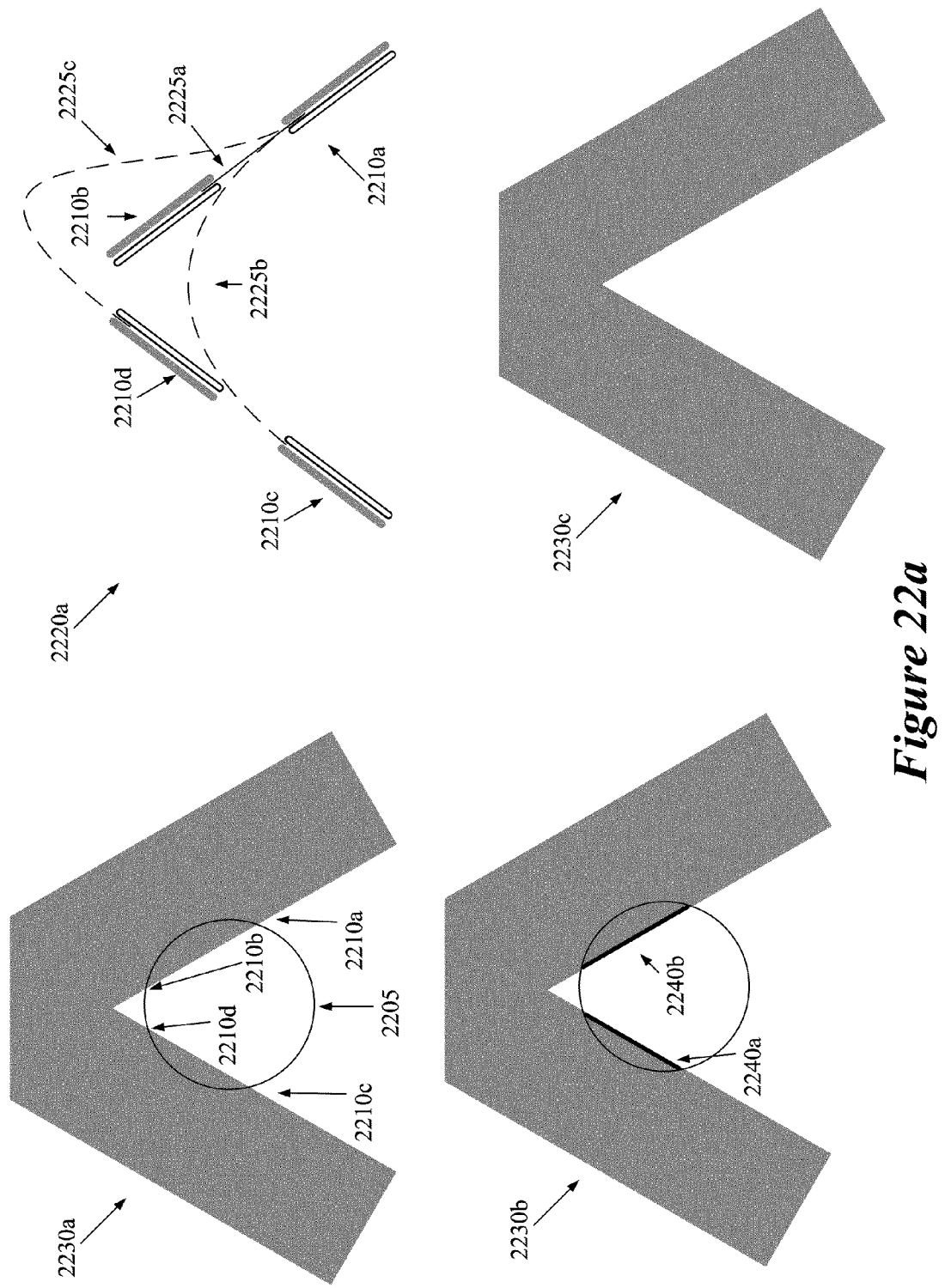
FIGS. 22a-22b illustrate some criteria that some embodiments use to determine which pairs are the strongest indicators of boundaries.

FIG. 22*a* illustrates the rule that straight edges with colors aligned win over curved edges. Selection area 2205 overlaps region 2230*a*. Edges 2210*a* and 2210*b*, which are aligned with each other and the same color as each other strongly indicate a border. This makes sense in both drawings and in the real world. When two edges both having the same colors on each side enter a small area, both pointing straight at each other, there is a high probability that the lines connect in the middle. The process is designed to exploit this probability by assuming that such edges are supposed to connect. Edges 2210*c* and 2210*d* also strongly indicate a border for the same reasons.

Diagram 2220*a* illustrates the lines 2225*a*, 2225*b* and 2225*c* that would be extrapolated for each possible pair with edge 2210*a* as a member. Each line would match the colors edge to edge, but the simplest line is line 2225*a*, the straight line connecting 2210*a* and 2210*b*. In FIG. 22*a*, the simplest line happens to be the right one. When sub-areas 2240*a* and 2240*b* of region 2230*b* are separately blurred and applied to the original image, the boundaries of the image are left intact by the blurring, as shown in region 2230*c*

Figure 22B:
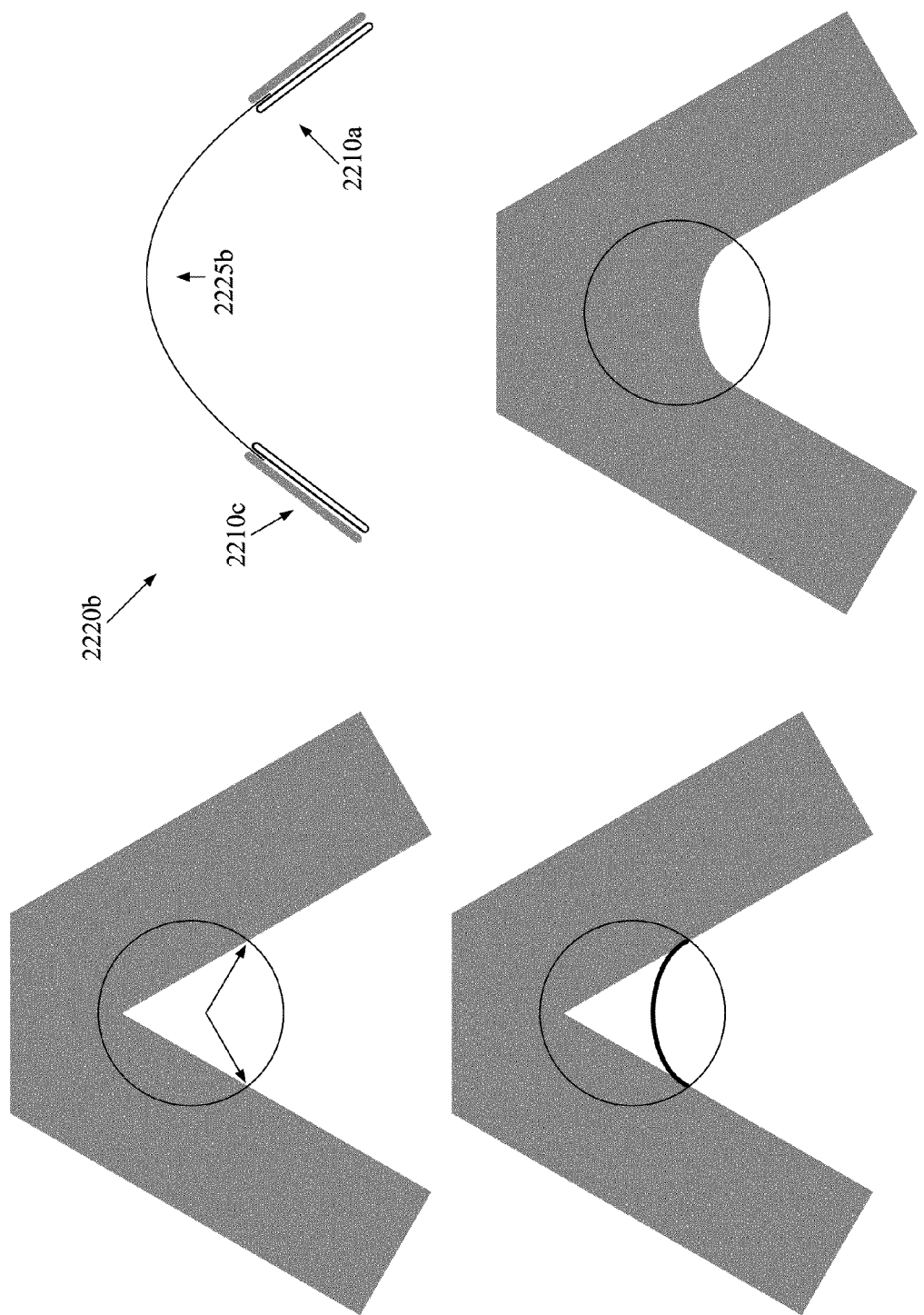

FIG. 22b illustrates the rule that in the absence of straight edges with colors aligned, the process of some embodiments will pair edges with matching colors, even though the edges are not aligned. The only difference between the regions of FIGS. 22a and 22b is that in FIG. 22b the selection area encompasses the point of the white region. Therefore the process will only find one potential pair of edges. The process will extrapolate a curved line to join the edges. Diagram 2220b shows that with edges 2210b and 2210d gone, edges 2210a and 2210c are the strongest pair and can be connected by smooth curve 2225b. The smooth curve 2250 is tangent to one edge at one side of the selected area and smoothly curves over to become tangent to the edge at the other side of the selected area.

Figure 23B:
FIGS. 23a-23b illustrate more criteria that some embodiments use to determine which pairs are the strongest indicators of boundaries.
Figure 23A:
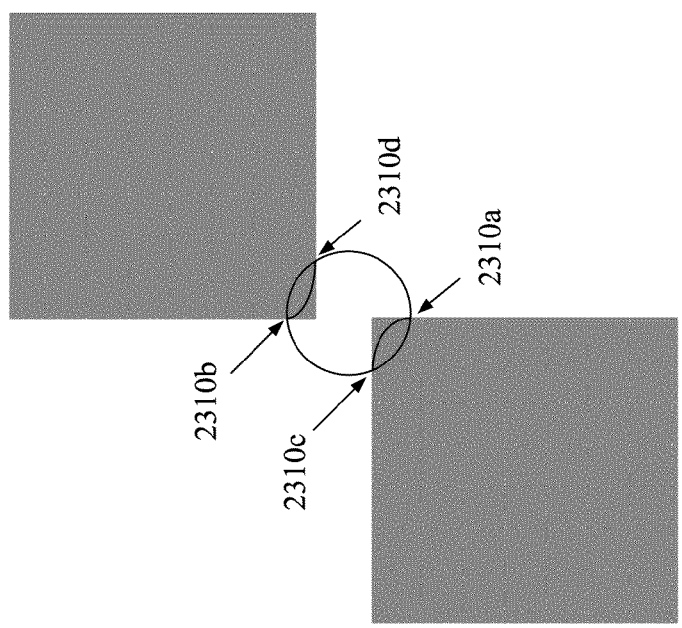

FIGS. 23a-23b illustrate the rule that curved lines win over straight when colors are transposed. FIG. 23a shows that edges 2310a and 2310b are aligned and could be connected by a straight line. The edges 2310a and 2310b even have the same colors, white on one side and grey on the other. Both indications of a strong pair. However, edge 2310a is white on the right side, all of its pixels are white on the right side, while edge 2310b is white on the left side and all of its pixels are grey on the right side. The process of some embodiments uses transposition of colors to discount the strength of the pair. Again, the process is exploiting the probabilities. If edges in a drawing or in real life have opposite colors on opposite sides of a small area, the chances of the edges being part of a continuous border through the selected area is low. In some embodiments, the process may have ways of determining whether such edges do match up despite the color reversal (e.g. if each side shades from one color to the other through the area).

FIG. 23a also shows that, as the process has determined that edges 2310a and 2310b are not a strong pair, the process then goes on to find that edges 2310a and 2310c are a strong pair and that edges 2310b and 2310d are also a strong pair. In some embodiments, all other factors being equal, one pair is stronger than another when the first pair requires a gentler curve to connect it. That is, a pair that requires less extreme changes of direction is more likely to really represent the edge of a region.

FIG. 23b illustrates the results of blurring the sub-areas separately. The colors of the sides of the extrapolated lines match the colors of the edges entering the region, thus the blurred white sub-areas are not affected by the pixel color of the sharp corners "cut off" by the curved lines.

Figure 24:
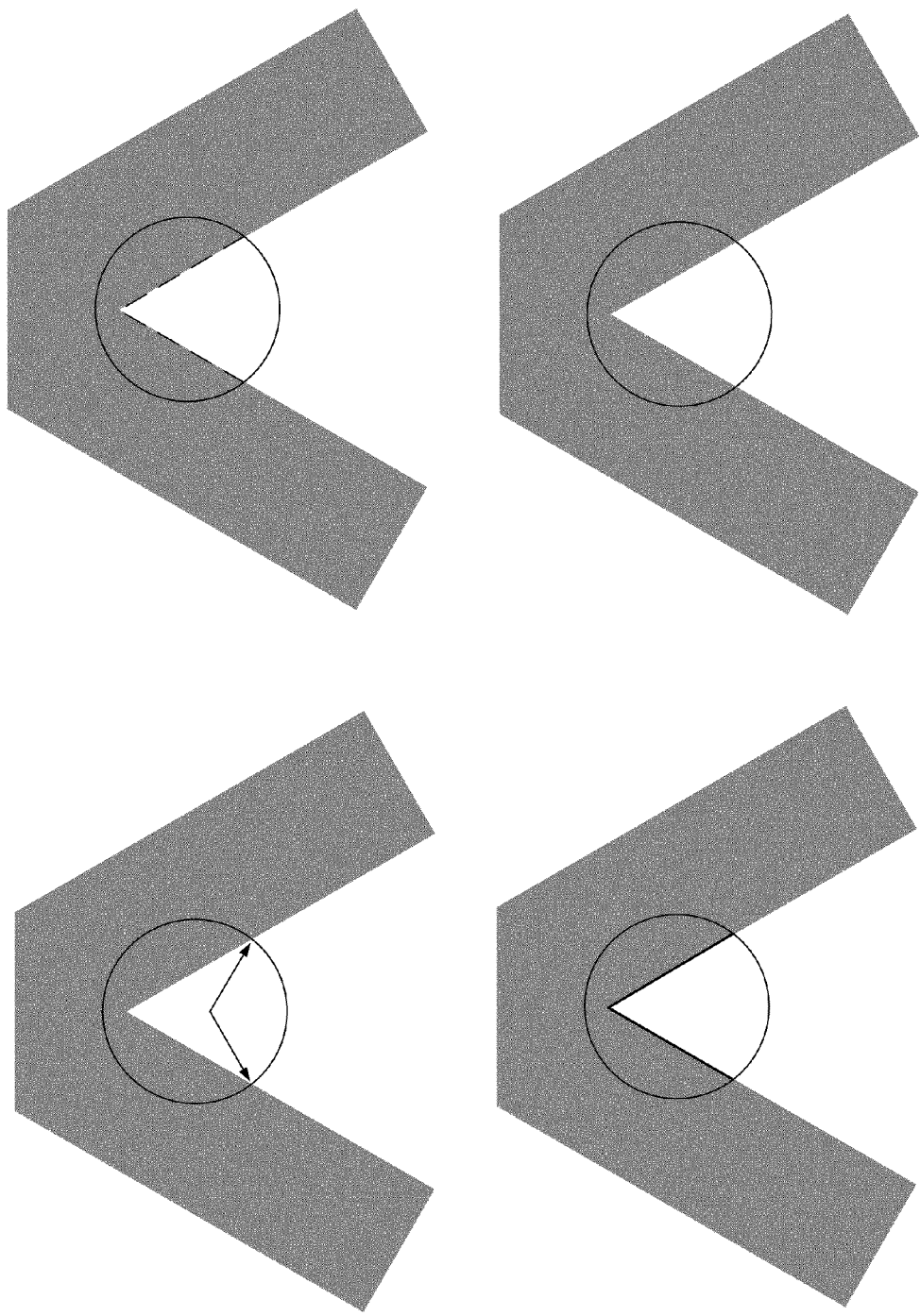
FIG. 24 illustrates extrapolating lines to a point.

FIG. 24 illustrates an alternate embodiment of extrapolation in which the process extrapolates the edges into a point. Different embodiments achieve this result in different ways. Some embodiments simply extrapolate lines tangent to the edges until the lines meet at a point. Some embodiments do this conditionally. That is, they extrapolate curved lines unless some condition is met. In some embodiments, the condition is that the edges point away from each other by more than a certain threshold. The assumption being that the more extreme the angle between pairs that have matching colors, the more likely the lines meet at a point rather than a curve.

In some embodiments, the condition is that the edges enter the perimeter on straight lines or curve away from each other rather than curving toward each other. The assumption being that if lines are straight or curve away from each other, they are more likely to meet in a point than lines which are already curving toward each other.

In some embodiments, the process actually traces the edges into the selected area to determine whether the edges actually come to a point. This means that the actual curves or points from the original image can be used, rather than an extrapolated curve. In some embodiments, the process traces the edges from both sides until they reach a discontinuity (e.g. the blemish) and performs an extrapolation of the shape of the lines only across the blemish itself. In some embodiments, the process has a user selectable option that determines whether the process extrapolates a smooth curve or extrapolates to a point.

As previously indicated, the process can extrapolate a line that in some cases is curved. In some embodiments, the process determines the position and shape of the edges at the points that cross the perimeter of the selected area. Using the shape and positions of the edges at the perimeter, the process extrapolates the shape of a smooth the curve within the selected region. In some embodiments the curve is simply the straight line connecting the edges. In other embodiments, the curve is a quadratic curve that approximates the slopes of the edges. In other embodiments, other smooth curves (e.g. Bezier curves) may be generated based on the position and slope of the edges where they intersect the perimeter of the selected area. In still other embodiments, the smooth curves may be based on the position and slope of the edges and on higher order derivatives describing the shape of the edges. In some embodiments, these higher order derivatives are not directly calculated, but the information about them is inherent in the positions of multiple pixels along the edge and near the perimeter of the selected areas.

B. Blurring

1. Blurring by Region

Figure 25:
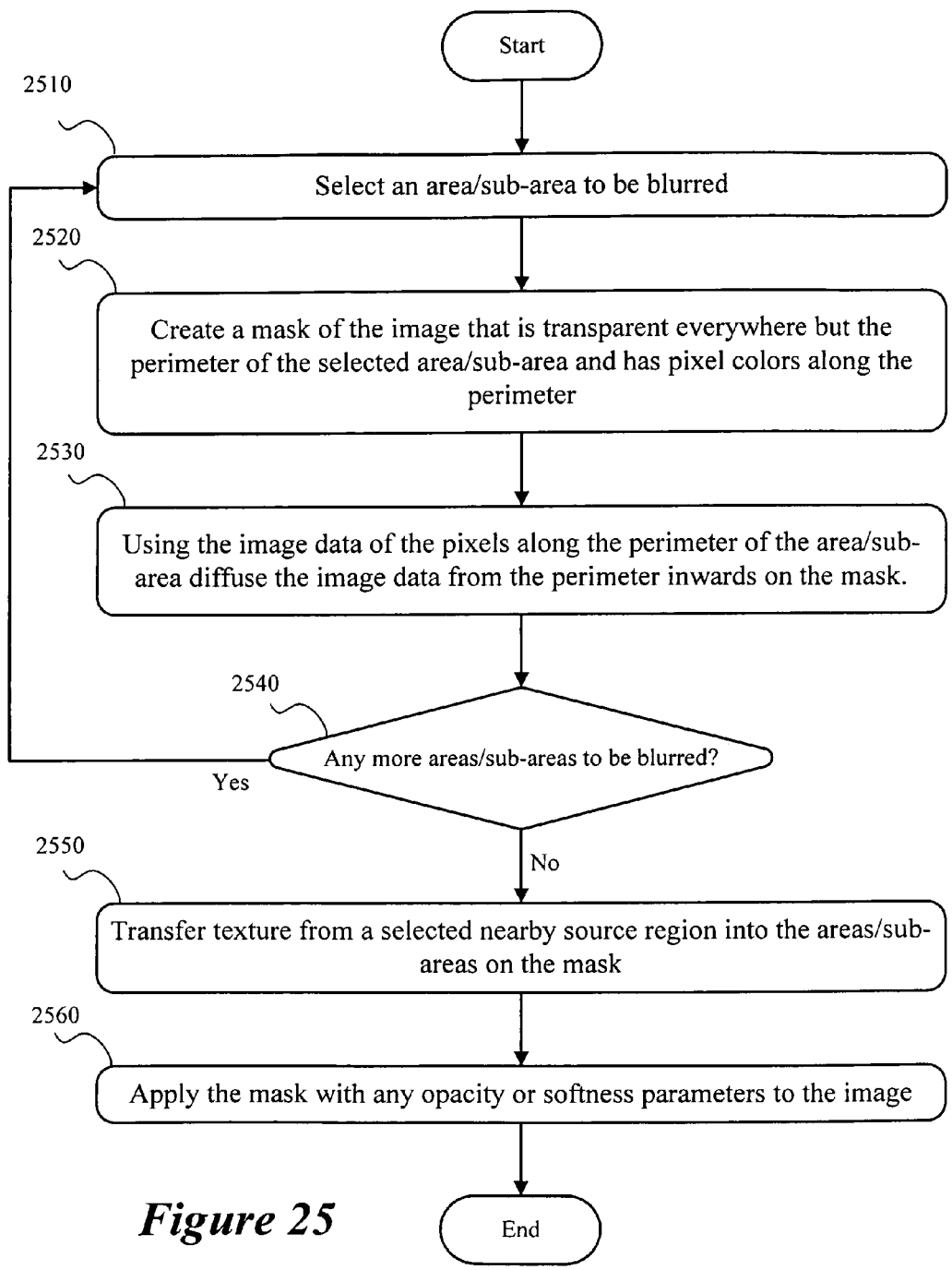
FIG. 25 illustrates a flowchart of the blurring process of some embodiments.

FIG. 25 illustrates the blurring process of some embodiments. Once an area or sub-area is selected (at 2510), the process (at 2520) creates a mask with transparent pixels on the interior and exterior of the selected area, pixels with the same color as the perimeter of the selected area on the perimeter of the area on the mask, and pixels with extrapolated colors on the extrapolated edges, such as those produced by process 1700 above. The process (at 2530) uses the image data (e.g. color, in whatever form it takes) from the perimeter of the area/sub-area to fill the interior of that area/sub-area. In some embodiments, the blurring comprises inpainting.

Figure 26A:
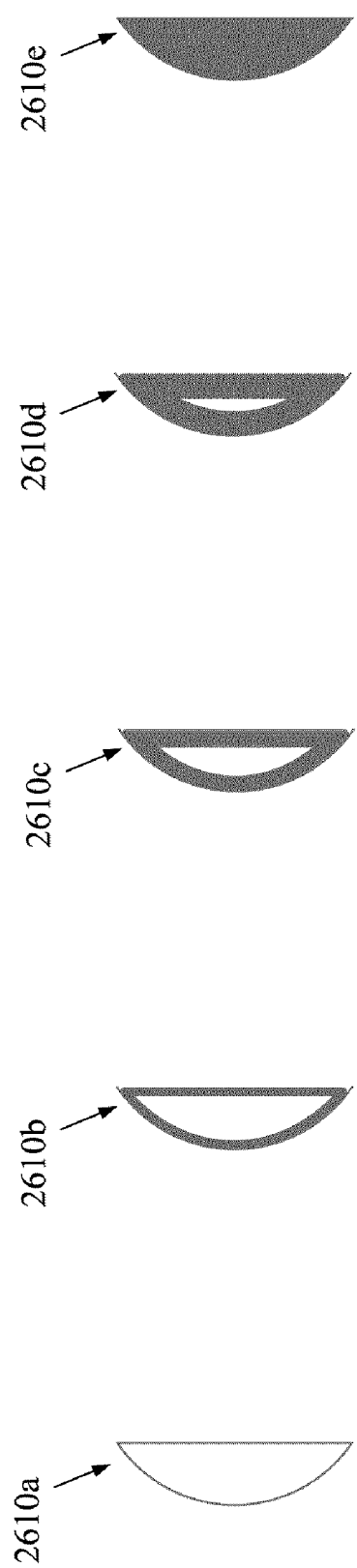
FIG. 26a-26b illustrates the diffusion of pixels from an edge of a sub-area into the interior.

FIG. 26a illustrates such a use of edge pixels to determine the colors of interior pixels. The figure shows diffusion of pixels from an edge of a sub-area into the interior, from empty sub-area 2610a to full sub-area 2610e. In this figure, the color is constant along the edges, so the color of the interior is constant. This is because each interior pixel is ultimately influenced only by the colors of the pixels on the edge, with a uniform edge, each interior pixel is influenced to match that color. However, when blurring areas or sub-areas with varying colors along the edge, the color of the interior is not constant.

In some embodiments, the colors of the interior pixels are generated (at 2530) from the edge data by a relaxation algorithm, a standard diffusion algorithm, temperature diffusion, or other methods. In some embodiments, the colors are blurred such that the second derivative of the color progression inside is close to or equal to zero. In some embodiments, the edge pixels are blurred at a per pixel scale. In other embodiments, the blurring first applies on a larger scale, then at half that scale, and so on to the individual pixel level in order to preserve computing power. This process is explained in more detail in subsection 2 below.

In some embodiments, only data near the perimeter of blemish area, and the extrapolated lines are used. This allows the interior to be completely replaced, removing any blemish within it. Pixels outside or inside the given area or sub-area are ignored and thus have no effect on the colors after blurring (however see section C below on texture application). Different embodiments use different thicknesses of edges (e.g. seven or nine pixels). In some embodiments, after the blurring, texture from a nearby area is applied to the blurred area; either before or after the mask with the blurred area is applied to the original image.

When operation 2530 is finished with an area, the operation 2540 determines whether any areas/sub-areas remain to be blurred. If so, the process loops back to selecting the next area/sub-area to be blurred (at 2510).

Figure 26B:
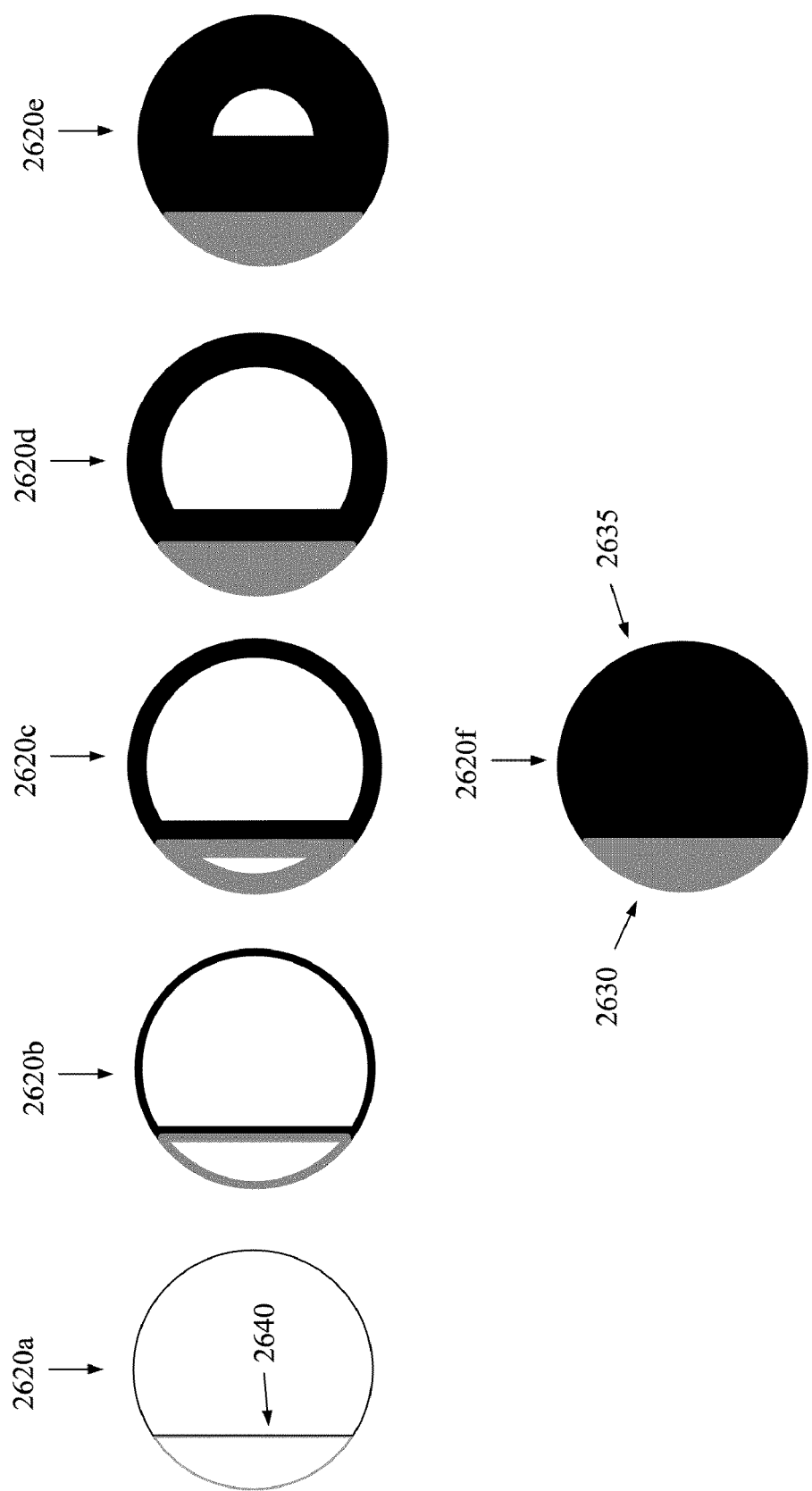

As mentioned in the Overview, in some embodiments, the process of blurring sub-areas separately involves performing an operation on the entire area at once, but with the sub-areas divided from each other by pixels that are preset before blurring the area. This is illustrated in FIG. 26*b*. FIG. 26*b* shows blurring of a whole area from empty area 2620*a* to full area 2620*f*. At each stage, the sub-areas 2630 and 2635 are part of the same area, but the set colors of the pixels in the extrapolated line 2640 between them cause the inpainting to react in each sub-area though the other sub-area were not there.

Once all areas/sub-areas that are supposed to be blurred have been, then operation 2540 passes the procedure on to operation 2550. Operation 2550 is the operation of some embodiments that applies texture to the blurred area of the mask, which will be described in detail in subsection C below. After the texture is applied (or before in some embodiments), the mask, with whatever opacity value the blemish removal tool is set to, is applied to the original image in operation 2560.

2. Fast Inpainting by Scaled Blurring

In some prior art blurring operations, a blurring pass over an area replaced each pixel other than pre-defined pixels with a weighted average of the original pixel and the pixels around it. Multiple blurring passes were necessary to create a smooth blurred region in which colors did not change abruptly. Each blurring pass spread the original color information out further, the first pass spread it to the adjacent pixels. In the next pass the pixels adjacent to those pixels received it from the pixels affected in the first pass, and so on.

A perfectly blurred area, would have a smooth average value that does not change abruptly and would not be changed by further blur passes. The number of blurring passes necessary to approach a perfectly blurred area in some algorithms increases linearly with the number of pixels. Blurring an area of 10000 pixels requires 100 times as many blurring passes as blurring an area that is 100 pixels. As the time for each blurring pass also scales as the number of pixels, the total time to blur an area rises as the square of the number of pixels in the area, which is also the fourth power of the length of a side of the area.

Figure 27:
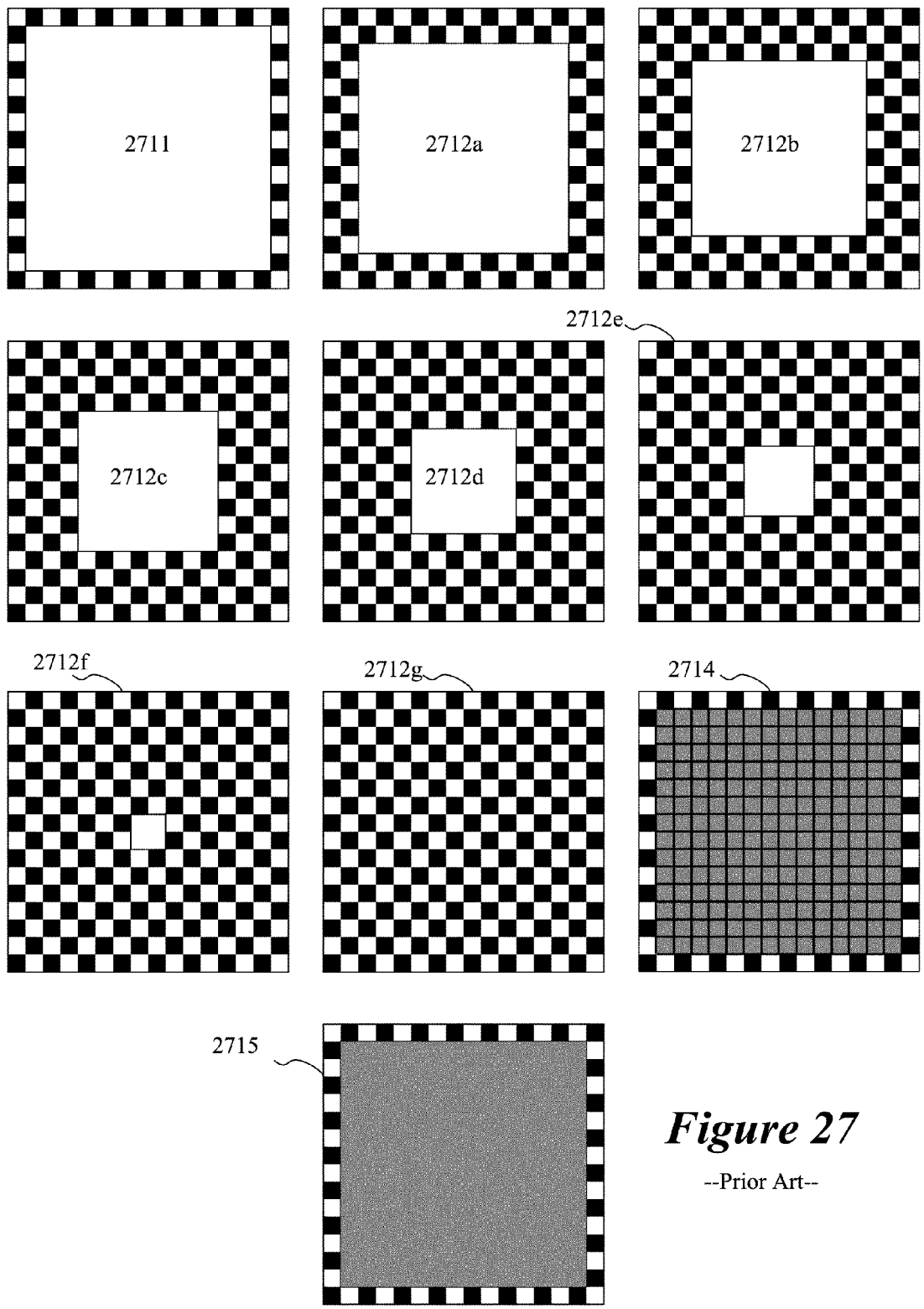
FIG. 27 illustrates prior art inpainting of areas.

FIG. 27 illustrates a blurring process used in the prior art. The figure shows the sequence of filling in a square area from fixed pixels on the outer edge. In area 2711, the pixels on the edge of a sixteen-by-sixteen square are defined. Each small black or white square of the checkerboard represents one pixel of a known color value. The black and white colors of the pixels are a schematic representation used to illustrate individual pixels, and do not represent the actual colors of the pixels.

Areas 2712*a*-*g* show successive layers filling in toward the center of the area. The colors of the pixels in each successive layer are determined by an average of the already defined pixels around them. Undefined pixels (the white ones in the centers) do not get averaged in when determining the value of the color of a pixel. Area 2714 shows that after all the internal pixels have been defined, the internal pixels are blurred together (indicated by the grey color of the interior pixels), as bounded by the predefined pixels on the border. Blurring a large number of internal pixels to a nearly perfect blur, starting from an unblurred set of pixels takes a considerable amount of computing time. Area 2715 shows that the interior region is now blurred.

Figure 28:
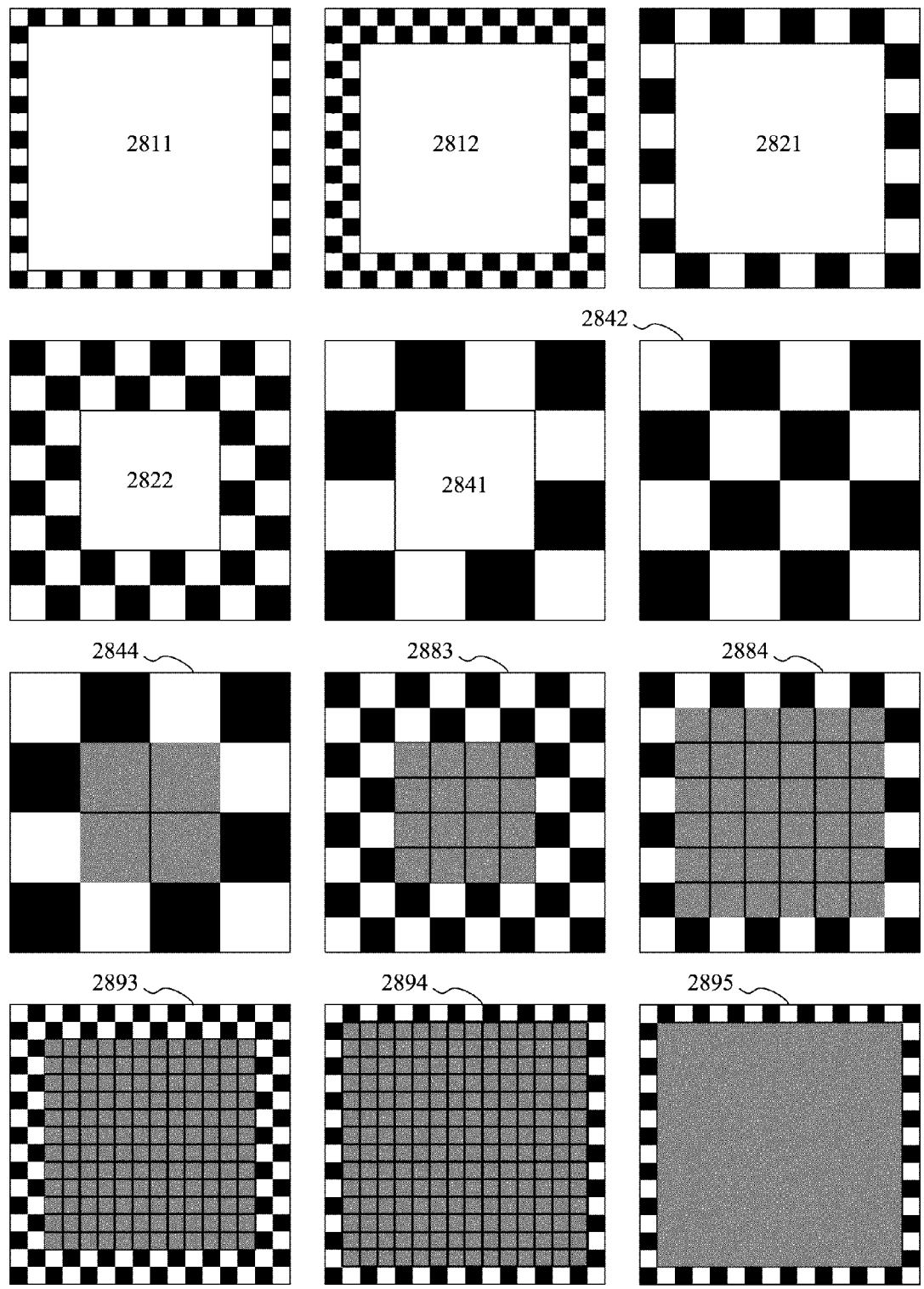
FIG. 28 illustrates inpainting of areas in some embodiments.

The number of blurring passes required to achieve a near perfect blur can be reduced considerably by blurring at a lower resolution, then successively increasing the resolution and blurring at each level. FIG. 28 illustrates changing resolutions and blurring at different resolutions of some embodiments. In area 2811, the boundary pixels of the region are have been defined. In area 2812, the first layer in from the boundary has been defined based on the boundary pixels.

In area 2821, the entire region has been downsampled. In the downsampling, each two-by-two set of pixels has been replaced by a single larger pixel. In some embodiments, each larger pixels is the average color of the pixels of the corresponding two-by-two square of pixels. In some embodiments, the process maintains a record of the values of the edge pixels before downsampling so that those values can be used in upsampling later in the process. In some embodiments, some of the two-by-two sets of pixels include pixels that have not yet been defined. In such embodiments, the downsampled larger pixels have the average color of the defined pixels, not taking into account the undefined pixels.

Area 2822 shows that the next layer of pixels has been defined. These pixels are the size of the larger pixels created by the downsampling and are defined based on the larger pixels defined in the downsampling. Each of the newly defined pixels are the size of a two-by-two square of the original pixels. Area 2841 shows the effects of another downsampling operation. The pixels are now the size of a two-by-two set of the larger pixels, and the size of a four-by-four set of the original pixels. In some embodiments, they are each the average color of the corresponding two-by-two square of larger pixels. Once again, the values of the pixels prior to the downsampling have been saved for later use.

Area 2842 shows that the interior pixels have again been defined in terms of the exterior pixels. This time each of the defined pixels is the size of a four-by-four square of the original pixels, just like the downsampled pixels on the boundary. In the illustrated embodiment, the defining of the pixels at this resolution completely filled the selected area 2842. However, in other embodiments, the area may be larger proportional to the number of pixels. In some embodiments, the process of downsampling stops after some number of downsampling operations and the rest of the interior is filled in as in the prior art, one layer at a time. Some embodiments downsample by factors other than two. Some embodiments downsample by different factors in different directions.

Once the last of the interior region is defined, the process begins blurring together the pixels defined at that resolution. This is illustrated in area 2844. The only pixels defined at this resolution are the four in the center, so they are blurred together, as bounded by the pixels on the boundary, which were defined by the last downsampling. In embodiments that stop downsampling and fill in the interior layer by layer, the entire interior defined since the last downsampling is blurred, not just the last layer.

After the interior pixels have been blurred to a at least a nearly perfect blur, the process upsamples the pixels. This is shown in area 2883. In some embodiments, the defined pixels from the downsampling illustrated in area 2841 are replaced with the saved, pre-downsampling pixels illustrated in area 2822. In some embodiments the pixels on the interior are simply replaced by two-by-two squares of smaller pixels the same color as the larger pixels they replace. In other embodiments, the large pixels on the interior are replaced by two-by-two squares of smaller pixels with colors interpolated from the colors of the pixels being replaced. In some embodiments, the interpolation includes color information from the boundary pixels. Once the upsampling is complete, the process blurs together the upsampled interior pixels and the pixels that were defined at this resolution (i.e. the pixels added between area 2821 and area 2822). The newly blurred interior is shown in area 2884.

After a nearly perfect blur is achieved at this resolution, the process upsamples again, as seen in area 2893. Once again the boundary pixels revert to the previously saved, pre-downsampling color values. Once again, the interior pixels are replaced by smaller pixels based on the colors of the larger pixels they replace. In area 2894, the interior pixels are then blurred together with the pixels defined at this resolution (i.e. the pixels added between area 2811 and area 2812).

Finally, area 2895 shows the blurred interior. The results of the blurring are nearly the same as the results of the blurring of the prior art, but by starting the blurring of each resolution with an area already pre-blurred at a lower resolution, computing time has been saved by successively downsampling and filling in layers of the interior, and then successively blurring and upsampling layers of the interior.

C. Automatic Texture Source Selection

Simply blurring an area leaves it without texture. In a picture of a real world object, a smooth patch may stand out as unnatural. This means that adding some texture would make the blurred area seem more natural. The original selected area has a blemish in it (hence, the use of the blemish removal tool), and the process may not be able to distinguish the blemish from the native texture. The best candidate for a texture that matches what is supposed to be in the selected area is a nearby texture. To reduce the chances that the texture of a nearby blemish will be applied, the process looks for a nearby area with a relatively smooth texture.

Figure 29:
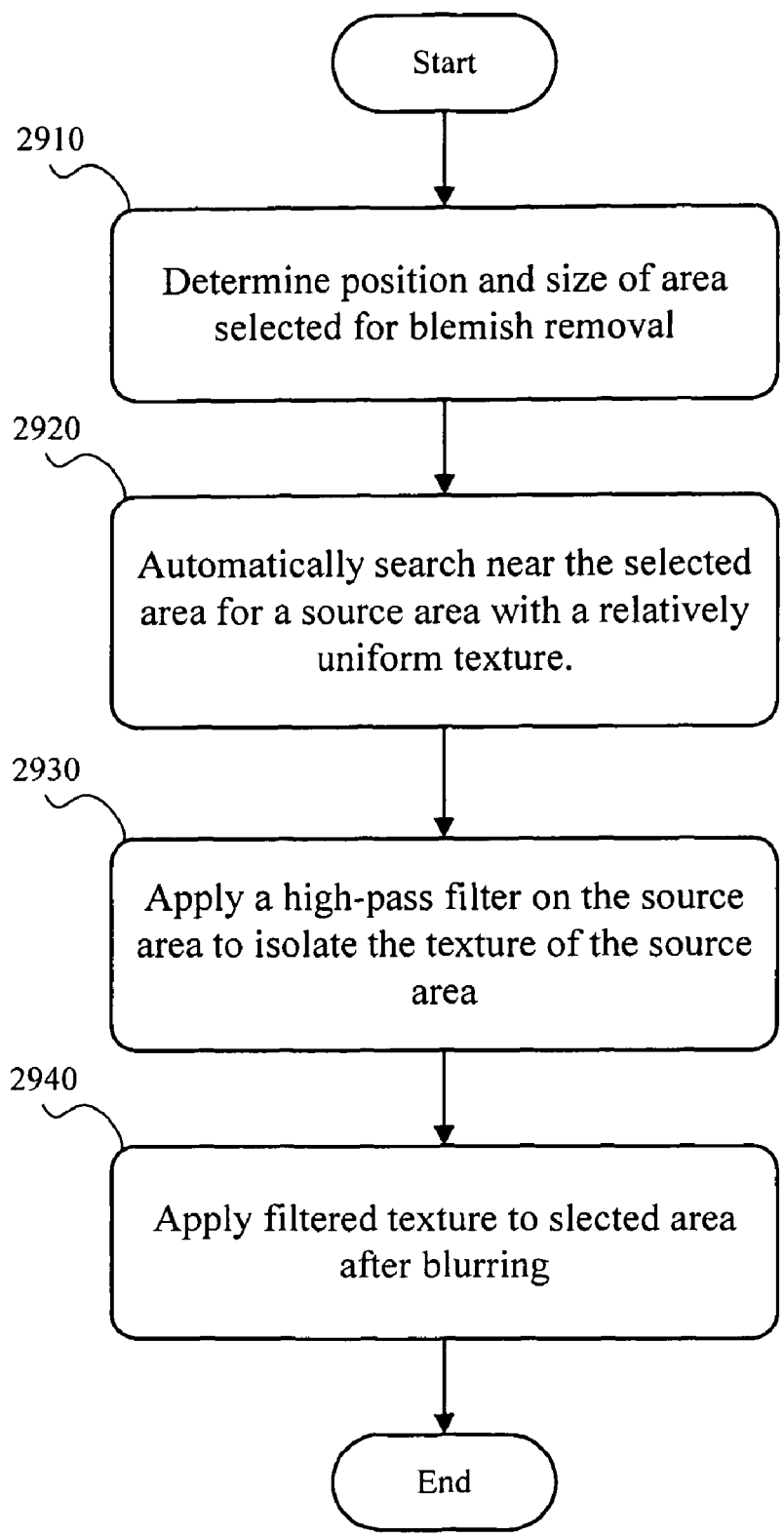
FIG. 29 illustrates a flowchart of the application of texture.
Figure 30B:
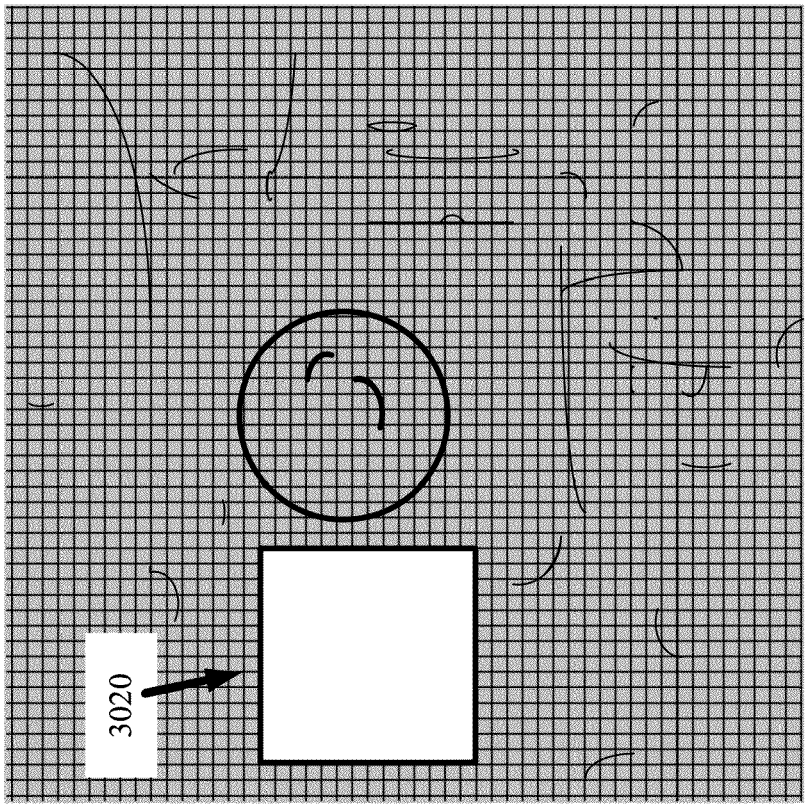
FIGS. 30a-30d illustrate the automatic selection of a texture source and its application to a blurred area.
Figure 30A:
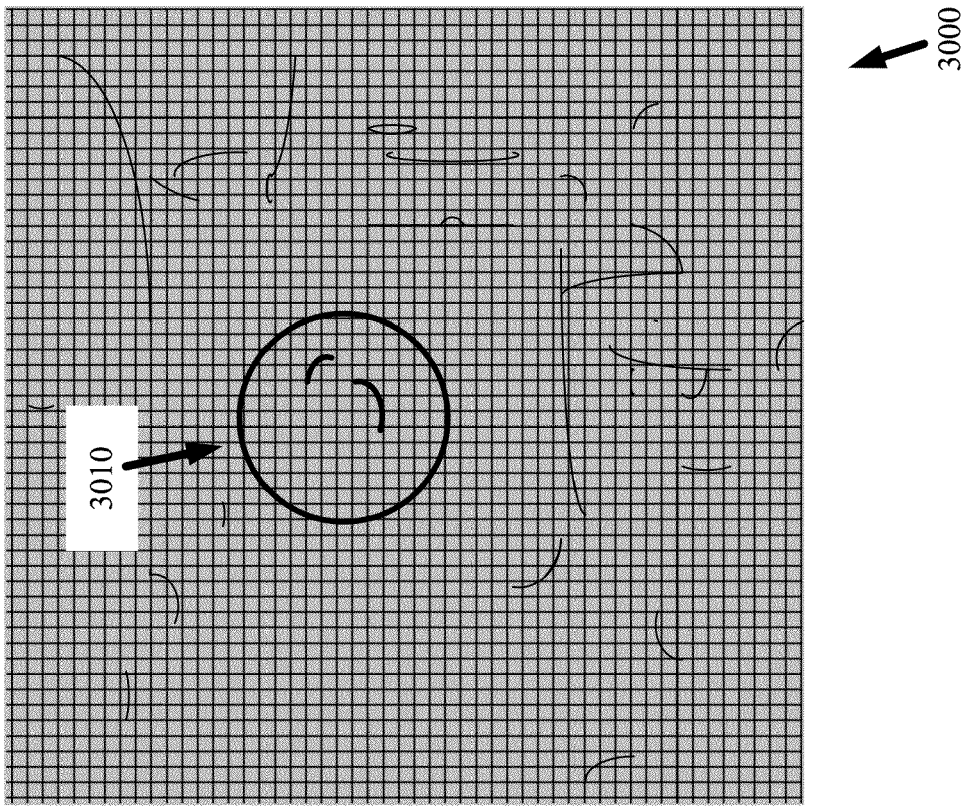
Figure 30D:
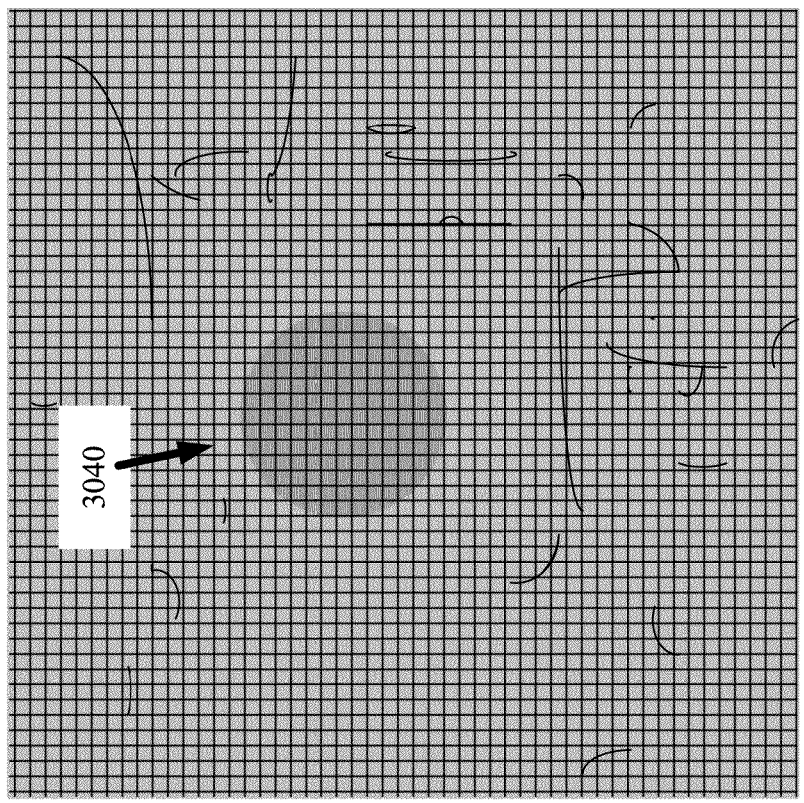

FIGS. 29-30*d* illustrate automated detection and application of texture. FIG. 29 illustrates the process 2900 of automatic texture detection and application of some embodiments. The process (at 2910) determines the position and size of the area selected. This operation is illustrated in FIG. 30*a*, which illustrates a large textured region 3000 with a selected area 3010 with texture in it and in the surrounding areas.

After determining the size of the selected region, the process (at 2920) then searches nearby for a relatively smooth area to use as a source of the texture. The use of a relatively smooth area reduces the chances of introducing blemishes from the texture source area into the area that the blemish removal tool is trying to rid of blemishes. Using a nearby area reduces the chance that a mismatched texture will be selected. FIG. 30*b* illustrates the selection of the smoothest of the nearby areas as texture source area 3020. After the area is selected, the process (at 2930) applies a high-pass filter (in some embodiments a median filter) to the texture source area (or rather, a copy of the source area, to avoid degrading the image). The process (at 2940) then applies the texture to the mask with the blurred area.

As described in subsection A.2 above, in some embodiments edge detection is treated in a non-linear manner. Likewise, in some embodiments, the transfer of texture from one area of an image to another treats treat brightness on a non-linear (e.g. logarithmic) scale. For example in some embodiments, copying a texture that varies between 80% and 100% white (a 20% difference) onto a darker gray background (e.g. solid 45% gray) will produce a result texture that varies from 40% to 50% (a 10% difference), rather than 35% to 55% (a 20% difference), which would look too visually strong in an area that was originally half the brightness of the texture source area.

Figure 30C:
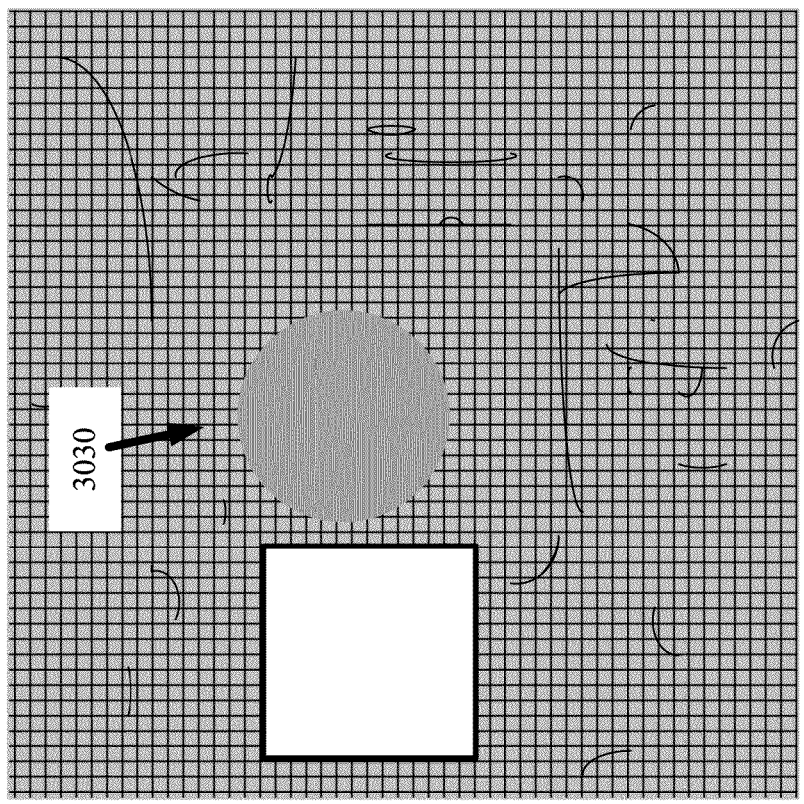

FIGS. 30*c*-30*d* show what the effect of blurring selected area 3010 would be without and then with the application of texture. As FIG. 30*c* figure shows, the smoothness of the blurred area 3030 stands out against the textured background. FIG. 30*d* illustrates that blurred and textured area 3040 has a more natural texture when the process (at 2940) applies the texture from the automatically selected nearby area to the blurring map before the area 3010 is replaced.

In some embodiments, the texture source area is selected based on its being the smoothest area within some particular range of the selected blemish removal area. In other embodiments, the texture area is selected based on its matching the color of the perimeter of the selected area, or the interior of the selected area, or its similarity to the original texture of the selected area. In some embodiments, texture sources for different sub-areas are determined independently and the textures are applied independently.

IV. Computer System

Figure 31:
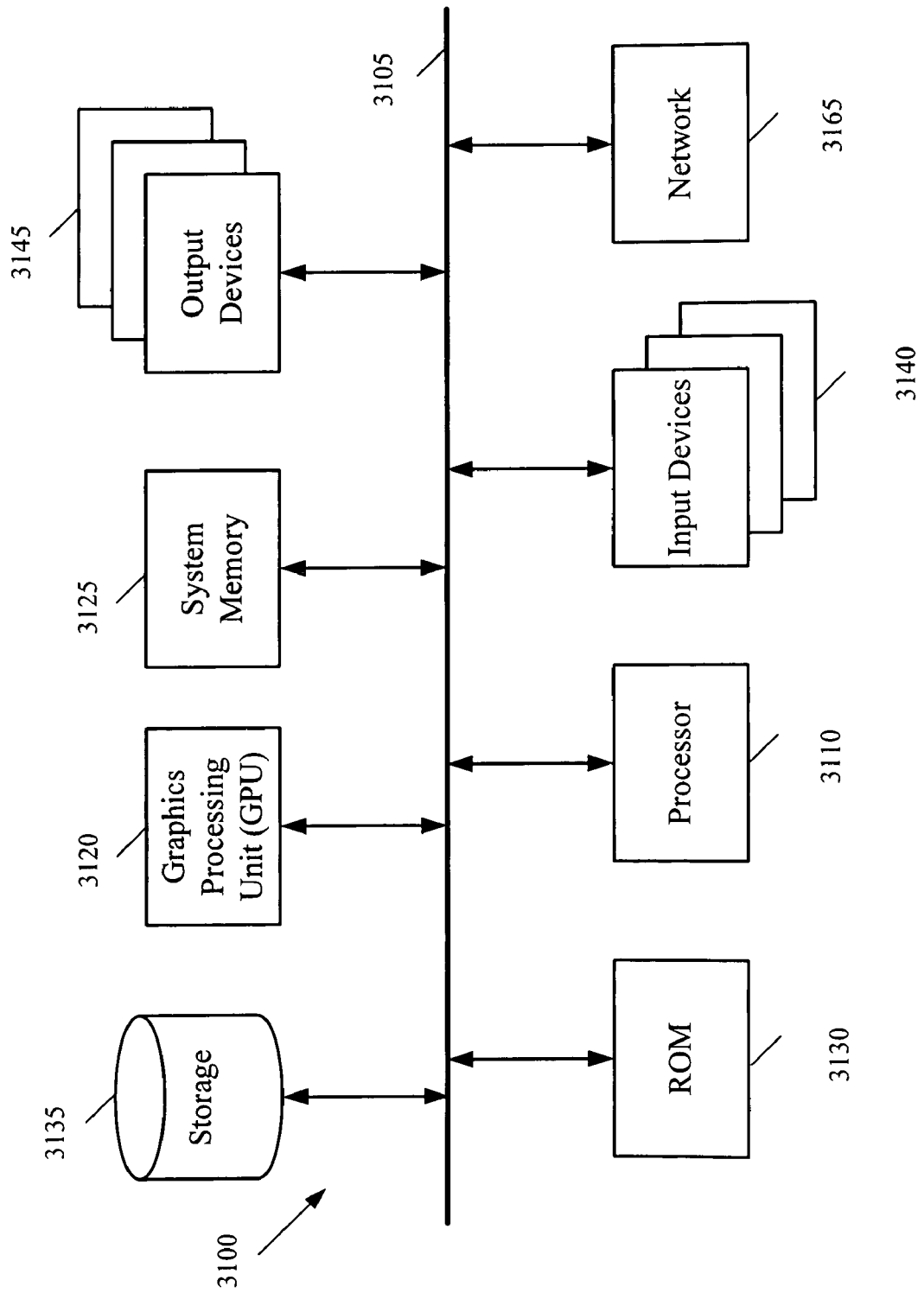
FIG. 31 illustrates a computer system of some embodiments.

FIG. 31 illustrates a computer system with which some embodiments of the invention are implemented. Computer system 3100 includes a bus 3105, a processor 3110, a graphics processing unit (GPU) 3120, a system memory 3125, a read-only memory 3130, a permanent storage device 3135, input devices 3140, and output devices 3145.

The bus 3105 collectively represents all system, peripheral, and chipset buses that communicatively connect the numerous internal devices of the computer system 3100. For instance, the bus 3105 communicatively connects the processor 3110 with the read-only memory 3130, the GPU 3120, the system memory 3125, and the permanent storage device 3135.

From these various memory units, the processor 3110 retrieves instructions to execute and data to process in order to execute the processes of the invention. Some instructions are passed to and executed by the GPU 3120. The GPU 3120 can offload various computations or complement the image processing provided by the processor 3110. Such functionality can be provided using CoreImage's kernel shading language.

The read-only-memory (ROM) 3130 stores static data and instructions that are needed by the processor 3110 and other modules of the computer system. The permanent storage device 3135, on the other hand, is a read-and-write memory device. This device is a non-volatile memory unit that stores instructions and data even when the computer system 3100 is off. Some embodiments of the invention use a mass-storage device (such as a magnetic or optical disk and its corresponding disk drive) as the permanent storage device 3135.

Other embodiments use a removable storage device (such as a floppy disk, flash drive, or ZIP® disk, and its corresponding disk drive) as the permanent storage device. Like the permanent storage device 3135, the system memory 3125 is a read-and-write memory device. However, unlike storage device 3135, the system memory is a volatile read-and-write memory, such a random access memory. The system memory stores some of the instructions and data that the processor needs at runtime. In some embodiments, the invention's processes are stored in the system memory 3125, the permanent storage device 3135, and/or the read-only memory 3130.

The bus 3105 also connects to the input and output devices 3140 and 3145. The input devices enable the user to communicate information and select commands to the computer system. The input devices 3140 include alphanumeric keyboards and pointing devices. The output devices 3145 display images generated by the computer system. For instance, these devices display a graphical user interface. The output devices include printers and display devices, such as cathode ray tubes (CRT) or liquid crystal displays (LCD).

Finally, as shown in FIG. 31, bus 3105 also couples computer 3100 to a network 3165 through a network adapter (not shown). In this manner, the computer can be a part of a network of computers (such as a local area network ("LAN"), a wide area network ("WAN"), or an Intranet, or a network of networks, such as the internet For example, the computer 3100 may be coupled to a web server (network 3165) so that a web browser executing on the computer 3100 can interact with the web server as a user interacts with a graphical user interface that operates in the web browser.

Any or all components of computer system 3100 may be used in conjunction with the invention. For instance, in some embodiments the execution of the blemish removal tool is performed by the GPU 3120 instead of the CPU 3110. Similarly, other image editing functions can be offloaded to the GPU 3120 where they are executed before the results are passed back into memory or the processor 3110. However, a common limitation of the GPU 3120 is the number of instructions that the GPU 3120 is able to store and process at any given time. Therefore, some embodiments adapt instructions for implementing processes so that these processes fit onto the instruction buffer of the GPU 3120 for execution locally on the GPU 3120. Additionally, some GPUs 3120 do not contain sufficient processing resources to execute the processes of some embodiments and therefore the CPU 3110 executes the instructions. One of ordinary skill in the art would appreciate that any other system configuration may also be used in conjunction with the present invention.

Figure 1:
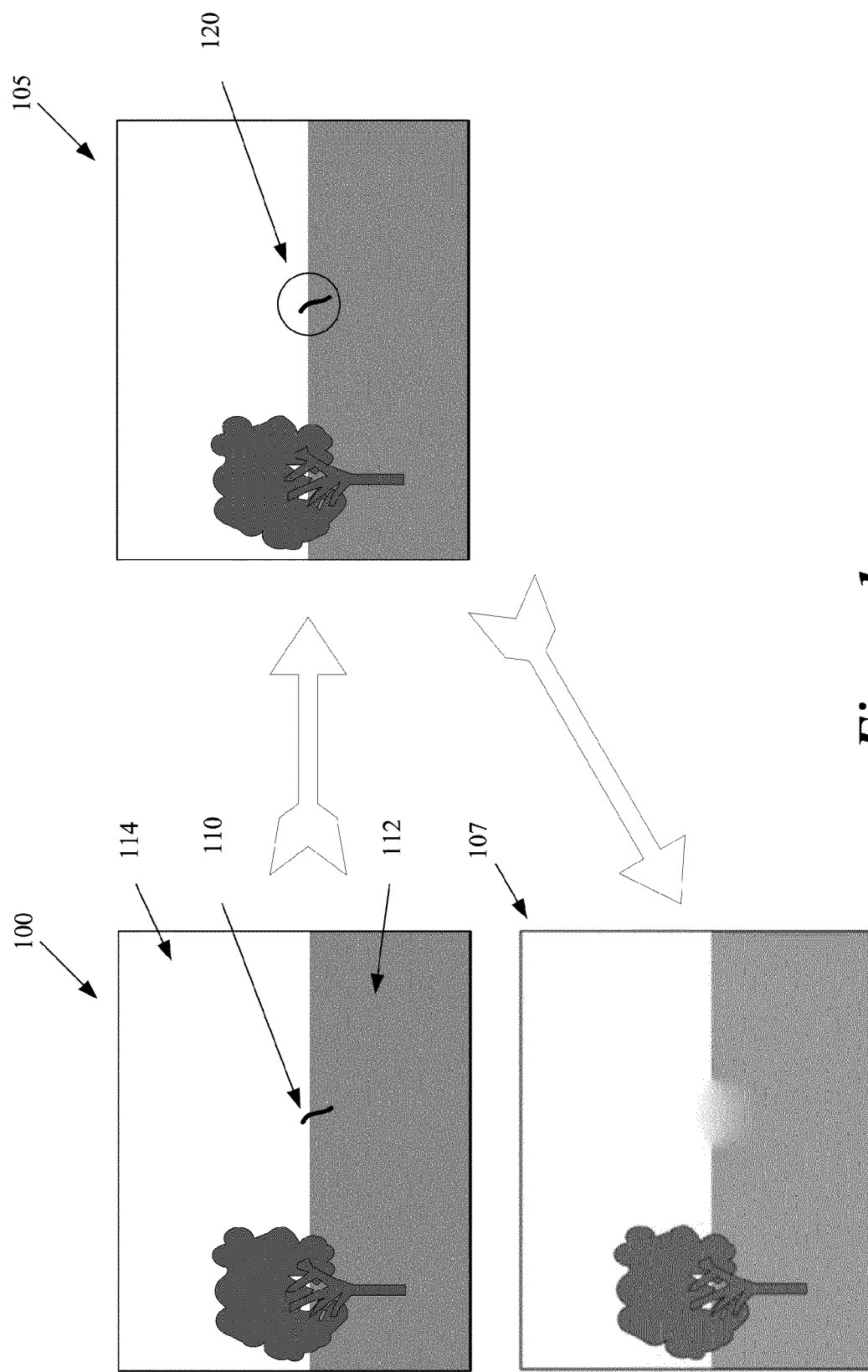
FIG. 1 illustrates a prior art tool for removing blemishes.

One of ordinary skill in the art will realize that some of the features described in this application are present in prior art (e.g. blurring as shown in FIGS. 1 and 27), however, they have not been used in combination with other features described herein. Furthermore, while the invention has been described with reference to numerous specific details, one of ordinary skill in the art will recognize that the invention can be embodied in other specific forms without departing from the spirit of the invention. For instance, Apple Mac OS® environment and Apple Aperture® tools are used to create some of these examples, a person of ordinary skill in the art would realize that the invention may be practiced in other operating environments such as Microsoft Windows®, UNIX, Linux, etc., and other applications such as Adobe Photoshop®, Adobe Lightroom®, Apple iPhoto®, etc., without the use of these specific details. Also, some of the examples may be executed on a GPU or CPU of a computer system depending on the computing resources available on the computer system or alternatively on any electronic device that is able to view images. The examples have discussed application of the various image editing functions to images, but each of the above examples are extensible to apply to other forms of visual media such as video. Thus, one of ordinary skill in the art would understand that the invention is not to be limited by the foregoing illustrative details, but rather is to be defined by the appended claims.

I claim:

1. A method for removing blemishes from an image, the method comprising:
   providing a display area for displaying an image; and
   providing a blemish removal tool for removing blemishes from the image by:
   receiving a selection of an area of said image;
   identifying a plurality of candidate edge intersects along a perimeter of the selected area;
   examining different pairs of candidate edge intersects to identify at least two edge intersects that have a plurality of attributes that meet a plurality of criteria;
   defining an edge between the two identified edge intersects that divides the area into two interior sub-areas;
   interpolating color values on the edge between the two identified edge intersects based on color values of the edge intersects between which the edge is defined; and
   using the interpolated color values of the edge to modify the plurality of color values in each sub-area independently from each other sub-area to remove a blemish from the image.

2. The method of claim 1, wherein the display area is provided as a part of a graphical user interface of a device.

3. The method of claim 1, wherein the blemish removal tool comprises an adjustable control for specifying the size of the selected area of said image.

4. The method of claim 1, wherein the blemish removal tool is for painting said selected area of said image, by a user, to define said selected area for blemish removal.

5. The method of claim 1, wherein the edge between the two identified edge intersects defines a portion of a boundary of a particular sub-area, wherein using the interpolated color values of the edge to modify the plurality of color values in each sub-area comprises generating a relaxation mask over said sub-area of color values within boundaries of said sub-area.

6. The method of claim 1, wherein the blemish removal tool comprises a selectable option that when selected causes the tool to modify the plurality of color values in the selected area without dividing the selected area into the two interior sub-areas.

7. The method of claim 1, wherein each candidate edge intersect has different sets of color values on different sides of the candidate edge intersect.

8. The method of claim 1, wherein the attributes of an edge intersect comprise attributes of a region about the edge intersect, the region comprising a set of pixels that are located both within the selected area and outside of the selected area.

9. The method of claim 8, wherein the plurality attributes meet the plurality of criteria when a first region about a first candidate edge intersect and a second region about a second candidate edge intersect are aligned geometrically across the perimeter of the selected area.

10. The method of claim 8, wherein the plurality of attributes meet the plurality of criteria when a first region about a first candidate edge intersect and a second region about a second candidate edge intersect have similar color values and are aligned geometrically across the perimeter of the selected area.

11. The method of claim 8, wherein the defined edge has a shape that is based on the attributes of the regions about the edge intersects, wherein the attributes of each region comprise an angle and a curvature attribute based on curvature with which the region crosses the perimeter of the selected area.

12. The method of claim 1, wherein the blemish removal tool is further for automatically selecting a texture source area by selecting a relatively smooth area from parts of the image outside the selected area; and
   blending the selected area with a texture from the texture source area.

13. The method of claim 12, wherein blending the selected area with texture from the texture source area comprises adding noise to an area where color values have been modified, wherein said noise is based on the texture of the texture source area.

14. A non-transitory computer readable medium storing a computer program that when executed by at least one processor removes blemishes from an image, said computer program comprising sets of instructions for:
  receiving a selection of an area of an image;
  identifying a plurality of candidate edge intersects along a perimeter of the selected area;
  examining different pairs of candidate edge intersects to identify at least two edge intersects that have a plurality of attributes that meet a plurality of criteria;
  defining an edge between the two identified edge intersects that divides the area into two interior sub-areas;
  interpolating color values on the edge between the two identified edge intersects based on color values of the edge intersects between which the edge is defined; and
  using the interpolated color values of the edge to modify a plurality of color values in each sub-area independently from each other sub-area to remove a blemish from the image.

15. The non-transitory computer readable medium of claim 14, wherein each candidate edge intersect has different sets of color values on different sides of the candidate edge intersect.

16. The non-transitory computer readable medium of claim 14, wherein the two interior sub-areas comprise a first sub-area that is on a first side of the edge and a second sub-area that is on a second side of the edge.

17. The non-transitory computer readable medium of claim 16, wherein the edge is a straight line.

18. The non-transitory computer readable medium of claim 16, wherein the edge is a curve.

19. The non-transitory computer readable medium of claim 16, wherein the edge is a spline.

20. The non-transitory computer readable medium of claim 16, wherein the two identified edge intersects comprises a first edge intersect and a second edge intersect,
  wherein a first color of the first side at the first edge intersect corresponds to a color of said first sub-area at the first edge intersect, and
  a second color of the first side at the second edge intersect corresponds to a different color of the first sub-area at the second edge intersect, wherein the set of instructions for interpolating color values on the edge comprises a set of instructions for shading the color values from the first color value to the second color value along the first side of the edge.

21. The non-transitory computer readable medium of claim 14, wherein the set of instructions for using the interpolated color values of the edge to modify the plurality of color values in each sub-area comprises a set of instructions for generating a relaxation mask over said sub-areas of color values near boundaries of said sub-areas.

22. The non-transitory computer readable medium of claim 21, wherein the boundaries comprise the edge and a portion of said perimeter.

23. The non-transitory computer readable medium of claim 21, wherein said set of instructions for using the interpolated color values of the edge to modify the plurality of color values in each sub-area comprises a set of instructions for generating a weighted average of the relaxation mask with a set of color values originally in the sub-areas.

24. The non-transitory computer readable medium of claim 23, wherein said computer program further comprises a set of instructions for receiving a setting of a weight of said weighted average.

25. The non-transitory computer readable medium of claim 14, wherein the attributes of an edge intersect comprises attributes of a region about the edge intersect, the region comprising a set of pixels that are located both within the selected area and outside of the selected area.

26. The non-transitory computer readable medium of claim 25, wherein the set of instructions for defining an edge comprises a set of instructions for defining a shape of the edge based on the attributes of the regions about the edge intersects, wherein the attributes of a region comprise an angle and a curvature attribute based on curvature with which the region crosses the perimeter of the selected area.

27. The non-transitory computer readable medium of claim 14, wherein the computer program further comprises sets of instructions for:
  extracting a texture from a texture source in a relatively smooth area of the image that is automatically identified outside of the selected area; and
  blending the selected area with the extracted texture from the texture source area.

28. The non-transitory computer readable medium of claim 14, wherein the set of instructions for examining different pairs of candidate edge intersects comprises sets of instructions for:
  determining, for each pair of candidate edge intersects, a strength of an indication, made by the candidate edge intersects, of separate geometries that continue through said perimeter into said selected area; and
  identifying a particular pair of candidate edge intersects that most strongly indicate separate geometries that continue through said perimeter into said selected area.

29. The non-transitory computer readable medium of claim 28, wherein the computer program comprises sets of instructions for selecting subsequent pairs of candidate edge intersects by determining pairs of candidate edge intersects that indicate, with successively less strength, separate geometries that continue through said perimeter into said area.

30. The non-transitory computer readable medium of claim 14, wherein a pair of edge intersects indicates separate geometries that continue through said perimeter into the selected area when geometries having different colors intersect at each of said edge intersects, and the geometries on a same side of the edge defined between two edge intersects have similar colors.

31. The non-transitory computer readable medium of claim 14, wherein said computer program further comprises a set of instructions for receiving a command to modify the plurality of color values in the selected area without dividing the area into two interior sub-areas.

32. The non-transitory computer readable medium of claim 14, wherein the set of instructions for receiving the selection of the area of the image comprises a set of instructions for selecting an area over which a cursor travels during a drag operation.

33. The non-transitory computer readable medium of claim 32, wherein said cursor is a circle.

34. The non-transitory computer readable medium of claim 32, wherein said cursor is a rectangle.

35. A non-transitory computer readable medium storing a program comprising a graphical user interface ("GUI") for a device, said GUI comprising:
  a display area for displaying an image; and
  a blemish removal tool for:
  receiving a selection of an area of an image;
  identifying a plurality of candidate edge intersects along a perimeter of the selected area;
  examining different pairs of candidate edge intersects to identify at least two edge intersects that have a plurality of attributes that meet a plurality of criteria;

defining an edge between the two identified edge intersects that divides the area into two interior sub-areas;

interpolating color values on the edge between the two identified edge intersects based on color values of the edge intersects between which the edge is defined; and using the interpolated color values of the edge to modify a plurality of color values in each sub-area independently from each other sub-area to remove a blemish from the image.

36. The non-transitory computer readable medium of claim 35, wherein the blemish removal tool comprises an adjustable control for specifying the size of the selected area of said image that is to be selected for blemish removal.

37. The non-transitory computer readable medium of claim 35, wherein the blemish removal tool comprises (i) an opacity control for controlling a uniform opacity of a mask with a set of pixels originally in the selected area, and (ii) a softness control for controlling a non-uniform opacity of the mask with the set of pixels originally in the selected area.

38. The non-transitory computer readable medium of claim 35, wherein the blemish removal tool comprises a selectable option (i) that when selected causes the tool to modify the plurality of color values in the selected area without dividing the selected area into the two interior sub-areas and (ii) that when not selected causes the tool to modify the plurality of color values in the selected area by dividing the selected area into the two interior sub-areas.

* * * * *